US006916180B1

(12) United States Patent
Price et al.

(10) Patent No.: US 6,916,180 B1
(45) Date of Patent: Jul. 12, 2005

(54) METHOD AND SYSTEM FOR RATING EDUCATIONAL PROGRAMS

(75) Inventors: Douglas Price, Denver, CO (US); Anna Jo Haynes, Denver, CO (US); Meera Mani, Golden, CO (US); Gerrit Westervelt, Confer, CO (US)

(73) Assignee: Qualistar Colorado, Denver, CO (US)

( * ) Notice: Subject to any disclaimer, the term of this patent is extended or adjusted under 35 U.S.C. 154(b) by 111 days.

(21) Appl. No.: 10/057,273

(22) Filed: Jan. 24, 2002

Related U.S. Application Data

(60) Provisional application No. 60/264,149, filed on Jan. 24, 2001.

(51) Int. Cl.[7] .......................... G09B 19/00; G06F 17/60

(52) U.S. Cl. .......................................... 434/219; 705/7

(58) Field of Search ................................ 434/118, 219, 434/236, 353, 362; 705/7, 10, 11

(56) References Cited

U.S. PATENT DOCUMENTS 5,365,425 A * 11/1994 Torma et al. .................. 705/2
6,007,340 A * 12/1999 Morrel-Samuels .......... 434/236

FOREIGN PATENT DOCUMENTS

WO WO 89/12865 A1 * 12/1989 ........... G06F/15/21

OTHER PUBLICATIONS

Arkansas.gov: Googie Search Results; *Arkansas.gov*, Feb. 18, 2004; 2 pp.; http://www.accessarkansas.org/search/ar-portal_search.php.
Barbour et al.; "Governor Patton Announces First Child Care Centers in Kentucky to Receive STAR Ratings"; Aug. 2, 2001.
Benefits for Centers; *Kinderview, Inc.*; 2000–2001; 1 p.
Benefits for Parents; *Kinderview, Inc.*; 2000–2001; 1 p.
Casey; "Child Care Rating Project Halted"; *Reviewjournal*; Apr. 16, 2003; 3 pp.
Child Care Adminstration Maryland Department of Human Resources Annual Report 2002; *Maryland Human Services Agency*; 2002; 16 pp.
"Child Care and Development Fund Plan"; *Oklahoma State Plan for CCDF Services*; Oct. 1, 2003; 54 pp.
"Choosing a Preschool: Development"; *Beansprout Networks, Inc.*, 2000–2002; 2 pp.
Collins; "Quality Rating Strategies: State Trends in 2001"; *NCCIC*; Jan. 1, 2001; 1 p.
Cross et al.; "Children at Risk: Why the Quality of Child Care Matters"; *Healthy Child Care Indiana*; Jun. 2002; pp. 1–4.
"Daycare Viewing and Streaming Systems—Kinderview.com"; *Kinderview, Inc.*; 2000–2001; 1 p.
"Division of Child Care—Home Page"; *Oklahoma Department of Human Services*; (date unknown); 1 p.
"Fact Sheet: Environment Rating Scales"; *For TN Dept. of Hum. Servs. by UT Social Work Office of Research & Public Service*; Sep. 14, 2001; 2 pp.
Hodges; "Most Rowan Day–Care Centers Getting Lowest Rating"; *Salisbury Post*; Feb. 25, 2001; 3 pp.

(Continued)

*Primary Examiner*—John Edmund Rovnak
(74) *Attorney, Agent, or Firm*—Sheridan Ross P.C.

(57) ABSTRACT

The invention describes a method for evaluating educational programs which, firstly, develops criteria which will address the strengths and weaknesses of the educational program. The second step of the method is to observe the criteria, chosen in step one, in the educational program. The third step is to assign a numerical value to each of the criteria observed in step two. The next step is to assign an overall rating to the educational program based on the numerically valued criteria. The personnel involved in the educational program can then decide what steps in addition to the assessment can be done to improve or maintain the educational program.

23 Claims, 4 Drawing Sheets

OTHER PUBLICATIONS

About Us: How It Works; *Kinderview, Inc.*; 2000–2001; 1 p.
Norris et al.; "Reaching for the Stars: Center Validation Study Executive Summary"; *ECCO*; Nov. 2003; 4 pp.
Norris et al.; "Reaching for the Stars: Center Validation Study Final Report"; *ECCO*; Nov. 2003; pp. i–56.
Outlaw: "Child care Centers Gamer State's Highest Quality Rating"; *Vanderbilt University Register*; 2002.
"Proposal for an Iowa Child Care Quality Rating System"; Nov. 2003; pp. 1–16.
"Purchase of Child Program Changes Impact Payment"; *Summer 2001 Edition of CCA Newsletter Partners*; 1 p.
"Reaching for the Stars Frequently Asked Questions"; *ECCO*; (date unknown); 6 pp.
"STARS—The Childcare Quality Rating System"; *KY Department of Education*; Feb. 4, 2004; 3 pp.
"Starting a Child Care Center in Oklahoma"; *Oklahoma Department of Human Services*; (date unknown); pp. 1–58.
"Tennessee's Child Care Evaluation & Report Program"; *Tennesse Department of Human Services Child Care Services*; (date uknown); 3 pp.
"The TN Child Care Evaluation & Report Card Programs"; *University of Tennessee College of Social Work Office of Research and Public Services*; 2002; 2 pp.; http://tnstarquality.org/html/report_cards.htm.
"Tiered Strategies: Quality Rating, Reimbursement, Licensing"; *NCCIC*; Nov. 2002; pp. 1–10.
"TN Licensing Criteria"; (date unknown); 1 p.; http://tnstarquality.org/htm/popups/criteria.htm.
Tucker; "Quality Rating Scale"; *The Child Care Professional*; Feb. 2001; vol. 9, Issue 6; pp. 1–4.
VonBargen; "FY–2002 Annual Report for the Divsion of Child Care"; *Division of Child Care*; as early as Jul. 1, 2001; pp. 1–16.
"What to Look for in a Provider"; *Beansprout Networks, Inc.*; 2000–2002; 3 pp.
Dietz, Michael J., Editor, *School, Family and Community*, Aspen Publishers, Inc. 1997.
Helburn, Suzanne W., Cost, *Quality and Child Outcomes in Child Care Centers Technical Report*, Jun. 1995.
Massachuetts Cost and Quality Study, *The Cost and Quality of Full Day, Year–round Early Care and Education in Massachusetts: Preschool Classrooms*, Center for Research on Women and Massachusetts Department of Education, 2001.
*The Florida Child Care Quality Improvement Study*, 1996 Report, Family and Work Institute.
Early Childhood Quality Improvement System, *Process for Achieving Reliability on the Environment Rating Scales with the Colorado Core*, The Center for Human Investment Policy, University of Colorado at Denver, Aug. 2001.
*Creating Better Family Child Care Jobs: Model Work Standards*, Center for the Child Care Workforce, 1999.
*Creating Better Family Child Care Jobs: Model Work Standards for Teaching Staff in Center–Based Child Care*, Center for the Child Care Workforce, 1998.
Harms and Clifford, *Family Day Care Rating Scale*, Teachers College Press, 1989.
Harms, Cryer and Clifford, *Infant/Toddler Environment Rating Scale*, Teachers College Press, 1990.
Harms, Cryer, and Clifford, *Early Childhood Environment Rating Scale,* Teachers College Press, 1998.
NICHD Early Child Care Research Network, *Structure, Process, Outcome; Direct and Indirect Effects of Caregiving Quality on Young Children's Development* , Psychological Science, vol. 13, Iss. 3, pp. 199–206, May 2002.
Howes, Phillips, & Whitebrook, *Thresholds of Quality: Implications for the Social Development of Children in Center–based Child Care*, Child Development, vol. 63, pp. 449–460, 1992.
Phillipsen, Burchinal, Howes & Cryer, The Prediction of Process Quality from Structural Features of Child Care, Early Childhood Research Quarterly, vol. 12, pp. 281–303 (1997).
Shonkoff & Phillips, *From Neurons to Neighborhoods,The Science of Early Childhood Development*, National Academy Press, pp. 311–321, 2000.
Kontos, Howes, Shinn & Galinsky, *Quality in Family Child Care Relative Care,* Teachers College Press, 1994, pp. 62–84.
Howes, Quality in Child Care: What Does Research Tell Us?, National Association for the Education of Young Children, vol. 1, 1987.
NICHD Early Child Care Research Network, Child Outcomes When Child Care Center Classes Meet Recommended Standards for Quality, American Journal of Public Health, vol. 89, No. 7, Jul. 1999.
Early Childhood Educational Intervention for Poor Children, *The Carolina Abecedarin Project* Executive Summary, Oct. 1999.
Schweinhart & Weikart, Summary of Significant Benefits: The High/Scope Perry Preschool Study through Age 27, High/Scope Educational Research Foundation, 1993.
Schweinhart & Weikart, High/Scope Perry Preschool Program Outcomes, High/Scope Educational Research Foundation, 1993.
High/School Educational Research Foundation, *High Quality Preschool Program Found to Improve Adult Status*, 1993.
Barnett, *Long–Term Effects of Early Childhood Programs on Cognitive and School Outcomes*, The Future of Children, vol. 5, No. 3, Winter, 1995.
Literature Summary High Quality Early Childhood Education Improves the Lives of Children and Families.

* cited by examiner

METHOD AND SYSTEM FOR RATING EDUCATIONAL PROGRAMS

CROSS REFERENCE TO RELATED APPLICATIONS

This application is a continuation-in-part of and claims priority to U.S. Provisional Patent Application Ser. No. 60/264,149, filed Jan. 24, 2001, entitled "Method and System for Rating Educational Programs." The disclosure of this application is hereby incorporated herein in its entirety as if fully disclosed.

FIELD OF THE INVENTION

The invention concerns generally a method and system for evaluating educational programs, specifically providing a rating system based on pre-determined evaluation factors.

BACKGROUND OF THE INVENTION

There is a compelling public stake in education. As anyone who listens to the news understands, however, our educational institutions are not meeting the public's expectations regarding education. There is a great need to improve educational quality in both public and private educational institutions. The first problem in improving educational quality is assessing the quality of the educational program or institution. Educators have to show their effectiveness and the chief indicator by which most communities judge a school staff's success is student performance on standardized achievement tests. As is repeatedly discussed and debated in the media, however, standardized tests may not accurately show the quality of education. They merely make norm-referenced interpretations of students' knowledge and/or skills in relationship to those of students nationally.

In addition, standardized tests do not take into account the multi-dimensional aspect of a person's education. For instance, the standardized tests do not account for a student's innate intellectual ability. Standardized tests also fail to account for a student's learning outside of the school setting. There is no national standard for these standardized tests. Different states choose somewhat different educational objectives or different content standards. Further, some states do not even use the same standardized tests for all of the counties within that state. There is a national call for an assessment system that can be applied to each and every school in each school district in each county in each state of the United States of America.

The problem with assessing the quality of education becomes worse when one's attention is directed to early childhood education and care. No standardized tests are administered to our kindergarten students, pre-school students, and child care attendees. Thus, assessing the quality of such programs is difficult and very subjective, with many parents relying on the recommendations of other parents (who may place different values on education) or their own gut feelings about a facility.

Millions of children are receiving early care and education that is inadequate, with many receiving care that is actually or potentially harmful to their development and learning capacities. More children are experiencing child care and pre-school than ever before in America's history. For example, in 1950, 1 mother in 10 worked outside the home. Today, more than 6 out of 10 mothers of children under three are working outside the home, and that number is projected to increase to more than 7 out of 10 by 2005. Research shows that 87% of out-of-home child care settings are considered poor or mediocre.

From birth to age 5, children are in a period of explosive brain development and growth. This age period is critical to a child's social and cognitive development. 85% of a person's intellect, personality and social skills are developed by age five. Yet, 95% of public investment in education occurs after children reach the age of five—when the most critical learning years have passed. Indeed, our society does not even begin its only measure, standardized tests, of education until the child is in the $1^{st}$ grade—age 6 or 7. This may be because of the difficulties and expense of testing children under the age of 6 or 7. Children below the age of 6 or 7 are pre-verbal and pre-literate so testing methodologies are difficult and measuring actual learning in children below 6 or 7 can be next to impossible.

The American Association for Higher Education has published an article entitled "Nine Principles of Good Practice for Assessing Student Learning", incorporated herein by reference. One familiar with education and educational programs will recognize that these principles can be applied to any level of education.

The first principle is that the assessment of student learning begins with educational values. The Association states that assessment is not an end in itself but a vehicle for educational improvement. Educational values should drive not only what is assessed but also how it is assessed.

The second principle in the assessment of learning is to recognize that assessment is most effective when it reflects an understanding of learning as multi-dimensional, integrated, and revealed in performance over time. As the Association states, learning is a complex process. It entails not only what students know, but what they can do with what they know.

The third principle is that assessment works best when the programs it seeks to improve have clear, explicitly stated purposes. The fourth principle is that assessment requires attention to outcomes but also and equally to the experiences that lead to those outcomes. The fifth principle is that assessment works best when it is ongoing, not episodic.

The sixth principle is that assessment fosters wider improvement when representatives from across the educational community are involved. This means getting the students, the teachers, the parents, the administration and the community working together as one cohesive group. The seventh principle is that assessment makes a difference when it begins with issues of use and illuminates questions that people really care about. The eighth principle is that assessment is most likely to lead to improvement when it is part of a larger set of conditions that promote change. The ninth and last principle is a recognition that through assessment, educators meet responsibilities to students and to the public.

No comprehensive assessment tool of learning that embodies these nine principles presently exists. There is also no comprehensive assessment tool that measures the learning program which will embody these nine principles. Thus, there is a long-felt and unsolved need for an assessment tool for educational programs, adaptable to all levels of education, preferably embodying or recognizing the nine principles of assessing learning, as applied to a educational program.

SUMMARY OF THE INVENTION

The present invention provides an assessment method that will allow an educational program to be assessed with respect to all nine principles discussed above, not only for higher education but for all levels of educational care, and that is understandable to all of the persons involved in the process. The only way to approach measuring learning in young children is to measure the strengths and weaknesses of the learning program in which the child is enrolled. Our society's approach to education is backward. The focus of improving education should begin with early child care facilities and continue through advanced degree institutions. In addition, it is important to note that focusing on individual students to measure the quality of an educational program is not a logical method of measuring the quality of the program. Most businesses do not measure their quality according to the quality of each and every individual employee. Instead, the business focuses on procedures, training, programs and other measures of that the business can control to improve and measure the quality of the business. The same approach should be taken with respect to educational programs, instead of the current focus of placing the responsibility of the quality of the program on those who have the least control over improving or altering the program—the students.

In one embodiment of the invention, the invention describes a method for evaluating educational programs which, firstly, develops criteria which will address the strengths and weaknesses of the educational program. The criteria can be tailored to fit each different level or type of educational program. The second step of the method is to observe the criteria, chosen in step one, in the educational program. This observation step can include but is not limited to collecting documents, surveys, classroom observations, interviews, and other types of information gathering techniques. The third step is to assign a numerical value to each of the criteria observed in step two. In one embodiment, the numerical value assigned is any number between 1 and 4. One will easily recognize that the numerical value assigned can be of any range of numbers or letters. The last step, in this embodiment, is to assign an overall rating to the educational program based on an alphanumeric (hereinafter generally referred to as "numeric") valued criteria.

In another embodiment of the invention, the invention describes a method which, firstly, develops criteria which address the strengths and weaknesses of the particular level of the educational program. The second step of the invention is to observe factors in the educational program, with each of the factors relating to one or more of the criteria. Again, the observation step includes information gathering techniques, including but not limited to collecting documents, conducting interviews, surveys, and classroom observation. Each factor is then assigned a numerical value. The numerical values of the factors are sorted to correspond with the one or more criteria to which the factor relates and averaged in order to assign a numerical value for each criterion. The last step of this embodiment of the invention is to assign an overall rating to the educational program based on the numerical values of the criteria.

In a further embodiment of the invention, the invention describes a method of evaluating an educational program which, firstly, develops criteria which address the strengths and weaknesses of the educational program. The second step is to observe factors in the educational program, with each of the factors relating to one or more of the criteria. Again, the observation step includes information gathering techniques, including but not limited to collecting documents, surveys, conducting interviews, and classroom observation. Each factor is then assigned a numerical value. This numerical value is weighted and multiplied by the numerical value to give a weighted numerical value. The weighted numerical values of the factors are sorted to correspond with the one or more criteria to which the factor relates. The weighted numerical values are then averaged within each criterion to give a quantitative value to each criterion. An overall rating is then assigned to the educational program based on the quantitative value of the criteria.

In yet another embodiment of the invention, the invention describes a method of evaluating an educational program which, firstly, develops criteria which address the strengths and weaknesses of the educational program. The criteria are typically age and grade level specific so as to appropriately evaluate the educational program. The second step is to orient personnel involved with the educational program as to the criteria and goals of the method. These personnel include the administration, the staff, the teachers, the parents, and even the children or students, if appropriate. The third step is to observe the criteria in the educational program. As discussed above, the observation step can include any form of information gathering technique. A numerical value is then assigned to the criteria and an overall rating is assigned based on the numerically valued criteria. The last step in this embodiment is to debrief the personnel on the overall rating.

In another aspect of the present invention, one embodiment is directed to a method of improving an educational program. The first step in this embodiment is to evaluate the educational program by assigning an overall rating to the educational program. The rating is based on observations of criteria which address the strengths and weaknesses of the educational program. The second step is to identify the weak areas of the educational program and develop an improvement process to address the weak areas. The next step is to identify the strong areas of the educational program and develop a maintenance program to maintain the strength of the educational program. The last step is to reevaluate the educational program, at some later point in time, to determine the extent of improvement and maintenance.

The present inventors specifically contemplate the invention utilizing an electronic database having the criteria and/or the various factors that make up the criteria in the database. Then, when one observes the criteria, the observations and numerical values associated with each criteria or factor are placed directly into the database. The database then calculates the numerical values for each of the criteria and the overall rating, based on the programming of the database to do so. The database can be contained in a laptop, such that the unit would not require any other inputs. The database can also be placed on a hand-held computing device such that the inputs will be communicated to a parent computer through a communications link or the database can be web-based and accessible through the Internet.

In another embodiment of the invention, the invention comprises a system for evaluating an educational program which utilizes means for developing criteria which address strengths and weaknesses of the educational program, means for observing the criteria in the educational program, means for assigning a numerical value to the criteria; and, means for assigning an overall rating to the educational program based on the numerically valued criteria. The means for accomplishing each of these functions can be embodied in a series of papers filled out by a person, a paper database filled out by a person, an electronic database filled out by a person, or other tools for development, observation and assigning numbers.

These and other objects, features, and advantages of the invention will become apparent from the following best mode description, the drawings and the claims.

BRIEF DESCRIPTION OF THE DRAWINGS

The figures which follow depict at least one embodiment of the invention, and may depict various alternative embodiments. The invention is not limited to the embodiment or embodiments depicted herein since even further various alternative embodiments will be readily apparent to those skilled in the art. For the ease of the reader, like reference numerals in various drawing figures refer to identical elements or components.

DETAILED DESCRIPTION

At the outset, it should be understood that this invention comprises a method of evaluating an educational program that can be applied at any level of education. The description which follows described a preferred embodiment of the invention, and various alternative embodiments. It should be readily apparent to those skilled in the art, however, that various other alternative embodiments may be accomplished without departing from the spirit or scope of the invention.

For the purposes of describing the aspects of the invention, the discussion that follows will discuss the application of the invention to early childhood care and education programs. It should be understood that the invention can be easily adapted to be applied to any level of educational program.

Figure 1:
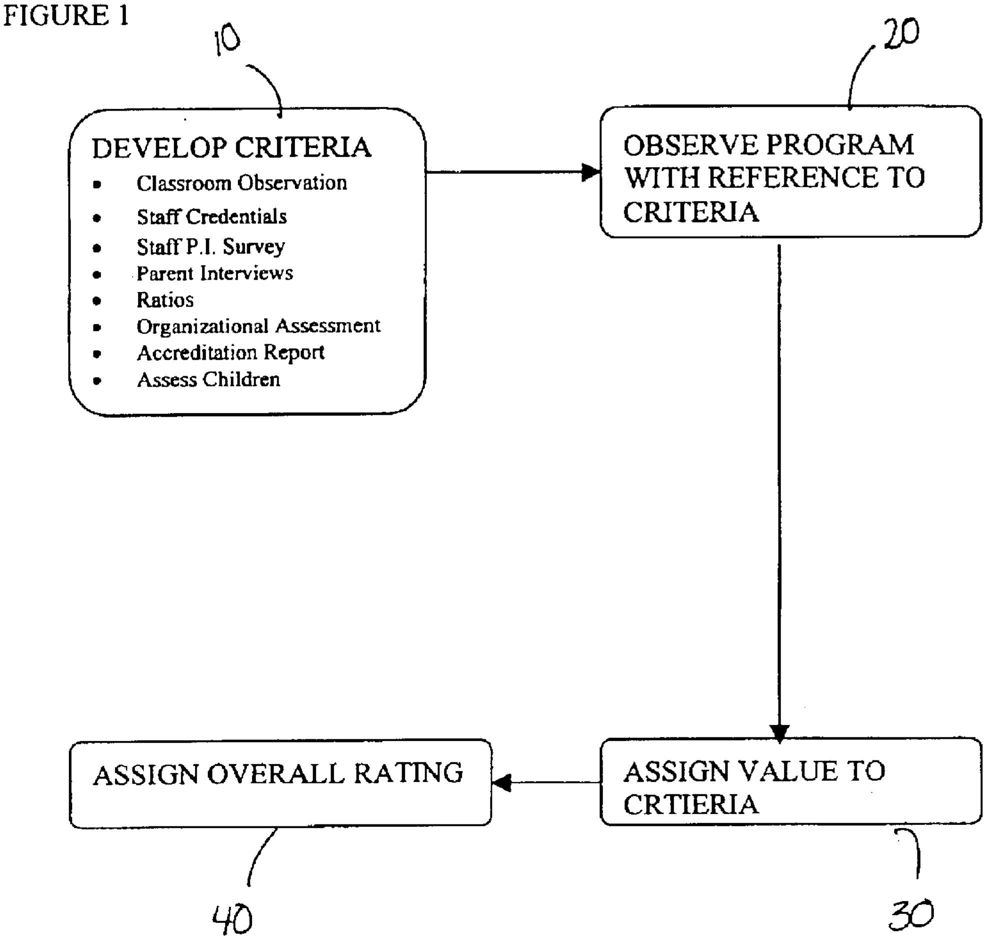
FIG. 1 depicts a flowchart of one embodiment of the method of the invention.

FIG. 1 depicts a flowchart of a method for evaluating educational programs which, firstly, develops criteria which will address the strengths and weaknesses of the educational program. The criteria can be tailored to fit each different level of educational program. The general criteria that would apply, particularly to an early educational program, include but are not limited to classroom environment, accreditation, parent involvement, staff credentials, presence of a curriculum, and staff to child ratios.

Classroom environment can be measured in any number of ways. There are known methods of evaluating classroom environment, including but not limited to the Early Childhood Environment Rating Scale (ECERS-R), the Infant/Toddler Environment Rating Scale (ITERS) or the Family Day Care Rating Scale (FDCRS), all published by Teachers College Press and incorporated in their entireties herein. The ECERS-R and the ITERS recommend observing factors about the classroom such as space and furnishings, personal care routines, language/reasoning activities or materials, physical activities, interaction between staff and children, program structure and interaction between parents and staff. In observing space and furnishings, one focuses not only on the physical furnishings available to the children but to the adequacy and cleanliness of such physical furnishings. For example, one would note the adequacy of lighting and natural lighting, ventilation, temperature control, sound absorbing material, peeling paint, and the sufficiency of the space. The space and furnishings factor also takes into account the furniture and condition of the furniture for routine care, play and learning, relaxation and comfort, privacy, and gross motor equipment and space.

The personal care routine factor looks at greeting and departure rituals, meal and snack schedule and procedures, nap and rest schedule and procedures, toileting and diapering schedule and procedures, health practices such as hand washing, appropriate clothing, and tooth brushing, and safety practices such as clean up of toys, emergency numbers, and presence of safety rules which are explained to the children.

The language/reasoning factor concerns the amount, presence and appropriateness of books and pictures, encouragement of children to communicate, use of logic play such as sequence cards, sorting games, number and math games, and informal use of language on individual bases.

The activities factor described above as one of the factors to observe concerns the development and use of children's fine motor skills, the presence and use of activities related to drama, art, music or movement, the play and use of blocks and block sets, the play and use of sand/water, the presence of nature/science/math activities, the use of television, computers and videos, and the promotion of acceptance of diversity. The interaction factor observes the adequacy of supervision of the children's gross motor activities, supervision in general, discipline of the children, staff-child interactions such as appropriate physical contact, respect for children on the part of the staff, staff's enjoyment of the children, and the interactions between and among the children including resolution of conflicts between children.

The program structure factor is concerned with the scheduling of activities, the presence and amount of free time and group time, and the adequacy of provisions for children with disabilities. The parents and staff factor observes the accommodations made for parents such as allowing parents to observe the child in group and prior to enrollment, brochures or other types of program descriptions given to parents, annual parent evaluations. This factor also observes the provision made for the staff such as a separate washroom, area to store personal belongings away from the children, and amount and flexibility of breaks. The parents and staff factor also observes the adequacy of the provisions for the professional needs of the staff and the staff interaction and cooperation, the supervision and evaluation of staff, and opportunities for professional growth are offered to the staff. The Center for the Child Care Workforce issues publications on creating Better Child Care Jobs, Creating Better Family Child Care Jobs and Model Work Standards for child care workers. These brochures are incorporated in their entireties by reference herein. The Model Work Standards for Child Care Workers include standards on wages, benefits, job descriptions and evaluations, hiring and promotions, termination, suspension, severance and grievance procedures, classroom assignments, hours of work and planning time, communication, team building and staff meetings, decision making and problem solving, professional development, professional support, diversity, health and safety, and physical space requirements.

The FDCRS recommends observing factors such as space and furnishings, basic care, language and reasoning, learning activities, social development, and adult needs. The space and furnishings factor analyzes the presence of furnishings for routine care and learning, the presence of furnishings for relaxation and comfort, the presence and use of a child-related display, the indoor space arrangement, the provisions for active physical play, and the provision of space for the child to be alone. The basic care factor includes observing the arrival and departure of the children, the provision of meals and snacks, the provision of nap and rest time, provision for the diapering and toilet needs of the children, attention paid to personal grooming, and the health and safety of the home.

The language and reasoning factor observes the informal use of language in relating to the children, whether the care giver helps children understand language, whether the care giver helps children use language, and whether the care giver helps children reason through the use of sequence cards, etc. The learning activities factor assesses whether the family home provides for hand to eye development, art, music and movement, sand and water play, blocks, and dramatic play activities for the children. The learning activities factor also assesses the use of television as an activity, schedule of activities, and supervision of play indoors and outdoors.

The social development factor observes the care giver's tone when interacting with the children, the care giver's discipline of the children, and the care giver's cultural awareness and diversity as assessed by the racial variety shown in books, pictures, and other play toys. The adult needs factor is analyzed by observing the care giver's relationship with the parents of the children, how the care giver balances personal and care giving responsibilities, and the care giver's opportunities for professional growth.

The Model Work Standards for Family Child Care Jobs includes standards on provider income, provider benefits, hours of work, provider-parent communication, professional development, work environment, community support in case emergencies arise, and standards for the provider becoming an employer. These Model Work Standards are also included as factors to be observed and accounted for in the classroom observation criteria, the staff credentials criteria, and the accreditation criteria of the educational program.

The present inventors contemplate using one of these known methods of classroom environment to accomplish the step of observing the classroom environment. However, such contemplation of use of known methods of classroom observation does not preclude the present inventors from developing their own methods of classroom environment observation or from using such developed methods as part of the present invention. The present inventors currently contemplate developing their own a methodology for observing classroom environment, specifically to streamline the observation from the intricacies and overlapping areas of the known methodologies.

The second step of the method is to observe the criteria, chosen in step one, in the educational program. This observation step can include but is not limited to collecting documents, reviewing financial information about the educational program, classroom observations, interviews, and other types of information gathering techniques. It should be understood that, throughout each of the descriptions of the various embodiments of the invention described herein, that the data collection, observation and criteria can be accomplished either through traditional paper processing methods and/or also through electronic processing methods, either through the use of laptop computers with a database of the various criteria programmed therein or through the use of hand-held electronic devices and communication links to allow the hand-held devices to communicate with a parent computer. Should an electronic processing method be used in the collection and observation of the criteria, it follows that the subsequent steps can also be conducted through electronic processing means.

The third step is to assign a numerical value to each of the criteria observed in step two. This, again, can be performed either through paper processing or electronic processing methods. In one embodiment, the numerical value assigned is any number of stars between 1 and 4. One will easily recognize that the numerical value assigned can be of any range of numbers or rating symbols such as stars, circles, dollar signs or the like. The classroom environment criteria, according to one embodiment of the present invention, requires minimum scores, as rated according to FDCRS, ECERS-R and ITERS, as follows:

3.00 in order to achieve one star;

3.51 in order to achieve two stars;

4.26 in order to achieve three stars; and, 5.00 in order to achieve four stars.

The accreditation criteria reflects whether the educational program is accredited by appropriate state, local or federal institutions, or as discussed in more detail in the appendix hereto, by a nationally recognized professional association such as the National Association for the Education of Young Children or the National Association of Family Child Care. Moreover, such professional associations are typically non-governmental organizations, and such professional associations require a child care provider to complete an extensive self-study of all aspects of early child care and education. Moreover, such associations perform on-site visits to assure accreditation criteria are satisfied. Note that such non-governmental accrediting associations accredit a plurality of independently owned and operated child care facilities, as one skilled in the art will readily understand. In one embodiment of the invention, accreditation is required in order to achieve a four star rating. In another embodiment of the invention, two points are assigned to the accreditation criteria when accreditation is achieved and as maintained.

The parent involvement criteria focuses on an evaluation of fourteen factors reflecting basic communication and responsiveness to parent perspectives. In one embodiment, increasing expectations are set for these criteria as the level and types of parent involvement become more sophisticated. There are 6 types of parent involvement: parenting, communicating, participating or volunteering, learning at home, decision-making or leadership, and community involvement. A Parenting parent typically creates a home environment that supports the child's healthy growth and development. A Communicating parent typically shares information about the child's progress, significant events, interests, and the parent's child-rearing philosophy and educational goals. A Participating/Volunteering parent typically takes part in classroom and program activities as a member of program "community", e.g. volunteering in the classroom, helping with fund-raising, attending family events, donating materials or expertise. A Learning at Home parent typically provides activities to stimulate children's learning and development, e.g. reading to children, making drawing materials available, playing matching games, having conversations about shared experiences. A Decision-Making/Leadership parent advocates and provides guidance on issues that affect the parent's child or children in the program, e.g. setting learning goals with staff, sitting on an advisory board, or speaking at public meetings. Finally, a Community Involvement parent takes part in groups and activities and uses community resources, takes an active role as a community member, e.g. being active in a faith community, being a scout leader, supporting cultural events. Thus, as the sophistication of the parents of children in the educational program increase, more involvement is expected from those parents.

The fourteen criteria and their effects on the star rating assigned to this criteria as part of one embodiment of the present invention is described in Table 1.

TABLE 1

| Parent Involvement Criteria | | | | |
|---|---|---|---|---|
| Factor | Star 1 | Star 2 | Star 3 | Star 4 |
| Program documents providing written information on program philosophy, policies & procedures | REQ'D. | REQ'D. | REQ'D. | REQ'D. |
| Program documents orientation to the program for both parent and child prior to or immediately following enrollment | " | " | " | " |
| Program reports timely notification of major changes in program or policies (e.g. change in teach, change in fees, change in schedule) and no more than 25% of parents report lack of timely notification | " | " | " | " |
| 75% of parents report that program welcomes visits by parent at all times | " | " | " | " |
| 75% of parents report at least adequate information from program on child's day-to-day physical and emotional well-being | Min. score of 3 | Min. score of 3 | Min. score of 4 | Min. score of 4 |
| 75% of parents report at least adequate response by program to parent concerns & suggestions | Min. score of 3 | Min. score of 3 | Min. score of 4 | Min. score of 4 |
| 75% of parents report at least adequate information from program on child's daily activities, i.e., how each day is planned, what child enjoys, how he/she plays with other children, etc. | NA | Min. score of 3 | Min. score of 4 | Min. score of 4 |
| 75% of parents report being at least somewhat comfortable asking teacher for information on child development or parenting techniques | " | Min. score of 3 | Min. score of 3 | Min. score of 4 |
| Program documents conducting planned individual parent conferences at least annually to discuss child's progress and plans to meet learning goals | " | REQ'D. | REQ'D. | REQ'D. |
| 75% of parents report receiving at least adequate information from program on learning goals for children, teaching approaches, how behavior is managed in class, etc. | " | NA | Min. score of 3 | Min. score of 4 |
| 50% of parents who have offered ideas/suggestions to the program report that suggestions are implemented | " | " | REQ'D. | REQ'D. |
| 75% of parents report receiving at least adequate information from the program about community services | " | " | Min. score of 3 | Min. score of 4 |
| Program documents regularly including parents in program evaluation | " | " | NA | REQ'D. |
| Program staff and parents report planned, successful activities in these types of parent involvement:<br>parenting<br>communication<br>participating/volunteering<br>learning at home<br>leadership/decision-making<br>community involvement | No add'l requirements | α | α α | α α α |

α-In addition to required activites, staff AND at least 40% of parents as an aggregate identify activities in at least two of the six types of parent involvement.

TABLE 1-continued

| Parent Involvement Criteria | | | | |
|---|---|---|---|---|
| Factor | Star 1 | Star 2 | Star 3 | Star 4 |

α α-In addition to required activities, staff AND at least 60% of parents as an aggregate identify acivities in at least four of the six types of parent invention. Program has a written, cohesive plan for parent involvement
α α α-In addition to required activities, staff AND at least 75% of parents as an aggregate identify activities in at least five of the six types of parent involvement. Parent involvement is an integral part of an annual program plan and evaluation.

α—In addition to required activities, staff AND at least 40% of parents as an aggregate identify activities in at least two of the six types of parent involvement.

αα—In addition to required activities, staff AND at least 60% of parents as an aggregate identify activities in at least four of the six types of parent invention. Program has a written, cohesive plan for parent involvement.

ααα—In addition to required activities, staff AND at least 75% of parents as an aggregate identify activities in at least five of the six types of parent involvement. Parent involvement is an integral part of an annual program plan and evaluation.

The staff credentials criterion observes the professional credentials for each staff member with specific expectations for education, experience and position. Individual staff ratings are averaged by position and weighted and a number is assigned for this criteria. The staff to child ratios criterion focuses on the number of staff to children. In one embodiment of the present invention, for educational program centers, the expectations of the ratio increases from licensing up through standards set by national accrediting bodies. For full-day programs, target ratios should be maintained for 76 of 80 time stamps over 20 days of data collection. For part-day programs, target ratios should be met for 19 of 20 time stamps over 20 days. For one embodiment of the present invention, the target ratios are also geared to specific age groups as shown in Table 2.

TABLE 2

| Target Ratios based on Age Groups | | | | |
|---|---|---|---|---|
| AGE GROUP | Star 1 | Star 2 | Star 3 | Star 4 |
| 0–18 mos. | 1:5 | 1:4 (¾ time stamps) | 1:4 all day | 1:3 |
| 18–24 mos. | 1:5 | 1:4 (¾ time stamps) | 1:4 all day | 1:3 |
| 24–36 mos. | 1:7 | 1:6 (¾ time stamps) | 1:6 all day | 1:5 |
| 30–36 mos. | 1:8 | 1:7 (¾ time stamps) | 1:7 all day | 1:6 |
| 36–48 mos. | 1:10 | 1:9 (¾ time stamps) | 1:9 all day | 1:8 |
| 48–60 mos. | 1:12 | 1:10 (¾ time stamps) | 1:10 all day | 1:8 |

In other age groupings, one embodiment of the present invention recommends using the staff ratio for the youngest child if more than 20% of the group is composed of younger children. In one embodiment of the present invention, for family homes, the staff to child ratios described in the licensing requirements are required to earn any points. In this embodiment, 4 points are assigned to the family home if in compliance with licensing requirements.

The last step, in this embodiment, is to assign an overall rating to the educational program based on the numerically valued criteria. This overall rating can be accomplished using a number of numerical methods including but not limited to averaging, weighting and averaging, or addition of the scores of the various criteria developed in step one, observed in step two, and rated in step three. The overall rating can be calculated using conventional mathematical tools or can be calculated through electronic processing means. In one embodiment of the invention, the points assigned to each criterion are added up and the following minimum points required for each star rating is assigned. For child care centers, as described in one embodiment of the invention, the required total scores overall rating is as follows:

8 points minimum for Star 1;

16 points minimum for Star 2;

24 points minimum for Star 3; and, 32 points minimum for Star 4.

For family homes, as described in one embodiment of the invention, the required total scores for the overall rating is as follows:

10 points minimum for Star 1;

16 points minimum for Star 2;

22 points minimum for Star 3; and, 28 points minimum for Star 4.

It should be recognized that the overall points required can be modified or adjusted to accurately reflect the quality of the program. In addition, if a different basis for scoring is chosen, then the overall rating minimum points will change as well. For example, if a ten-star rating program is chosen, then the overall rating minimum values should be adjusted to reflect the ability to achieve ten stars versus four. The above description is only one method of accomplishing the goal and spirit of the invention.

Figure 2:
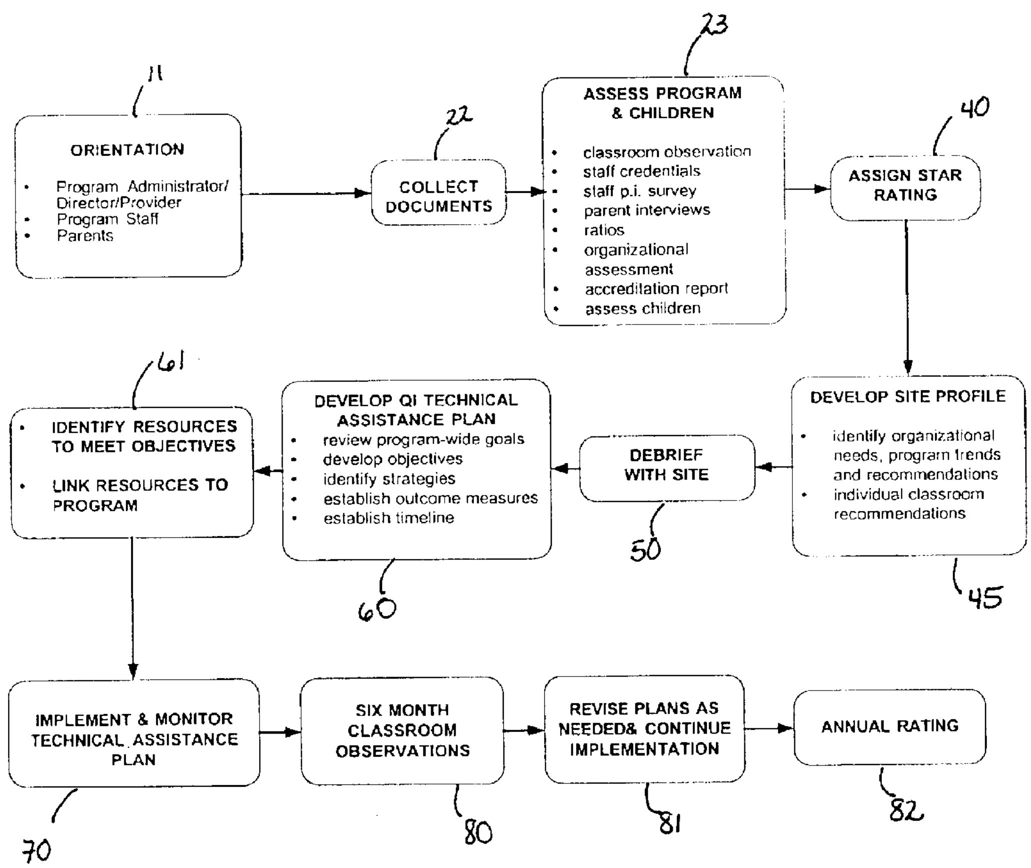
FIG. 2 depicts a flowchart of another embodiment of the method of the invention.

FIG. 2 shows a method of improving an educational program according to the invention. The first step in this embodiment is to evaluate the educational program by assigning an overall rating to the educational program, shown in FIG. 2 by elements 11, 22, 23, and 40. The rating is based on observations of criteria which address the strengths and weaknesses of the educational program. For the purposes of having personnel involved in the educational program understand the process, in one embodiment of the invention, a site profile 45 can be developed. The second step, shown by elements 45, 60, and 61 of FIG. 2, is to identify the weak areas of the educational program and develop an improvement process to address the weak areas. The next step, also subsumed in elements 45, 60, and 61 in FIG. 2, is to identify the strong areas of the educational program and develop a maintenance program to maintain the strength of the educational program. The maintenance programs and the improvement processes are then implemented, shown by element 70. The last step is to reevaluate the educational program, at some later point in time, to determine the extent of improvement and maintenance, shown in FIG. 2 by elements 80, 81 and 82. Element 80 describes a six month reevaluation period. It should be recognized that any period of time can be chosen in which to reevaluate the programs. Element 81 provides the option of revising the programs and processes implemented during the first evaluation of the program in order to provide flexibility to the improvement processes and maintenance programs. Element 82 provides for annual overall rating to be assigned to the educational program. Of course, the overall rating can be assessed on a bi-annual, semesterly, quarterly, or monthly assessment, dependent on the particular needs of the educational program.

Figure 3:
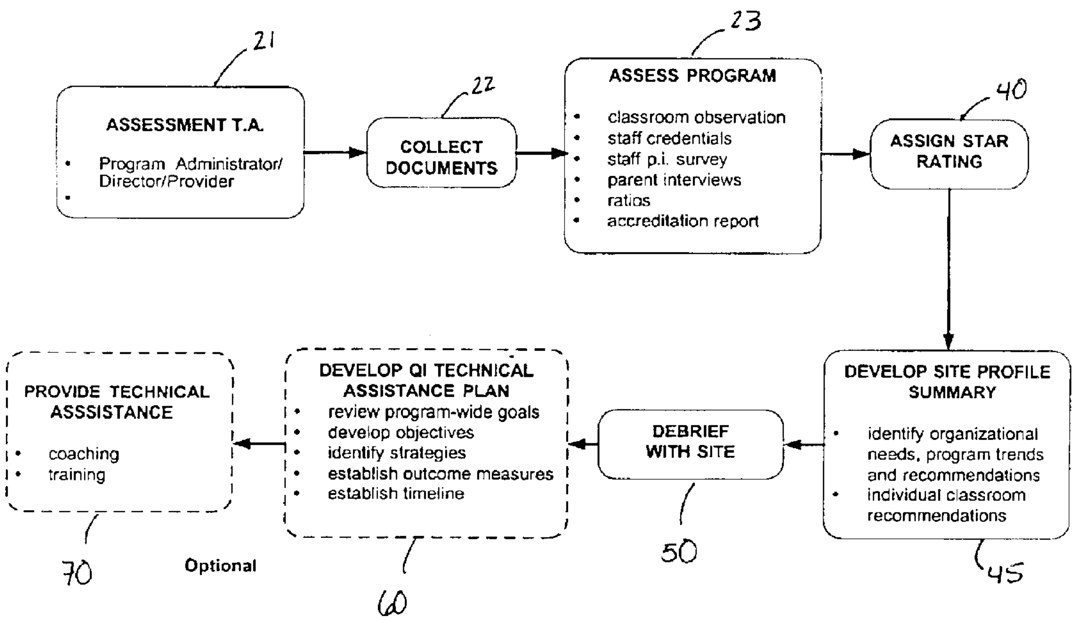
FIG. 3 depicts a flowchart of one embodiment of the method of the invention.

FIG. 3 depicts another embodiment of the invention. In this embodiment, the invention describes a method of evaluating an educational program which, firstly, develops criteria which address the strengths and weaknesses of the educational program (not shown in FIG. 3). The criteria are typically age and grade level specific so as to appropriately evaluate the educational program. The second step is to conduct an assessment of the educational program with the program administrators.

The third step, shown by elements 21, 22, and 23, is to observe the criteria in the educational program. As discussed above, the observation step can include any form of information gathering technique. A numerical value is then assigned to the criteria and an overall rating is assigned based on the numerically valued criteria, shown by element 40. The last step in this embodiment is to debrief the personnel on the overall rating, shown by element 50. As an option in one of the embodiments of the invention, a site profile can be developed. The site profile can provide general guidance to the educational program such as identifying the organization's needs, program trends and providing recommendations regarding the general organization's needs and program trends. The site profile can also be broken into specific classroom recommendations and guidance. FIG. 3 also provides an additional optional step of the development of a quality technical assistance plan, shown as element 60, that will review the program-wide goals, develop objectives to be achieved, identify strategies for accomplishing the objectives, establish outcome measures by which the educational program can measure success, and establish a timeline in which the educational program will achieve the objectives. As an additional step, not shown in FIG. 3, the educational program can be reassessed and reevaluated according to the present invention at some point in the timeline to determine whether the overall star rating improves or changes based on the implementation of the technical assistance plan. A further additional optional step, shown by element 70, is the provision of technical assistance, in the form of coaching and training programs, in implementing the technical assistance plan.

Figure 4:
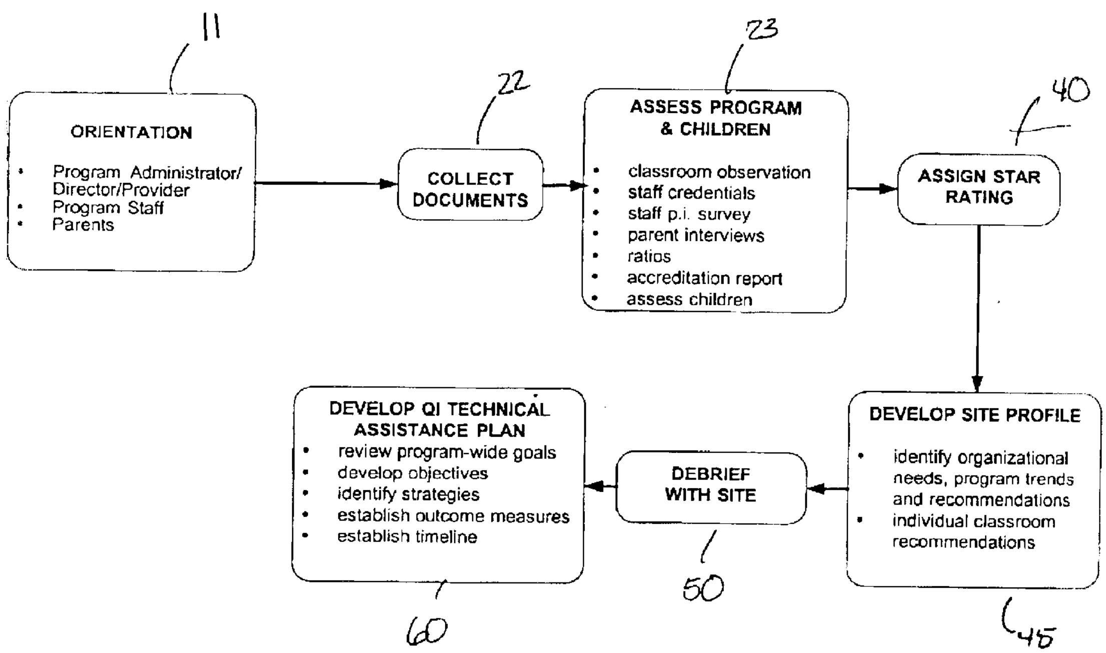
FIG. 4 depicts a flowchart of one embodiment of the method of the invention.
Figure 1:
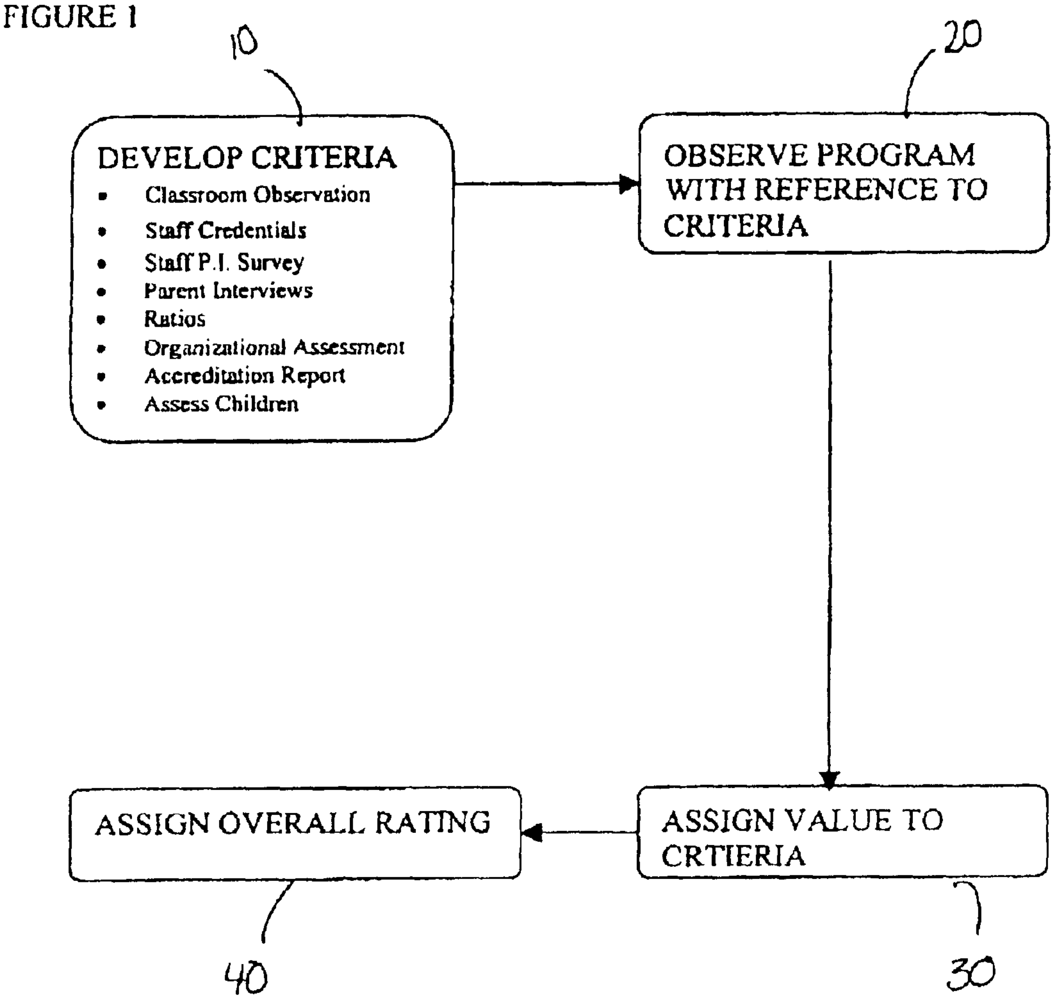
Figure 2:
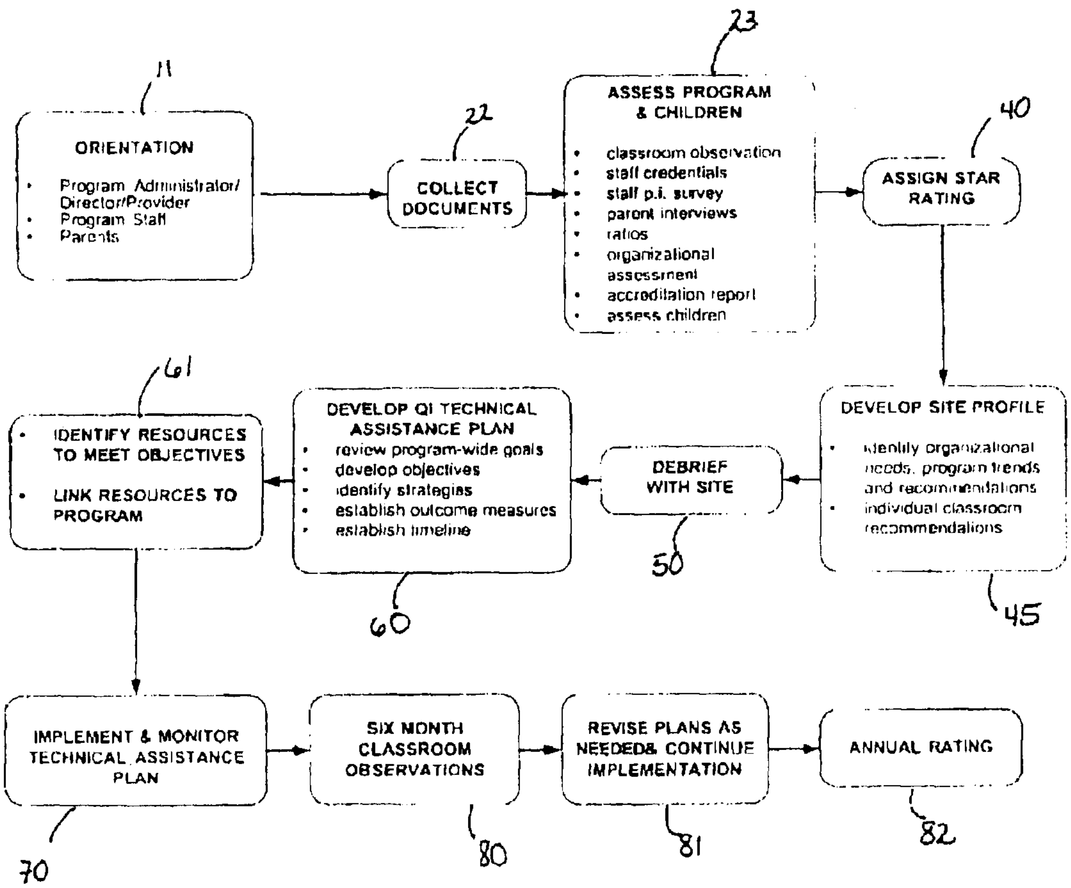
Figure 3:
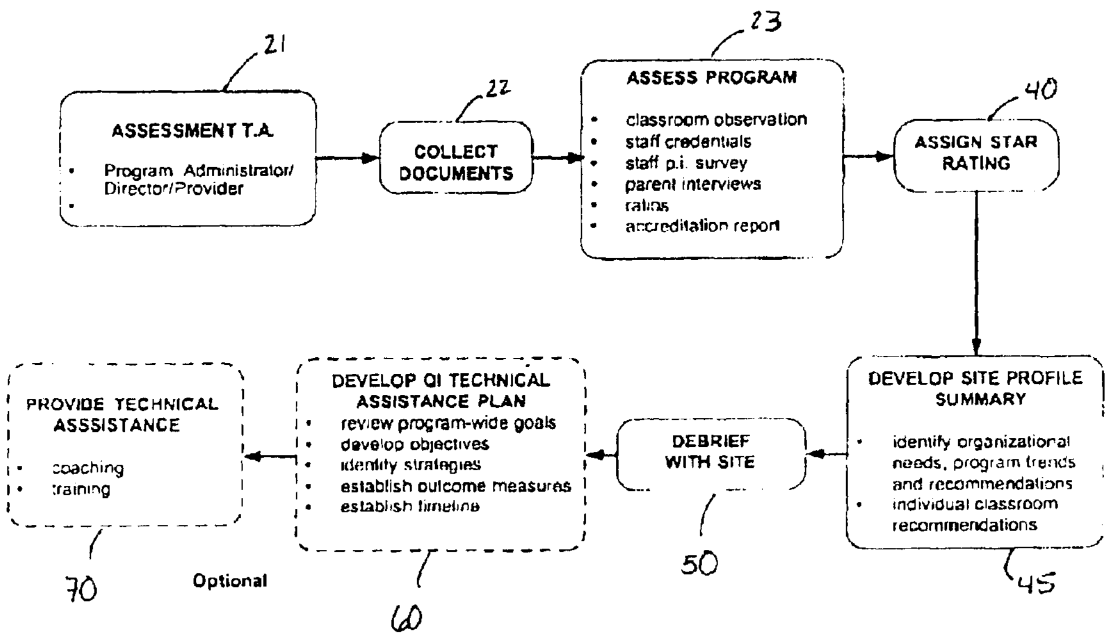
Figure 4:
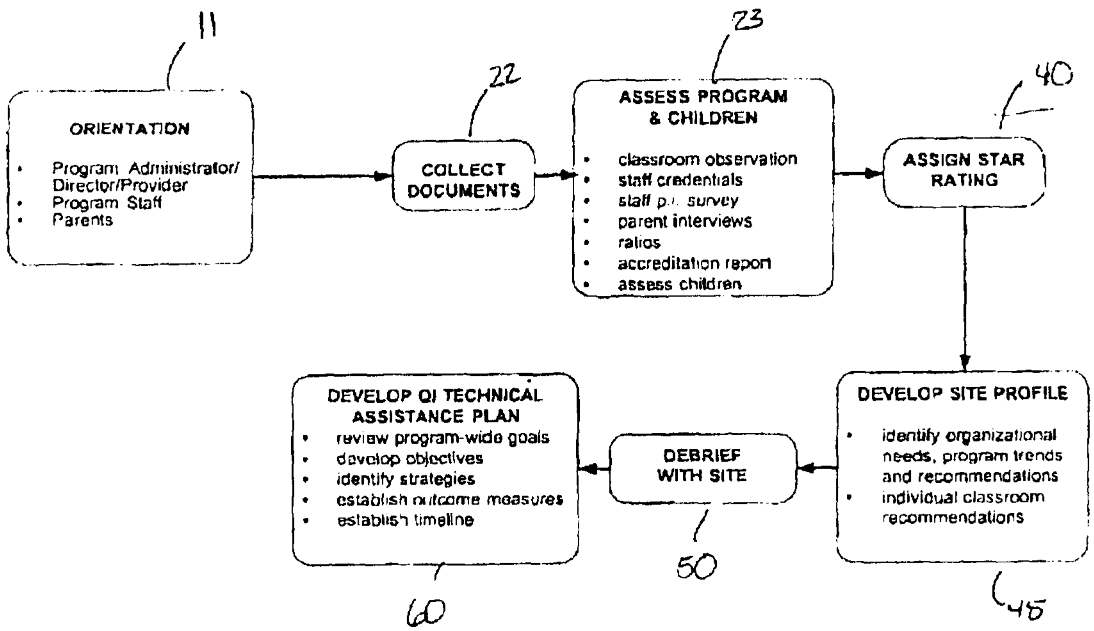
Figure 1:
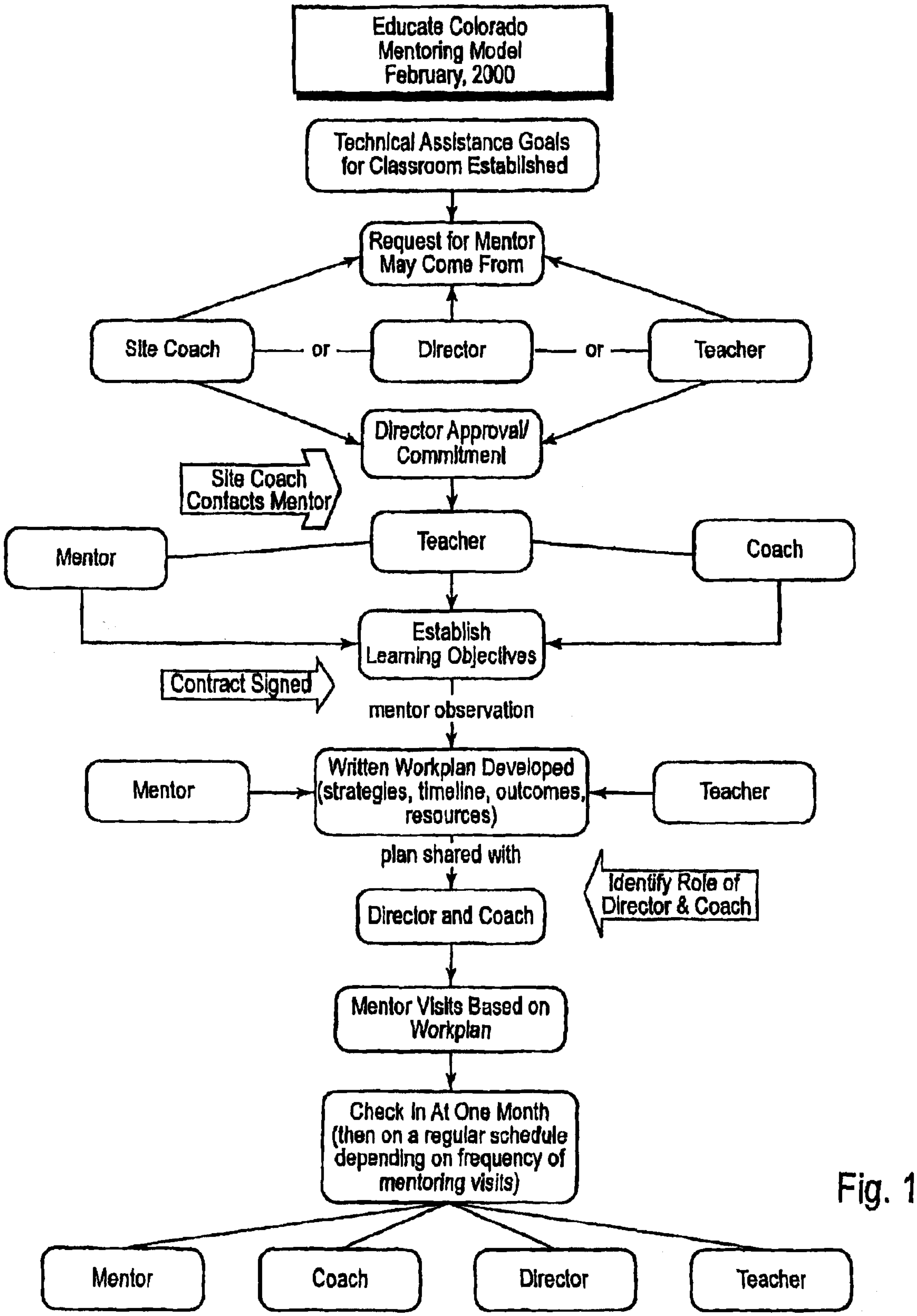

FIG. 4 depicts yet a further embodiment of the present invention. In this embodiment, the invention describes a method of evaluating an educational program which, firstly, develops criteria which addresses the strengths and weaknesses of the educational program (not shown in FIG. 4). The criteria is typically age and grade level specific so as to appropriately evaluate the educational program. The second step is to orient personnel involved with the educational program as to the criteria and goals of the method. These personnel include the administration, the staff, the teachers, the parents, and even the children or students, if appropriate. This orientation can take place through presentations, meetings, and other public forum functions. In one embodiment, the orientation is separated into groups, for example, the orientation of the administrators involved in the program are oriented, the staff is oriented in a separate session and the parents are oriented in yet another session. Of course, the present inventors contemplate conducting the orientation in one group or any number of groupings, depending on the dynamics of the educational program to be oriented. In one embodiment, this orientation step can also include training of site coaches or persons who will be conducting the assessment. It can also include the training of those persons who will be provide the quality improvement coaching and training, following the assessment.

The third step, shown by elements 21, 22, and 23, is to observe the criteria in the educational program. As discussed above, the observation step can include any form of information gathering technique. A numerical value is then assigned to the criteria and an overall rating is assigned based on the numerically valued criteria, shown by element 40. The embodiment depicted in FIG. 4 contemplates that a site profile, shown by element 45, will be developed. The site profile can provide general guidance to the educational program such as identifying the organization's needs, program trends and providing recommendations regarding the general organization's needs and program trends. The site profile can also be broken into specific classroom recommendations and guidance. The next step in this embodiment is to debrief the personnel on the overall rating, shown by element 50. The last step in the embodiment depicted in FIG. 4 contemplates the development of a quality technical assistance plan, shown as element 60, that will review the program-wide goals, develop objectives to be achieved, identify strategies for accomplishing the objectives, establish outcome measures by which the educational program can measure success, and establish a timeline in which the educational program will achieve the objectives. As an additional step, not shown in FIG. 4, the educational program can be reassessed and reevaluated according to the present invention at some point in the timeline to determine whether the overall star rating improves or changes based on the implementation of the technical assistance plan.

The present inventors specifically contemplate the invention utilizing an electronic database having the criteria and/or the various factors that make up the criteria in the database. Then, when one observes the criteria, the observations and numerical values associated with each criteria or factor are placed directly into the database. The database then calculates the numerical values for each of the criteria and the overall rating, based on the programming of the database to do so. The database can be contained in a laptop, such that the unit would not require any other inputs. The database can also be placed on a hand-held computing device such that the inputs will be communicated to a parent computer through a communications link or the database can be web-based and accessible through the Internet.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Nor should any particular series of steps in any method deemed rigid—the present invention comprises the enumerated steps, but not necessarily in any particular order/sequence. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. A method of evaluating an educational program for children ages 0 to 5 years old, comprising the steps of:

(a) developing criteria which address strengths and weaknesses of the educational program, wherein said criteria includes each of (a1) through (a3) following:
  (a1) an educational program staff to child classroom ratio;
  (a2) educational program staff education qualifications including (a2-1) through (a2-3) following:
    (a2-1) qualifications for staff educational degrees,
    (a2-2) a qualification for duration of paid experience in educating children, and
    (a2-3) qualifications for college course credits in child development; and
  (a3) at least a predetermined majority of parents, having a child in the educational program, responding with parental responses indicating each of the following (a3-1) through (a3-3):
    (a3-1) the educational program welcomes visits by the parents at substantially all times;
    (a3-2) receiving at least adequate information on their child's daily activities in the educational program; and
    (a3-3) receiving at least adequate information from the educational program on each of (a3-3-1) through (a3-3-3) following:
      (a3-3-1) learning goals for children in the educational program,
      (a3-3-2) teaching approaches for children in the educational program,
      (a3-3-3) how child behavior is managed in a classroom environment;

(b) determining how the criteria relates to the educational program, and storing results from said determining step for use by an electronic computational device;

(c) determining from said stored results, a numerical value for each of a plurality of different portions of the results;

wherein said plurality of different portions of the results includes data for assigning such a numerical value to at least some of the following (c1) through (c5) following:
  (c1) a classroom environment for the educational program;
  (c2) accreditation by one or more of: (i) a state, local, or federal institution, and (ii) a non-governmental association that accredits a plurality of independently owned and operated child care facilities;
  (c3) involvement of parents having a child in the educational program;
  (c4) educational credentials of staff at the educational program; and
  (c5) ratios of educational program staff to children in the educational program;

(d) using a computational device for combining said assigned numerical values for obtaining an overall rating for the educational program, wherein said overall rating designates a quality of child care;

(e) assigning the overall rating to the educational program;

(f) providing a communications network interface for accessing the overall rating of the educational program; and (g) transmitting the overall rating to a user accessing the network interface so that the overall rating can be presented to the user.

2. A method of evaluating an educational program for children ages 0 to 5 years old, comprising the steps of:

(a) developing educational program criteria for evaluating the educational program;

(b) receiving data indicative of factors related to operation of the educational program, wherein for each of said factors, its indicative data relates to one or more portions of the criteria;

(c) assigning a corresponding numerical value to each of the factors, wherein for each of the factors, the corresponding numerical value is determined using the corresponding data indicative of the factor;

(d) sorting the numerical values of the factors to correspond with the one or more criteria to which the factors relate;

(e) for each of the portions of the criteria, averaging the numerical values of the factors whose corresponding data relate to the portion, thereby giving a resulting numerical value for the portion; and, (f) assigning an overall rating to the educational program based on the resulting numerical values, wherein said overall rating is determined by an electronic computational device combining said resulting numerical values;

(g) providing a communications network interface for accessing the overall rating of the educational program; and (h) transmitting the overall rating to a user accessing the network interface so that the overall rating can be presented to the user;

wherein the criteria for the educational program include provisions for assessing a classroom environment, an accreditation of the educational program, a parent involvement, staff credentials, a presence of a curriculum and staff to child ratios;

wherein one or more of the provisions for assessment of the parent involvement include identifying levels and types of parent involvement by evaluating information indicative of basic communicating and interaction of the parents having a child in the educational program with the educational program; and wherein the information indicative of the basic communication and interaction consists of a least most of (1) through (14) following:

(1) educational program documents providing written information on the educational program's philosophy, policies and procedures;

(2) educational program documents providing orientation to the educational program for both parent and child prior to or immediately following enrollment;

(3) (i) and (ii) following: (i) educational program reports timely providing notification of a change in educational program policies, and (ii) documentation indicating that a low percentage of the parents report lack of timely receiving such notification, wherein said low percentage is no more than 50%;

(4) a first high percentage of the parents report that the educational program welcomes visits by the parents at all times, wherein said first high percentage is greater than 50%;

(5) a second high percentage of the parents report at least adequate information from the educational program on their child's physical and emotional well-being, wherein said second high percentage is greater than 50%;

(6) a third high percentage of the parents report at least adequate response by the educational program to parent concerns and suggestions, wherein said third high percentage is greater than 50%;

(7) a fourth high percentage of the parents report at least adequate information from the educational program on their child's daily activities, wherein said fourth high percentage is greater than 50%;

(8) a fifth high percentage of the parents report being somewhat comfortable asking educational program staff for information on child development or parenting techniques, wherein said fifth high percentage is greater than 50%;

(9) educational program documents related to planned individual parent conferences at least annually to discuss a child's progress and plans to meet learning goals;

(10) a sixth high percentage of the parents report receiving at least adequate information from the educational program on learning goals for children and teaching approaches, wherein said sixth high percentage is greater than 50%;

(11) a majority of the parents who have offered ideas or suggestions to the educational program report that the ideas or suggestions are implemented;

(12) a seventh high percentage of the parents report receiving at least adequate information from the educational program about community services, wherein said seventh high percentage is greater than 50%;

(13) educational program documents regularly include the parent's evaluation of the educational program; and,

(14) educational program staff and the parents report planned, successful activities in parent involvement directed to parenting, communication, participating or volunteering, learning at home, leadership or decision-making, and community involvement.

3. A method of evaluating an educational program according to claim 1, wherein the overall rating is computed by averaging the numeric values.

4. A method of evaluating an educational program according to claim 1, wherein the overall rating is computed by weighting the numeric values and averaging the weighted numeric values.

5. A method of evaluating an educational program according to claim 1, wherein the overall rating comprises a four-star system, with one star or less representing a lowest rating and each successive increase in stars is indicative of a higher quality rating for the educational program, with four stars representing a highest rating.

6. A method of evaluating an educational program according to claim 1, wherein said step of developing includes:

placing a representation of the criteria of step (a) in an electronic database; and entering said numerical values into the database once said numerical values are determined by the computational device.

7. A method of evaluating an educational program according to claim 1, wherein the step (b) of determining includes collecting educational program related data from at least some of: classroom observations, interviews with personnel of the educational program, a review of credentials of personnel of the educational program, and interviews with the children and parents patronizing the educational program.

8. A method of evaluating an educational program according to claim 1, wherein one of the numerical values is for the classroom environment of (c1), and the one numerical value is obtained from data related to at least most of (i) through (x) following: (i) space and furnishings occupied by the educational program, (ii) personal care routines used by the educational program, (iii) language activities provided by the educational program, (iv) reasoning activities provided by the educational program, (v) language materials provided by the educational program, (vi) reasoning materials provided by the educational program, (vii) child care program structure provided by the educational program, (viii) physical activities provided by the educational program, (ix) interaction between the staff and children in the educational program, and (x) interactions between parents of children in the educational program and the staff of the educational program.

9. A method of evaluating an educational program according to claim 2, wherein the overall rating comprises a ranking having four ranks, wherein the ranks are linearly ordered.

10. A method of evaluating an educational program according to claim 2, wherein said step of developing includes:

placing a representation of the criteria of step (a) and the data indicative of the factors of step (b) in an electronic database;

entering said numerical values of step (c) into the database; and, calculating, within the database, the overall rating of the educational program.

11. A method of evaluating an educational program according to claim 2, wherein the receiving step includes collecting documents, classroom observations, interviews with personnel of the educational program, review of credentials of personnel of the educational program, interviews with the students and parents patronizing the educational program, surveys, and other information gathering techniques.

12. A method of evaluating an educational program according to claim 2, wherein the provisions for assessing the classroom environment includes observing space and furnishings, personal care routines, language activities, reasoning activities, language materials, reasoning materials, program structure, physical activities, interaction between staff and children, interactions between parents and staff.

13. A method of evaluating an educational program according to claim 2, wherein the provisions for assessing the accreditation of the educational program includes an analysis of whether the educational program is accredited by one or more of: (i) a state, local or federal institutions, and (ii) a non-governmental association that accredits a plurality of independently owned and operated child care facilities.

14. A method of evaluating an educational program according to claim 2, wherein the provisions for assessing the staff credentials includes an analysis of the credentials of each staff member.

15. A method of evaluating an educational program according to claim 2, wherein the provisions for assessing the staff to child ratios includes an analysis of whether the educational program meets target ratios of staff to child based on age groups.

16. A method of evaluating an educational program according to claim 15, wherein the target ratios for an age group of 0 to 18 months of age ranges from a low end of 1 staff person to 5 children, to a high end of 1 staff person to 3 children.

17. A method of evaluating an educational program according to claim 15, wherein the target ratios for an age group of 18 to 24 months of age ranges from a low end of 1 staff person to 5 children, to a high end of 1 staff person to 3 children.

18. A method of evaluating an educational program according to claim 15, wherein the target ratios for an age group of 24 to 36 months of age ranges from a low end of 1 staff person to 7 children, to a high end of 1 staff person to 5 children.

19. A method of evaluating an educational program according to claim 15, wherein the target ratios for an age group of 30 to 36 months of age ranges from a low end of 1 staff person to 8 children, to a high end of 1 staff person to 6 children.

20. A method of evaluating an educational program according to claim 15, wherein the target ratios for an age group of 36 to 48 months of age ranges from a low end of 1 staff person to 10 children, to a high end of 1 staff person to 8 children.

21. A method of evaluating an educational program according to claim 15, wherein the target ratios for an age group of 48 to 60 months of age ranges from a low end of 1 staff person to 12 children, to a high end of 1 staff person to 8 children.

22. The method of claim 1, wherein the communications network is the Internet.

23. The method of claim 2, wherein the communications network is the Internet.

* * * * *

UNITED STATES PATENT AND TRADEMARK OFFICE

CERTIFICATE OF CORRECTION

PATENT NO. : 6,916,180 B1 
DATED : July 12, 2005
INVENTOR(S) : Price et al.

It is certified that error appears in the above-identified patent and that said Letters Patent is hereby corrected as shown below:

Title page,
Item [73], Assignee, delete "Qualistar Colorado" and replace with
-- Qualistar Early Learning --.

Column 7,
Line 38, delete "a".

Column 8,
Line 8, start a new paragraph with the phrase "5.00 in order to achieve four stars.".

Column 9,
Line 64, delete "α-In addtion to required activities, staff AND at least 40% of parents as an aggregate identify acitvities in at least two of the six types of parent involvement" immediately following Table 1.".

Column 10,
Lines 1-12, delete in their entirety.

Column 11,
Line 10, start a new paragraph with "32 points minimum for Star 4.".
Line 17, start a new paragraph with "28 points minimum for Star 4.".

Column 13,
Line 49, immediately before "What is claimed is:," insert -- Appendix A. --.

Column 15,
Line 13, insert -- : -- (a colon) immediately after "assessing.".
Line 16, insert -- , -- (a comma) immediately after "lum.".
Line 20, delete "communicating" and insert -- communication --.
Line 24, delete "a least" and insert -- at least --.

UNITED STATES PATENT AND TRADEMARK OFFICE

CERTIFICATE OF CORRECTION

PATENT NO. : 6,916,180 B1
DATED : July 12, 2005
INVENTOR(S) : Price et al.

It is certified that error appears in the above-identified patent and that said Letters Patent is hereby corrected as shown below:

Column 10,
Line 18, delete "invention" and insert -- involvement --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,916,180 B1
APPLICATION NO. : 10/057273
DATED : July 12, 2005
INVENTOR(S) : Douglas Price et al.

It is certified that error appears in the above-identified patent and that said Letters Patent is hereby corrected as shown below:

Delete the title page and substitute therefore the attached title page showing the correct name of assignee.

Delete Columns 1-18 and substitute therefore the attached Columns 1-374 consisting of specification, claims and appendix.

This certificate supersedes the Certificate of Correction issued December 27, 2005.

Signed and Sealed this

Seventeenth Day of August, 2010

David J. Kappos
*Director of the United States Patent and Trademark Office*

(12) United States Patent
Price et al.

(10) Patent No.: US 6,916,180 B1
(45) Date of Patent: Jul. 12, 2005

(54) METHOD AND SYSTEM FOR RATING EDUCATIONAL PROGRAMS

(75) Inventors: Douglas Price, Denver, CO (US); Anna Jo Haynes, Denver, CO (US); Meera Mani, Golden, CO (US); Gerrit Westervelt, Confer, CO (US)

(73) Assignee: Qualistar Early Learning, Denver, CO (US)

(*) Notice: Subject to any disclaimer, the term of this patent is extended or adjusted under 35 U.S.C. 154(b) by 111 days.

(21) Appl. No.: 10/057,273

(22) Filed: Jan. 24, 2002

Related U.S. Application Data

(60) Provisional application No. 60/264,149, filed on Jan. 24, 2001.

(51) Int. Cl.[7] .......................... G09B 19/00; G06F 17/60

(52) U.S. Cl. ........................................... 434/219; 705/7

(58) Field of Search .......................... 434/118, 219, 236, 434/353, 362; 705/7, 10, 11

(56) References Cited

U.S. PATENT DOCUMENTS 5,365,425 A * 11/1994 Torma et al. .................. 705/2
6,007,340 A * 12/1999 Morrel-Samuels .......... 434/236

FOREIGN PATENT DOCUMENTS

WO WO 89/12865 A1 * 12/1989

OTHER PUBLICATIONS

Arkansas.gov: Googie Search Results; Arkansas.gov, Feb. 18, 2004; 2 pp.; http://www.accessarkansas.org/search/ar-portal_search.php.

Barbour et al.; "Govenor Patton Announces First Child Care Centers in Kentucky to Receive STAR Ratings"; Aug. 2, 2001.

Benefits for Centers; *Kinderview, Inc.*; 2000–2001; 1 p.

Benefits for Parents; *Kinderview, Inc.*; 2000–2001; 1 p.

Casey, "Child Care Rating Project Halted"; *Reviewjournal*; Apr. 16, 2003, 3 pp.

Child Care Administration Maryland Department of Human Resources Annual Report 2002; *Maryland Human Services Agency*; 2002; 16 pp.

"Child Care and Development Fund Plan"; *Oklahoma State Plan for CCDF Services*; Oct. 1, 2003; 54 pp.

"Choosing a Preschool: Development"; *Beansprout Networks, Inc.*, 2000–2002; 2 pp.

Collins, "Quality Rating Strategies: State Trends in 2001"; *NCCIC*; Jan. 1, 2001; 1 p.

Cross et al.; "Children at Risk: Why the Quality of Child Care Matters"; *Helathy Child Care Indiana*; Jun. 2002; pp. 1–4.

"Daycare Viewing and Streaming Systems—Kinderview-.com"; *Kinderview, Inc.*; 2000–2001; 1 p.

"Division of Child Care—Home Page"; *Oklahoma Department of Human Services*; (date unknown); 1 p.

"Fact Sheet: Environment Rating Scales"; *For TN Dept. of Hum. Servs. by UT Social Work Office of Research & Public Service*; Sep. 14, 2001, 2 pp.

Hodges; "Most Rowan Day-Care Centers Getting Lowest Rating"; *Salisbury Post*; Feb. 25, 2001, 3 pp.

(Continued)

*Primary Examiner*—John Edmund Rovnak
(74) *Attorney, Agent, or Firm*—Sheridan Ross P.C.

(57) ABSTRACT

The invention describes a method for evaluating educational programs which, firstly, develops criteria which will address the strengths and weaknesses of the educational program. The second step of the method is to observe the criteria, chosen in step one, in the educational program. The third step is to assign a numerical value to each of the criteria observed in step two. The next step is to assign an overall rating to the educational program based on the numerically valued criteria. The personnel involved in the educational program can then decide what steps in addition to the assessment can be done to improve or maintain the educational program.

23 Claims, 4 Drawing Sheets

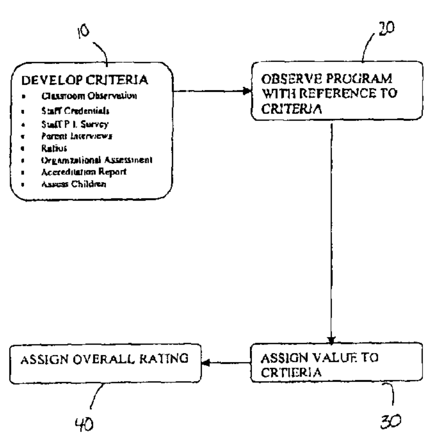

OTHER PUBLICATIONS

About Us: How It Works, *Kinderview, Inc.*; 2000–2001; 1 p.
Norris et al.; "Reaching for the Stars: Center Validation Study Executive Summary"; *ECCO*; Nov. 2003; 4 pp.
Norris et al.; "Reaching for the Stars: Center Validation Study Final Report"; *ECCO*; Nov. 2003; pp. i–56.
Outlaw: "Child care Centers Gamer State's Highest Quality Rating"; *Vanderbilt University Register*; 2002.
"Proposal for an Iowa Child Care Quality Rating System"; Nov. 2003; pp. 1–16.
"Purchase of Child Program Changes Impact Payment"; *Summer 2001 Edition of CCA Newsletter Partners*; 1 p.
"Reaching for the Stars Frequently Asked Questions"; *ECCO*; (date unknown); 6 pp.
"STARS—The Childcare Quality Rating System"; *KY Department of Education*; Feb. 4, 2004; 3 pp.
"Starting a Child Care Center in Oklahoma"; *Oklahoma Department of Human Services*; (date unknown); pp. 1–58.
"Tennessee's Child Care Evaluation & Report Program"; *Tennesse Department of Human Services Child Care Services*; (date unknown); 3 pp.
"The TN Child Care Evaluation & Report Card Programs"; *University of Tennessee College of Social Work Office of Research and Public Services*; 2002; 2 pp.; http://tnstar-quality.org/html/report_cards.htm.
"Tiered Strategies: Quality Rating, Reimbursement, Licensing"; *NCCIC*; Nov. 2002; pp. 1–10.
"TN Licensing Criteria"; (date unknown); 1 p.; http://tnstar-quality.org/htm/popups/criteria.htm.
Tucker; "Quality Rating Scale"; *The Child Care Professional*; Feb. 2001, vol. 9, Issue 6; pp. 1–4.
VonBargen; "FY-2002 Annual Report for the Division of Child Care"; *Division of Child Care*; as early as Jul. 1, 2002; pp. 1–16.
"What to Look for in a Provider"; *Beansprout Networks, Inc.*; 2000–2002; 3 pp.
Dietz, Michael J., Editor, *School, Family and Community*, Aspen Publishers, Inc. 1997.
Helburn, Suzanne W., Cost, *Quality and Child Outcomes in Child Care Centers Technical Report*, Jun. 1995.
Massachuetts Cost and Quality Study, *The Cost and Quality of Full Day, Year-round Early Care and Education in Massachusetts: Preschool Classrooms*, Center for Research on Women and Massachusetts Department of Education, 2001.
*The Florida Child Care Quality Improvement Study*, 1996 Report, Family and Work Institute.
Early Childhood Quality Improvement System, *Process for Achieving Reliability on the Environment Rating Scales with the Colorado Core*, The Center for Human Investment Policy, University of Colorado at Denver, Aug. 2001.
*Creating Better Family Child Care Jobs: Model Work Standards*, Center for the Child Care workforce, 1999.
*Creating Better Family Child Care Jobs: Model Work Standards for Teaching Staff in Center-Based Child Care*, Center for the Child Care Workforce, 1998.
Harms and Clifford, *Family Day Care Rating Scale*, Teachers College Press, 1989.
Harms, Cryer and Clifford, *Infant/Toddler Environment Rating Scale*, Teachers College Press, 1990.
Harms, Cryer, and Clifford, *Early Childhood Environment Rating Scale*, Teachers College Press, 1998.
NICHD Early Child Care Research Network, *Structure, Process, Outcome; Direct and Indirect Effects of Caregiving Quality on Young Children's Development*, Psychological Science, vol. 13, Iss. 3, pp. 199–206, May 2002.
Howes, Phillips, & Whitebrook, *Thresholds of Quality: Implications for the Social Development of Children in Center-based child Care*, Child Development, vol. 63, pp. 449–460, 1992.
Phillipsen, Burchinal, Howes & Cryer, The Prediction of Process Quality from Structural Features of Child Care, Early Childhood Research Quarterly, vol. 12, pp. 281–303 (1997).
Shonkoff & Phillips, *From Neurons to Neighborhoods, The Science of Early Childhood Development*, National Academy Press, pp. 311–321, 2000.
Kontos, Howes, Shinn & Galinsky, *Quality in Family Child Care Relative Care*, Teachers College Press, 1994, pp. 62–84.
Howes, Quality in Child Care: What Does Research Tell Us?, National Association for the Education of Young Children, vol. 1, 1987.
NICHD Early Child Care Research Network, Child Outcomes When Child Care Center Classes Meet Recommended Standards for Quality, American Journal of Public Health, vol. 89, No. 7, Jul. 1999.
Early Childhood Education Intervention for Poor Children, *The Carolina Abecedarin Project* Executive Summary, Oct. 1999.
Schweinhart & Weikart, Summary of Significant Benefits: The High/Scope Perry Preschool Study through Age 27, High/Scope Educational Research Foundation, 1993.
Schweinhart & Weikart, High/Scope Perry Preschool Program Outcomes, High/Scope Educational Research Foundation, 1993.
High/School Educational Research Foundation, *High Quality Preschool Program Found to Improve Adult Status*, 1993.
Barnett, *Long-Term Effects of Early Childhood Programs on Cognitive and School Outcomes*, The Future of Children, vol. 5, No. 3, Winter, 1995.
Literature Summary High Quality Early Childhood Education Improves the Lives of Children and Families.

* cited by examiner

METHOD AND SYSTEM FOR RATING EDUCATIONAL PROGRAMS

CROSS REFERENCE TO RELATED APPLICATIONS

This application is a continuation-in-part of and claims priority to U.S. Provisional Patent Application Ser. No. 60/264,149, filed Jan. 24, 2001, entitled "Method and System for Rating Educational Programs." The disclosure of this application is hereby incorporated herein in its entirety as if fully disclosed.

FIELD OF THE INVENTION

The invention concerns generally a method and system for evaluating educational programs, specifically providing a rating system based on pre-determined evaluation factors.

BACKGROUND OF THE INVENTION

There is a compelling public stake in education. As anyone who listens to the news understands, however, our educational institutions are not meeting the public's expectations regarding education. There is a great need to improve educational quality in both public and private educational institutions. The first problem in improving educational quality is assessing the quality of the educational program or institution. Educators have to show their effectiveness and the chief indicator by which most communities judge a school staff's success is student performance on standardized achievement tests. As is repeatedly discussed and debated in the media, however, standardized tests may not accurately show the quality of education. They merely make norm-referenced interpretations of students' knowledge and/or skills in relationship to those of students nationally.

In addition, standardized tests do not take into account the multi-dimensional aspect of a person's education. For instance, the standardized tests do not account for a student's innate intellectual ability. Standardized tests also fail to account for a student's learning outside of the school setting. There is no national standard for these standardized tests. Different states choose somewhat different educational objectives or different content standards. Further, some states do not even use the same standardized tests for all of the counties within that state. There is a national call for an assessment system that can be applied to each and every school in each school district in each county in each state of the United States of America.

The problem with assessing the quality of education becomes worse when one's attention is directed to early childhood education and care. No standardized tests are administered to our kindergarten students, pre-school students, and child care attendees. Thus, assessing the quality of such programs is difficult and very subjective, with many parents relying on the recommendations of other parents (who may place different values on education) or their own gut feelings about a facility.

Millions of children are receiving early care and education that is inadequate, with many receiving care that is actually or potentially harmful to their development and learning capacities. More children are experiencing child care and pre-school than ever before in America's history. For example, in 1950, 1 mother in 10 worked outside the home. Today, more than 6 out of 10 mothers of children under three are working outside the home, and that number is projected to increase to more than 7 out of 10 by 2005. Research shows that 87% of out-of-home child care settings are considered poor or mediocre.

From birth to age 5, children are in a period of explosive brain development and growth. This age period is critical to a child's social and cognitive development. 85% of a person's intellect, personality and social skills are developed by age five. Yet, 95% of public investment in education occurs after children reach the age of five—when the most critical learning years have passed. Indeed, our society does not even begin its only measure, standardized tests, of education until the child is in the 1st grade—age 6 or 7. This may be because of the difficulties and expense of testing children under the age of 6 or 7. Children below the age of 6 or 7 are pre-verbal and pre-literate so testing methodologies are difficult and measuring actual learning in children below 6 or 7 can be next to impossible.

The American Association for Higher Education has published an article entitled "Nine Principles of Good Practice for Assessing Student Learning", incorporated herein by reference. One familiar with education and educational programs will recognize that these principles can be applied to any level of education.

The first principle is that the assessment of student learning begins with educational values. The Association states that assessment is not an end in itself but a vehicle for educational improvement. Educational values should drive not only what is assessed but also how it is assessed.

The second principle in the assessment of learning is to recognize that assessment is most effective when it reflects an understanding of learning as multi-dimensional, integrated, and revealed in performance over time. As the Association states, learning is a complex process. It entails not only what students know, but what they can do with what they know.

The third principle is that assessment works best when the programs it seeks to improve have clear, explicitly stated purposes. The fourth principle is that assessment requires attention to outcomes but also and equally to the experiences that lead to those outcomes. The fifth principle is that assessment works best when it is ongoing, not episodic.

The sixth principle is that assessment fosters wider improvement when representatives from across the educational community are involved. This means getting the students, the teachers, the parents, the administration and the community working together as one cohesive group. The seventh principle is that assessment makes a difference when it begins with issues of use and illuminates questions that people really care about. The eighth principle is that assessment is most likely to lead to improvement when it is part of a larger set of conditions that promote change. The ninth and last principle is a recognition that through assessment, educators meet responsibilities to students and to the public.

No comprehensive assessment tool of learning that embodies these nine principles presently exists. There is also no comprehensive assessment tool that measures the learning program which will embody these nine principles. Thus, there is a long-felt and unsolved need for an assessment tool for educational programs, adaptable to all levels of education, preferably embodying or recognizing the nine principles of assessing learning, as applied to a educational program.

SUMMARY OF THE INVENTION

The present invention provides an assessment method that will allow an educational program to be assessed with respect to all nine principles discussed above, not only for higher education but for all levels of educational care, and that is understandable to all of the persons involved in the process. The only way to approach measuring learning in young children is to measure the strengths and weaknesses of the learning program in which the child is enrolled. Our society's approach to education is backward. The focus of improving education should begin with early child care facilities and continue through advanced degree institutions. In addition, it is important to note that focusing on individual students to measure the quality of an educational program is not a logical method of measuring the quality of the program. Most businesses do not measure their quality according to the quality of each and every individual employee. Instead, the business focuses on procedures, training, programs and other measures of that the business can control to improve and measure the quality of the business. The same approach should be taken with respect to educational programs, instead of the current focus of placing the responsibility of the quality of the program on those who have the least control over improving or altering the program—the students.

In one embodiment of the invention, the invention describes a method for evaluating educational programs which, firstly, develops criteria which will address the strengths and weaknesses of the educational program. The criteria can be tailored to fit each different level or type of educational program. The second step of the method is to observe the criteria, chosen in step one, in the educational program. This observation step can include but is not limited to collecting documents, surveys, classroom observations, interviews, and other types of information gathering techniques. The third step is to assign a numerical value to each of the criteria observed in step two. In one embodiment, the numerical value assigned is any number between 1 and 4. One will easily recognize that the numerical value assigned can be of any range of numbers or letters. The last step, in this embodiment, is to assign an overall rating to the educational program based on an alphanumeric (hereinafter generally referred to as "numeric") valued criteria.

In another embodiment of the invention, the invention describes a method which, firstly, develops criteria which address the strengths and weaknesses of the particular level of the educational program. The second step of the invention is to observe factors in the educational program, with each of the factors relating to one or more of the criteria. Again, the observation step includes information gathering techniques, including but not limited to collecting documents, conducting interviews, surveys, and classroom observation. Each factor is then assigned a numerical value. The numerical values of the factors are sorted to correspond with the one or more criteria to which the factor relates and averaged in order to assign a numerical value for each criterion. The last step of this embodiment of the invention is to assign an overall rating to the educational program based on the numerical values of the criteria.

In a further embodiment of the invention, the invention describes a method of evaluating an educational program which, firstly, develops criteria which address the strengths and weaknesses of the educational program. The second step is to observe factors in the educational program, with each of the factors relating to one or more of the criteria. Again, the observation step includes information gathering techniques, including but not limited to collecting documents, surveys, conducting interviews, and classroom observation. Each factor is then assigned a numerical value. This numerical value is weighted and multiplied by the numerical value to give a weighted numerical value. The weighted numerical values of the factors are sorted to correspond with the one or more criteria to which the factor relates. The weighted numerical values are then averaged within each criterion to give a quantitative value to each criterion. An overall rating is then assigned to the educational program based on the quantitative value of the criteria.

In yet another embodiment of the invention, the invention describes a method of evaluating an educational program which, firstly, develops criteria which address the strengths and weaknesses of the educational program. The criteria are typically age and grade level specific so as to appropriately evaluate the educational program. The second step is to orient personnel involved with the educational program as to the criteria and goals of the method. These personnel include the administration, the staff, the teachers, the parents, and even the children or students, if appropriate. The third step is to observe the criteria in the educational program. As discussed above, the observation step can include any form of information gathering technique. A numerical value is then assigned to the criteria and an overall rating is assigned based on the numerically valued criteria. The last step in this embodiment is to debrief the personnel on the overall rating.

In another aspect of the present invention, one embodiment is directed to a method of improving an educational program. The first step in this embodiment is to evaluate the educational program by assigning an overall rating to the educational program. The rating is based on observations of criteria which address the strengths and weaknesses of the educational program. The second step is to identify the weak areas of the educational program and develop an improvement process to address the weak areas. The next step is to identify the strong areas of the educational program and develop a maintenance program to maintain the strength of the educational program. The last step is to reevaluate the educational program, at some later point in time, to determine the extent of improvement and maintenance.

The present inventors specifically contemplate the invention utilizing an electronic database having the criteria and/or the various factors that make up the criteria in the database. Then, when one observes the criteria, the observations and numerical values associated with each criteria or factor are placed directly into the database. The database then calculates the numerical values for each of the criteria and the overall rating, based on the programming of the database to do so. The database can be contained in a laptop, such that the unit would not require any other inputs. The database can also be placed on a hand-held computing device such that the inputs will be communicated to a parent computer through a communications link or the database can be web-based and accessible through the Internet.

In another embodiment of the invention, the invention comprises a system for evaluating an educational program which utilizes means for developing criteria which address strengths and weaknesses of the educational program, means for observing the criteria in the educational program, means for assigning a numerical value to the criteria; and, means for assigning an overall rating to the educational program based on the numerically valued criteria. The means for accomplishing each of these functions can be embodied in a series of papers filled out by a person, a paper database filled out by a person, an electronic database filled out by a person, or other tools for development, observation and assigning numbers.

These and other objects, features, and advantages of the invention will become apparent from the following best mode description, the drawings and the claims.

BRIEF DESCRIPTION OF THE DRAWINGS

The figures which follow depict at least one embodiment of the invention, and may depict various alternative embodiments. The invention is not limited to the embodiment or embodiments depicted herein since even further various alternative embodiments will be readily apparent to those skilled in the art. For the ease of the reader, like reference numerals in various drawing figures refer to identical elements or components.

FIG. 1 depicts a flowchart of one embodiment of the method of the invention.

FIG. 2 depicts a flowchart of another embodiment of the method of the invention.

FIG. 3 depicts a flowchart of one embodiment of the method of the invention.

FIG. 4 depicts a flowchart of one embodiment of the method of the invention.

DETAILED DESCRIPTION

At the outset, it should be understood that this invention comprises a method of evaluating an educational program that can be applied at any level of education. The description which follows described a preferred embodiment of the invention, and various alternative embodiments. It should be readily apparent to those skilled in the art, however, that various other alternative embodiments may be accomplished without departing from the spirit or scope of the invention.

For the purposes of describing the aspects of the invention, the discussion that follows will discuss the application of the invention to early childhood care and education programs. It should be understood that the invention can be easily adapted to be applied to any level of educational program.

FIG. 1 depicts a flowchart of a method for evaluating educational programs which, firstly, develops criteria which will address the strengths and weaknesses of the educational program. The criteria can be tailored to fit each different level of educational program. The general criteria that would apply, particularly to an early educational program, include but are not limited to classroom environment, accreditation, parent involvement, staff credentials, presence of a curriculum, and staff to child ratios.

Classroom environment can be measured in any number of ways. There are known methods of evaluating classroom environment, including but not limiting to the Early Childhood Environment Rating Scale (ECERS-R), the Infant/Toddler Environment Rating Scale (ITERS) or the Family Day Care Rating Scale (FDCRS), all published by Teachers College Press and incorporated in their entireties herein. The ECERS-R and the ITERS recommend observing factors about the classroom such as space and furnishings, personal care routines, language/reasoning activities or materials, physical activities, interaction between staff and children, program structure and interaction between parents and staff. In observing space and furnishings, one focuses not only on the physical furnishings available to the children but to the adequacy and cleanliness of such physical furnishings. For example, one would note the adequacy of lighting and natural lighting, ventilation, temperature control, sound absorbing material, peeling paint, and the sufficiency of the space. The space and furnishings factor also takes into account the furniture and condition of the furniture for routine care, play and learning, relaxation and comfort, privacy, and gross motor equipment and space.

The personal care routine factor looks at greeting and departure rituals, meal and snack schedule and procedures, nap and rest schedule and procedures, toileting and diapering schedule and procedures, health practices such as hand washing, appropriate clothing, and tooth brushing, and safety practices such as clean up of toys, emergency numbers, and presence of safety rules which are explained to the children.

The language/reasoning factor concerns the amount, presence and appropriateness of books and pictures, encouragement of children to communicate, use of logic play such as sequence cards, sorting games, number and math games, and informal use of language on individual bases.

The activities factor described above as one of the factors to observe concerns the development and use of children's fine motor skills, the presence and use of activities related to drama, art, music or movement, the play and use of blocks and block sets, the play and use of sand/water, the presence of nature/science/math activities, the use of television, computers and videos, and the promotion of acceptance of diversity. The interaction factor observes the adequacy of supervision of the children's gross motor activities, supervision in general, discipline of the children, staff-child interactions such as appropriate physical contact, respect for children on the part of the staff, staff's enjoyment of the children, and the interactions between and among the children including resolution of conflicts between children.

The program structure factor is concerned with the scheduling of activities, the presence and amount of free time and group time, and the adequacy of provisions for children with disabilities. The parents and staff factor observes the accommodations made for parents such as allowing parents to observe the child in group and prior to enrollment, brochures or other types of program descriptions given to parents, annual parent evaluations. This factor also observes the provision made for the staff such as a separate washroom, area to store personal belongings away from the children, and amount and flexibility of breaks. The parents and staff factor also observes the adequacy of the provisions for the professional needs of the staff and the staff interaction and cooperation, the supervision and evaluation of staff, and opportunities for professional growth are offered to the staff. The Center for the Child Care Workforce issues publications on creating Better Child Care Jobs, Creating Better Family Child Care Jobs and Model Work Standards for child care workers. These brochures are incorporated in their entireties by reference herein. The Model Work Standards for Child Care Workers include standards on wages, benefits, job descriptions and evaluations, hiring and promotions, termination, suspension, severance and grievance procedures, classroom assignments, hours of work and planning time, communication, team building and staff meetings, decision making and problem solving, professional development, professional support, diversity, health and safety, and physical space requirements.

The FDCRS recommends observing factors such as space and furnishings, basic care, language and reasoning, learning activities, social development, and adult needs. The space and furnishings factor analyzes the presence of furnishings for routine care and learning, the presence of furnishings for relaxation and comfort, the presence and use of a child-related display, the indoor space arrangement, the provisions for active physical play, and the provision of space for the child to be alone. The basic care factor includes observing the arrival and departure of the children, the provision of meals and snacks, the provision of nap and rest time, provision for the diapering and toilet needs of the children, attention paid to personal grooming, and the health and safety of the home.

The language and reasoning factor observes the informal use of language in relating to the children, whether the care giver helps children understand language, whether the care giver helps children use language, and whether the care giver helps children reason through the use of sequence cards, etc. The learning activities factor assesses whether the family home provides for hand to eye development, art, music and movement, sand and water play, blocks, and dramatic play activities for the children. The learning activities factor also assesses the use of television as an activity, schedule of activities, and supervision of play indoors and outdoors.

The social development factor observes the care giver's tone when interacting with the children, the care giver's discipline of the children, and the care giver's cultural awareness and diversity as assessed by the racial variety shown in books, pictures, and other play toys. The adult needs factor is analyzed by observing the care giver's relationship with the parents of the children, how the care giver balances personal and care giving responsibilities, and the care giver's opportunities for professional growth.

The Model Work Standards for Family Child Care Jobs includes standards on provider income, provider benefits, hours of work, provider-parent communication, professional development, work environment, community support in case emergencies arise, and standards for the provider becoming an employer. These Model Work Standards are also included as factors to be observed and accounted for in the classroom observation criteria, the staff credentials criteria, and the accreditation criteria of the educational program.

The present inventors contemplate using one of these known methods of classroom environment to accomplish the step of observing the classroom environment. However, such contemplation of use of known methods of classroom observation does not preclude the present inventors from developing their own methods of classroom environment observation or from using such developed methods as part of the present invention. The present inventors currently contemplate developing their own methodology for observing classroom environment, specifically to streamline the observation from the intricacies and overlapping areas of the known methodologies.

The second step of the method is to observe the criteria, chosen in step one, in the educational program. This observation step can include but is not limited to collecting documents, reviewing financial information about the educational program, classroom observations, interviews, and other types of information gathering techniques. It should be understood that, throughout each of the descriptions of the various embodiments of the invention described herein, that the data collection, observation and criteria can be accomplished either through traditional paper processing methods and/or also through electronic processing methods, either through the use of laptop computers with a database of the various criteria programmed therein or through the use of hand-held electronic devices and communication links to allow the hand-held devices to communicate with a parent computer. Should an electronic processing method be used in the collection and observation of the criteria, it follows that the subsequent steps can also be conducted through electronic processing means.

The third step is to assign a numerical value to each of the criteria observed in step two. This, again, can be performed either through paper processing or electronic processing methods. In one embodiment, the numerical value assigned is any number of stars between 1 and 4. One will easily recognize that the numerical value assigned can be of any range of numbers or rating symbols such as stars, circles, dollar signs or the like. The classroom environment criteria, according to one embodiment of the present invention, requires minimum scores, as rated according to FDCRS, ECERS-R and ITERS, as follows:

3.00 in order to achieve one star;

3.51 in order to achieve two stars;

4.26 in order to achieve three stars; and, 5.00 in order to achieve four stars.

The accreditation criteria reflects whether the educational program is accredited by appropriate state, local or federal institutions, or as discussed in more detail in the appendix hereto, by a nationally recognized professional association such as the National Association for the Education of Young Children or the National Association of Family Child Care. Moreover, such professional associations are typically non-governmental organizations, and such professional associations require a child care provider to complete an extensive self-study of all aspects of early child care and education. Moreover, such associations perform on-site visits to assure accreditation criteria are satisfied. Note that such non-governmental accrediting associations accredit a plurality of independently owned and operated child care facilities, as one skilled in the art will readily understand. In one embodiment of the invention, accreditation is required in order to achieve a four star rating. In another embodiment of the invention, two points are assigned to the accreditation criteria when accreditation is achieved and as maintained.

The parent involvement criteria focuses on an evaluation of fourteen factors reflecting basic communication and responsiveness to parent perspectives. In one embodiment, increasing expectations are set for these criteria as the level and types of parent involvement become more sophisticated. There are 6 types of parent involvement: parenting, communicating, participating or volunteering, learning at home, decision-making or leadership, and community involvement. A Parenting parent typically creates a home environment that supports the child's healthy growth and development. A Communicating parent typically shares information about the child's progress, significant events, interests, and the parent's child-rearing philosophy and educational goals. A Participating/Volunteering parent typically takes part in classroom and program activities as a member of program "community", e.g. volunteering in the classroom, helping with fund-raising, attending family events, donating materials or expertise. A Learning at Home parent typically provides activities to stimulate children's learning and development, e.g. reading to children, making drawing materials available, playing matching games, having conversations about shared experiences. A Decision-Making/Leadership parent advocates and provides guidance on issues that affect the parent's child or children in the program, e.g. setting learning goals with staff, sitting on an advisory board, or speaking at public meetings. Finally, a Community Involvement parent takes part in groups and activities and uses community resources, takes an active role as a community member, e.g. being active in a faith community, being a scout leader, supporting cultural events. Thus, as the sophistication of the parents of children in the educational program increase, more involvement is expected from those parents.

The fourteen criteria and their effects on the star rating assigned to this criteria as part of one embodiment of the present invention is described in Table 1.

TABLE 1

| Parent Involvement Criteria | | | | |
|---|---|---|---|---|
| Factor | Star 1 | Star 2 | Star 3 | Star 4 |
| Program documents providing written information on program philosophy, policies & procedures | REQ'D. | REQ'D. | REQ'D. | REQ'D. |
| Program documents orientation to the program for both parent and child prior to or immediately following enrollment | REQ'D. | REQ'D. | REQ'D. | REQ'D. |
| Program reports timely notification of major changes in program or policies (e.g. change in teach, change in fees, change in schedule) and no more than 25% of parents report lack of timely notification | REQ'D. | REQ'D. | REQ'D. | REQ'D. |
| 75% of parents report that program welcomes visits by parent at all times | REQ'D. | REQ'D. | REQ'D. | REQ'D. |
| 75% of parents report at least adequate information from program on child's day-to-day physical and emotional well-being | Min. score of 3 | Min. score of 3 | Min. score of 4 | Min. score of 4 |
| 75% of parents report at least adequate response by program to parent concerns & suggestions | Min. score of 3 | Min. score of 3 | Min. score of 4 | Min. score of 4 |
| 75% of parents report at least adequate information from program on child's daily activities, i.e., how each day is planned, what child enjoys, how he/she plays with other children, etc. | NA | Min. score of 3 | Min. score of 4 | Min. score of 4 |
| 75% of parents report being at least somewhat comfortable asking teacher for information on child development or parenting techniques | NA | Min. score of 3 | Min. score of 4 | Min. score of 4 |
| Program documents conducting planned individual parent conferences at least annually to discuss child's progress and plans to meet learning goals | NA | REQ'D. | REQ'D. | REQ'D. |

TABLE 1-continued

Parent Involvement Criteria

| Factor | Star 1 | Star 2 | Star 3 | Star 4 |
|---|---|---|---|---|
| 75% of parents report receiving at least adequate information from program on learning goals for children, teaching approaches, how behavior is managed in class, etc. | NA | NA | Min. score of 3 | Min. score of 4 |
| 50% of parents who have offered ideas/suggestions to the program report that suggestions are implemented | NA | NA | REQ'D. | REQ'D. |
| 75% of parents report receiving at least adequate information from the program about community services | NA | NA | Min. score of 3 | Min. score of 4 |
| Program documents regularly including parents in program evaluation | NA | NA | NA | REQ'D. |
| Program staff and parents report planned, successful activities in these types of parent involvement: parenting communication participating/volunteering learning at home leadership/decision-making community involvement | No add'l requirements | α | α α | α α α |

α—In addition to required activities, staff AND at least 40% of parents as an aggregate identify activities in at least two of the six types of parent involvement.

αα—In addition to required activities, staff AND at least 60% of parents as an aggregate identify activities in at least four of the six types of parent involvement. Program has a written, cohesive plan for parent involvement.

ααα—In addition to required activities, staff AND at least 75% of parents as an aggregate identify activities in at least five of the six types of parent involvement. Parent involvement is an integral part of an annual program plan and evaluation.

The staff credentials criterion observes the professional credentials for each staff member with specific expectations for education, experience and position. Individual staff ratings are averaged by position and weighted and a number is assigned for this criteria. The staff to child ratios criterion focuses on the number of staff to children. In one embodiment of the present invention, for educational program centers, the expectations of the ratio increases from licensing up through standards set by national accrediting bodies. For full-day programs, target ratios should be maintained for 76 of 80 time stamps over 20 days of data collection. For part-day programs, target ratios should be met for 19 of 20 time stamps over 20 days. For one embodiment of the present invention, the target ratios are also geared to specific age groups as shown in Table 2.

TABLE 2

Target Ratios based on Age Groups

| AGE GROUP | Star 1 | Star 2 | Star 3 | Star 4 |
|---|---|---|---|---|
| 0-18 mos. | 1:5 | 1:4 (¾ time stamps) | 1:4 all day | 1:3 |
| 18-24 mos. | 1:5 | 1:4 (¾ time stamps) | 1:4 all day | 1:3 |
| 24-30 mos. | 1:7 | 1:6 (¾ time stamps) | 1:6 all day | 1:5 |

TABLE 2-continued

Target Ratios based on Age Groups

| AGE GROUP | Star 1 | Star 2 | Star 3 | Star 4 |
|---|---|---|---|---|
| 30-36 mos. | 1:8 | 1:7 (¾ time stamps) | 1:7 all day | 1:6 |
| 36-48 mos. | 1:10 | 1:9 (¾ time stamps) | 1:9 all day | 1:8 |
| 48-60 mos. | 1:12 | 1:10 (¾ time stamps) | 1:10 all day | 1:8 |

In other age groupings, one embodiment of the present invention recommends using the staff ratio for the youngest child if more than 20% of the group is composed of younger children. In one embodiment of the present invention, for family homes, the staff to child ratios described in the licensing requirements are required to earn any points. In this embodiment, 4 points are assigned to the family home if in compliance with licensing requirements.

The last step, in this embodiment, is to assign an overall rating to the educational program based on the numerically valued criteria. This overall rating can be accomplished using a number of numerical methods including but not limited to averaging, weighting and averaging, or addition of the scores of the various criteria developed in step one, observed in step two, and rated in step three. The overall rating can be calculated using conventional mathematical tools or can be calculated through electronic processing means. In one embodiment of the invention, the points assigned to each criterion are added up and the following minimum points required for each star rating is assigned. For child care centers, as described in one embodiment of the invention, the required total scores overall rating is as follows:

8 points minimum for Star 1;

16 points minimum for Star 2;

24 points minimum for Star 3; and, 32 points minimum for Star 4.

For family homes, as described in one embodiment of the invention, the required total scores for the overall rating is as follows:

10 points minimum for Star 1;

16 points minimum for Star 2;

22 points minimum for Star 3; and, 28 points minimum for Star 4.

It should be recognized that the overall points required can be modified or adjusted to accurately reflect the quality of the program. In addition, if a different basis for scoring is chosen, then the overall rating minimum points will change as well. For example, if a ten-star rating program is chosen, then the overall rating minimum values should be adjusted to reflect the ability to achieve ten stars versus four. The above description is only one method of accomplishing the goal and spirit of the invention.

FIG. 2 shows a method of improving an educational program according to the invention. The first step in this embodiment is to evaluate the educational program by assigning an overall rating to the educational program, shown in FIG. 2 by elements 11, 22, 23, and 40. The rating is based on observations of criteria which address the strengths and weaknesses of the educational program. For the purposes of having personnel involved in the educational program understand the process, in one embodiment of the invention, a site profile 45 can be developed. The second step, shown by elements 45, 60, and 61 of FIG. 2, is to identify the weak areas of the educational program and develop an improvement process to address the weak areas. The next step, also subsumed in elements 45, 60, and 61 in FIG. 2, is to identify the strong areas of the educational program and develop a maintenance program to maintain the strength of the educational program. The maintenance programs and the improvement processes are then implemented, shown by element 70. The last step is to reevaluate the educational program, at some later point in time, to determine the extent of improvement and maintenance, shown in FIG. 2 by elements 80, 81 and 82. Element 80 describes a six month reevaluation period. It should be recognized that any period of time can be chosen in which to reevaluate the programs. Element 81 provides the option of revising the programs and processes implemented during the first evaluation of the program in order to provide flexibility to the improvement processes and maintenance programs. Element 82 provides for annual overall rating to be assigned to the educational program. Of course, the overall rating can be assessed on a bi-annual, semesterly, quarterly, or monthly assessment, dependent on the particular needs of the educational program.

FIG. 3 depicts another embodiment of the invention. In this embodiment, the invention describes a method of evaluating an educational program which, firstly, develops criteria which address the strengths and weaknesses of the educational program (not shown in FIG. 3). The criteria are typically age and grade level specific so as to appropriately evaluate the educational program. The second step is to conduct an assessment of the educational program with the program administrators.

The third step, shown by elements 21, 22, and 23, is to observe the criteria in the educational program. As discussed above, the observation step can include any form of information gathering technique. A numerical value is then assigned to the criteria and an overall rating is assigned based on the numerically valued criteria, shown by element 40. The last step in this embodiment is to debrief the personnel on the overall rating, shown by element 50. As an option in one of the embodiments of the invention, a site profile can be developed. The site profile can provide general guidance to the educational program such as identifying the organization's needs, program trends and providing recommendations regarding the general organization's needs and program trends. The site profile can also be broken into specific classroom recommendations and guidance. FIG. 3 also provides an additional optional step of the development of a quality technical assistance plan, shown as element 60, that will review the program-wide goals, develop objectives to be achieved, identify strategies for accomplishing the objectives, establish outcome measures by which the educational program can measure success, and establish a timeline in which the educational program will achieve the objectives. As an additional step, not shown in FIG. 3, the educational program can be reassessed and reevaluated according to the present invention at some point in the timeline to determine whether the overall star rating improves or changes based on the implementation of the technical assistance plan. A further additional optional step, shown by element 70, is the provision of technical assistance, in the form of coaching and training programs, in implementing the technical assistance plan.

FIG. 4 depicts yet a further embodiment of the present invention. In this embodiment, the invention describes a method of evaluating an educational program which, firstly, develops criteria which addresses the strengths and weaknesses of the educational program (not shown in FIG. 4). The criteria is typically age and grade level specific so as to appropriately evaluate the educational program. The second step is to orient personnel involved with the educational program as to the criteria and goals of the method. These personnel include the administration, the staff, the teachers, the parents, and even the children or students, if appropriate. This orientation can take place through presentations, meetings, and other public forum functions. In one embodiment, the orientation is separated into groups, for example, the orientation of the administrators involved in the program are oriented, the staff is oriented in a separate session and the parents are oriented in yet another session. Of course, the present inventors contemplate conducting the orientation in one group or any number of groupings, depending on the dynamics of the educational program to be oriented. In one embodiment, this orientation step can also include training of site coaches or persons who will be conducting the assessment. It can also include the training of those persons who will be provide the quality improvement coaching and training, following the assessment.

The third step, shown by elements 21, 22, and 23, is to observe the criteria in the educational program. As discussed above, the observation step can include any form of information gathering technique. A numerical value is then assigned to the criteria and an overall rating is assigned based on the numerically valued criteria, shown by element 40. The embodiment depicted in FIG. 4 contemplates that a site profile, shown by element 45, will be developed. The site profile can provide general guidance to the educational program such as identifying the organization's needs, program trends and providing recommendations regarding the general organization's needs and program trends. The site profile can also be broken into specific classroom recommendations and guidance. The next step in this embodiment is to debrief the personnel on the overall rating, shown by element 50. The last step in the embodiment depicted in FIG. 4 contemplates the development of a quality technical assistance plan, shown as element 60, that will review the program-wide goals, develop objectives to be achieved, identify strategies for accomplishing the objectives, establish outcome measures by which the educational program can measure success, and establish a timeline in which the educational program will achieve the objectives. As an additional step, not shown in FIG. 4, the educational program can be reassessed and reevaluated according to the present invention at some point in the timeline to determine whether the overall star rating improves or changes based on the implementation of the technical assistance plan.

The present inventors specifically contemplate the invention utilizing an electronic database having the criteria and/or the various factors that make up the criteria in the database. Then, when one observes the criteria, the observations and numerical values associated with each criteria or factor are placed directly into the database. The database then calculates the numerical values for each of the criteria and the overall rating, based on the programming of the database to do so. The database can be contained in a laptop, such that the unit would not require any other inputs. The database can also be placed on a hand-held computing device such that the inputs will be communicated to a parent computer through a communications link or the database can be web-based and accessible through the Internet.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Nor should any particular series of steps in any method deemed rigid—the present invention comprises the enumerated steps, but not necessarily in any particular order/sequence. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

Appendix

Educare Colorado –Child Care and Educational Quality Improvement Model

Abstract:
The innovation is a comprehensive process for evaluating and improving the quality of early care and education in any setting, including a detailed methodology for assessing the strengths, weaknesses, and other characteristics of a child care setting; the assignation of a qualitative and quantitative rating that facilitates parental and provider decision making; a goal-setting procedure conceptually linked to the rating; a process for developing and implementing a comprehensive, ongoing, intensive technical assistance program for the child care setting; a methodology for ongoing monitoring and assessment of the effectiveness of the interventions prescribed in the technical assistance plan and implemented in the child care setting, and a multimedia parental support and public engagement program that publishes ratings, provides advice and activities that enable parents to make informed child care decisions. The centerpiece of the innovation is a "4-Star Rating System" for child care quality improvement, a site-based educational improvement model that is multidimensional in scope, incremental and variable in implementation, and which evaluates the educational setting as well as the desired student outcomes.

Background of the Innovation:
There is a great need to improve early child care and educational quality in America. Millions of children are receiving early care and education that is inadequate, with many receiving care that is actually or potentially haml ful to their development and learning capacities. Single parent households make up one-third of all families in this country. Mothers have flooded into the workforce. In 1950, one mother in ten worked outside the home. Today, more than 6 out of 10 mothers of children under three are working outside the home, and that number is projected to increase to more than 7 out of 10 by 2005. That means that our children, from the time they are born to the time they go to kindergarten, are increasingly finding themselves in care outside the home. At the same time, we know more today than ever before about the critical influence of the early years. From birth to " age 5, children are sponges: learning about their world and forming important bonds for life. This "window of opportunity" is critical to a child's social and cognitive development. Parents and caregivers are the architects of the next generation. But research shows that 87% of out-of-home child care settings are considered poor or mediocre. That places in jeopardy the well-being of millions of children.

Child care quality improvement, like any human-mediated, labor-intensive enterprise, is an enormously complex task, with many behavioral, financial, political, and social variables to consider. Current technologies and strategies for quality improvement are not robust enough to successfully address all of the areas in which changes must take place. Parents, child care providers, state and local government leaders and others need quality improvement technologies and tools that are results-driven, context-sensitive, grounded in research and best practices, and rigorously evaluated. Educare Colorado is the only quality improvement process currently in existence that combines child care site assessment, qualitative and quantitative rating, technical assistance, monitoring, and rigorous evaluation elements into a coherent, transferable, adaptable system, backed by a comprehensive parent support and public engagement model.

The mission of Educare is to improve child development and early learning experiences for all children (0-5 yrs) by implementing a statewide system that supports parents as teachers & decision makers; promotes high-quality child-centered care; is fully funded & permanently sustainable, and is appropriately monitored & evaluated.

Elements of the Innovation:
The Quality Improvement Process ("QI") consists of the following elements: First, a structured orientation session is held, including staff and administrators from the child care setting ("site"), which communicates detailed information about the QI process, mutual expectations, anticipated outcomes, and terms of agreement among the participants. A specified series of documents is then collected from the site (see QI flow chart, appended), including a self-assessment, demographic profile, financial information, and other data. This information is entered into a database and analyzed as part of the site assessment process, which includes classroom observations by trained observers, a review of staff credentials, parent surveys, a site accreditation report, and other documents, and the assignation of a "star rating" using the 4-Star Rating System, uniquely written "**** Rating System."

This framework assigns ratings on a sliding scale across five domains: classroom environment, staff qualifications, parent involvement, staff: child ratios, and accreditation status (see detailed descriptions in QI Policies and Procedures Manual, appended). A site debriefing is then held, which integrates the results of the assessment process and begins framing goals for quality improvement. Specific objectives and strategies are then created in accordance with the results of the assessment, along with a site profile summary; these form core elements of a comprehensive technical assistance plan. This plan is a specific road map for all work to be undertaken to improve quality, including training, mentoring, equipment and materials purchases, facilities improvements, outcome measures, timelines and other changes at both the classroom and overall program levels. The plan is then finalized with the site staff and leadership; resources to be used to meet goals and objectives are identified, and plan implementation proceeds.

Activities associated with plan implementation include on-site workshops, the provision of scholarships for training and continuing education, attendance at conferences, provision of classroom and other materials, furnishings, office equipment, site improvements, incentives for staff and parent participation, and other activities as identified in the plan. Implementation progress is tracked using a prescribed form, updated regularly; periodic classroom observations are conducted as implementation proceeds; and Educare staff meet regularly with site staff and administrators to review progress and revise plans as needed. This is a continuous process in which ratings are completed annually.

The Educare model is subject to a rigorous formative and summative evaluation program, which will help shape future iterations of this innovation. Such iterations may include adaptations designed to facilitate the model's application to settings within the K-12 educational system, in areas such as teacher training and professional development, teacher and student assessment, accountability frameworks, and other quality improvement and reform efforts. The model may also be adapted for use in technology-rich settings, including the use of Web-based delivery systems.

The QI process is tied to a comprehensive parent support and public engagement program, along with a public policy component designed to leverage policy and regulatory changes in support of young children and their families. These efforts include web-based and traditional media, briefing materials, and child care quality information addressing parents, providers, and non-parent advocates for early learning. Educare communicates a consistent and unique look and feel across all media. Images found on printed materials and the website depict children (ages 0-5) engaged in learning activities or sharing an experience with a provider or parent. Often the images are cast in a monochromatic or black & white scheme except for one section that is highlighted in original photographic color. The Educare logo can be found on all forms of media and consists of stylized hands embracing a heart shape. The name *Educare Colorado* appears below. The logo is frequently printed using solid black or Pantone 342 (green), but can appear in any color.

Also found on printed and web media are Educare's tag line "Making a BIG difference in little lives." Where the word "big" is capitalized or enlarged and "little" appears in small caps and/or shrunken letters. The Educare website (www.educarecolorado.org) is unique in that it offers a wealth of resources and information to parents and providers regarding Educare and its program, but also covers most children's issues including physical health matters, developmental issues and activities, public policy, and issues regarding the child care industry. The Educare site is hosting monthly art~cles from the acclaimed Dr.

Marianne Neifert (Dr. Mom) and access to a national child care referral database provided by CORRA.

Educare Colorado The Mission

Educare Mission:
Educare is dedicated to improving child development and early learning experiences for all children birth to five years of age by creating a statewide system that

- supports parents as teachers & decision makers;
- promotes high-quality child-centered care;
- is fully funded & permanently sustainable;
- is appropriately monitored & evaluated.

The Goals

Partnering with Parents:
To create & implement a parent communications plan that will empower parents to make informed decisions regarding their child's development.

Quality Improvement & Evaluation:
To design, test and implement a quality improvement process that can be utilized by child care centers and family home care providers in communities throughout Colorado.

To evaluate Educare's activities and the effect they have on the overall quality of child care and to measure the developmental gains of children and their school performance.

Fully Funded Early Education
To implement a public policy initiative and public education campaign that will work to fully fund high quality early learning programs in Colorado.

The History

This 501(c)(3) non-profit organization was formed in late 1997 when a coalition of business, philanthropic, political, religious and community leaders united to enhance the development of Colorado's young children and support their parents. Staff was hired beginning in 1999, and we are currently working with about 1,300 children in 90 classrooms.

The Motivation

The world has changed:

- Mothers of young children have flooded into the workforce.
  - In 1950, 1 in 10 mothers of children from birth – age five worked outside the home. Today, more than 6 out of 10 mothers work, and that number is projected to be more than 7 out of 10 by 2005. (Dept. of Labor)
- Single parent households make up 1/3 of all homes in this country.
- Studies have indicated that 87% of out-of-home child care is considered poor or mediocre.

We know more than ever about the critical nature of the early years:

- From birth - age 5, children are sponges: learning about their world & forming important bonds for life.
- This early "window of opportunity" is critical to a child's social and mental development.
- Infants & toddlers who are exposed to high-quality early learning are more apt to graduate from high school and attend college. Studies have shown that children exposed to high quality early learning are older, on the average, when their first child is born and have higher employment rates as adults.

Our approach to education is exactly backwards:

- Though 85% of a person's intellect, personality and social skills are developed by age five, 95% of public investment in education occurs after children reach the age of five – when the most critical learning years have passed.

Partnering with Parents

Parents are the architects of the next generation.

- We will implement a parent communications plan and web strategy that will empower parents to make informed decisions regarding their child's development.
- Through traditional and innovative communication materials and key partnerships, we will:

Support parents as decision makers, by providing them with information about quality that will empower them to take an active and educated role in the selection of high quality out-of-home care.

Support parents as teachers, providing working and stay-at-home parents developmentally appropriate activities to educate their children.

Quality Improvement & Evaluation

Educare will improve out-of-home care:

- Nearly 70% of all children find themselves in out-of-home care before they go to Kindergarten.
- Our voluntary program is based on a first-of-its-kind rating system that will enable parents to better determine quality care for their kids.

- Currently in the initial phase, we are working with about 1,300 kids in 90 classrooms. We're looking at five key predictors for quality: environment, parent involvement, teacher credentials, adult-child ratios & accreditation.
- With the help of site coaches, we've offered technical assistance and resources to these classrooms. We're expanding our reach this year, and we hope to move into four additional counties across the state. Once completed, rollout will begin so all Colorado parents have access to high quality care.
- Working with the Rand & OMNI Corporations, we're launching a detailed evaluation process to measure the effectiveness of Educare's activities as well as to assess the developmental gains of children and their school performance.

Fully Funded Early Education

We have traditionally ignored our youngest children and their parents.

- Though we've placed a premium on education once children reach Kindergarten, we've done little to foster early education and development prior to that milestone.
- Educators tell us over and over that children are reaching Kindergarten and first grade unprepared socially, intellectually, and developmentally. Reforming K-12 is important, but is a band aid for the real problem.
- It's time to focus attention on our babies, toddlers and pre-schoolers. That means focusing dollars on this age group and shifting public policy to address their needs.
- We will work with the legislature to direct federal, state and local dollars.
- We will encourage parents to demand and pay for high quality care for their youngest children.
- We will encourage businesses to provide family-friendly policies to support parents.
- We will stimulate activism to foster this cultural transformation.

Educare Four-Star Rating System

The Educare Four-Star Rating System was developed with the help of a wide range of early childhood educators and advocates. Based on state and national standards, child care centers, preschool programs, and family home child care providers can receive quality ratings from one to four stars. The Rating System relies on five measures of quality: Classroom Environment, Parent Involvement, Staff Credentials, Staff to Child Ratios, and Accreditation.

Classroom Environment

The physical setting, interactions between providers and children, activities and materials available, and provisions to insure health and safety are some of the elements assessed to determine how well the classroom environment supports children's learning and development. The classroom environment is rated using either the Infant Toddler Environment Rating Scale, the Early Childhood Environment Rating Scale, or the Family Day Care Rating Scale.

Parent Involvement

Parents and providers are interviewed to gauge the program's success in engaging and supporting parents as their children's first teachers. The provider's rating on this quality indicator depends on their responsiveness to parents needs' and preferences for their children and how the provider supports parents through communication, parent education, home learning activities, and opportunities for participation and leadership.

Staff Credentials

Based on the Voluntary Early Childhood Professional Credential developed by the Colorado Dept. of Human Services and the Center for Human Investment Policy, different Star levels are assigned to providers based on their education and experience. To receive high quality ratings, providers must have considerable formal training in early childhood education and classroom experience.

Staff to Child Ratios

Center-based programs with more adults available to children generally provide better quality. A Star One rating requires a center to meet ratios set by state child care licensing regulations. At each higher Star level, the number of children per adult must gradually decrease until, at Star Four, a center is meeting staff to child ratios recommended by the National Association for the Education of Young Children.

Accreditation

To receive a Star Four rating, providers must be accredited by a nationally recognized professional association such as the National Association for the Education of Young Children or the National Association of Family Child Care. Accreditation requires the provider to complete an extensive self-study of all aspects of their early care and education program, which is then "validated" through an on-site visit by a representative of the accrediting body.

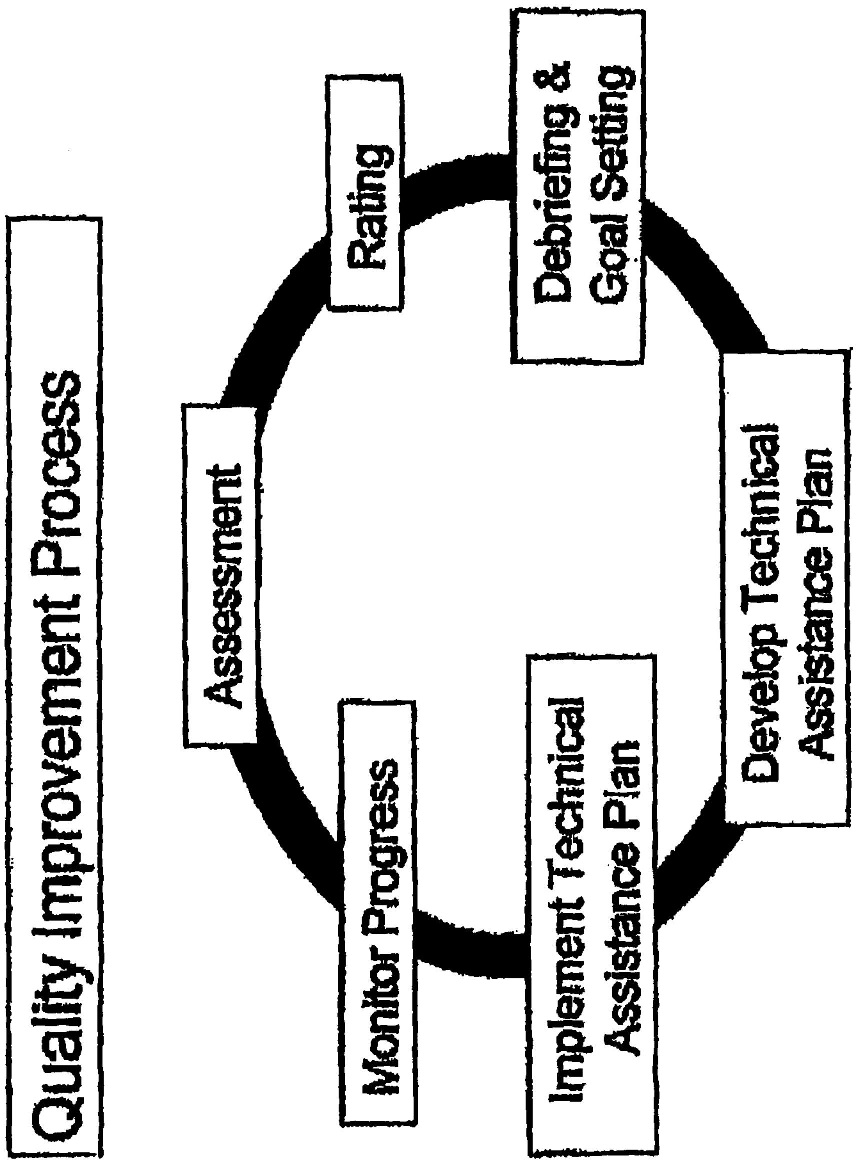
Quality Improvement Process
Assessment
Rating
Debriefing & Goal Setting
Develop Technical Assistance Plan
Implement Technical Assistance Plan
Monitor Progress

Evaluation Design

*EDUCARE SITES*

20 centers
25 family homes

- Assessment
- Rating
- Technical assistance
- Differential reimbursement
- Evaluation activities
    - QI process evaluation
    - Assessment of children

*USUAL CARE SITES*

20 centers
25 family homes

- Assessment
- Rating
- Evaluation activities
    - Assessment of children
- Cash incentives upon completion of evaluation
- Educare interention upon completion of evaluation

The RAND-OMNI Evaluation of Educare Colorado

Educare Colorado is a non-profit organization partnering with parents and child care providers to improve early learning experiences and the quality of child care for children birth to five years. Central to its work is a comprehensive approach that includes three key activities working synergistically to improve the quality of child care and its outcomes for children and families:

- ♦ A public awareness and parent education campaign
- ♦ A four star rating system to assess quality of Educare sites
- ♦ Direct assistance to Educare sites to enhance quality child care The first two activities are designed to increase public support for child care quality improvements and parents' awareness of quality child care. The third activity improves the quality of care provided and thus the star ratings of Educare sites. Together, these activities are expected to improve child care quality over time because parents will be motivated to seek out higher quality sites, which they will be able to identify easily through star ratings, and sites will improve the quality of delivered care with Educare's assistance and resources. These improvements, in turn, are expected to enhance children's school readiness, including their cognitive and socio-emotional development.

Although limited in number, previous evaluation studies suggest that Educare's efforts are grounded on a plausible assumption-- that they will improve child care quality and enhance child outcomes. Based on this promising early data, a well-designed evaluation is necessary to determine whether this assumption is, in fact, true. The need for quality child care has never been more pressing, so it is critical to determine through an evaluation study how it can be improved and thus the lives of children and families enhanced, especially given the limited funds available for child care quality improvement efforts. Today, Educare is able to continue evaluation due to significant funding by The Colorado Trust.

RAND, a non-profit policy research institution headquartered in Santa Monica, California, along with its Denver partner, OMNI Institute, was selected by Educare in a competitive national bidding process to evaluate Educare's comprehensive approach and its impact. Because RAND is randomly assigning center and family-based providers to Educare or "usual care" conditions, the evaluation will be able to determine the following outcomes unambiguously:

- ♦ Does Educare improve child care quality?
- ♦ How do these improvements make a difference for children and their families?
- ♦ Does the rating system developed by Educare reliably assess the quality of child care settings?
- ♦ Can reliability be maintained as Educare expands its efforts across the State of Colorado?

Such a rigorous evaluation study is rare in research on child care quality; even Head Start has never been evaluated so well. Consequently, the evaluation results should be highly credible among researchers, practitioners, and policy makers. The evaluation also serves both formative and summative purposes. Study findings should assist Educare in making adjustments (if any) in its three-tiered effort to improve child care, and they should substantially increase understanding of the effects of child care quality on children. Results should also contribute to improved child care practice, to new understandings about how to leverage quality improvement funds, and to addressing other important policy questions in the child care arena.

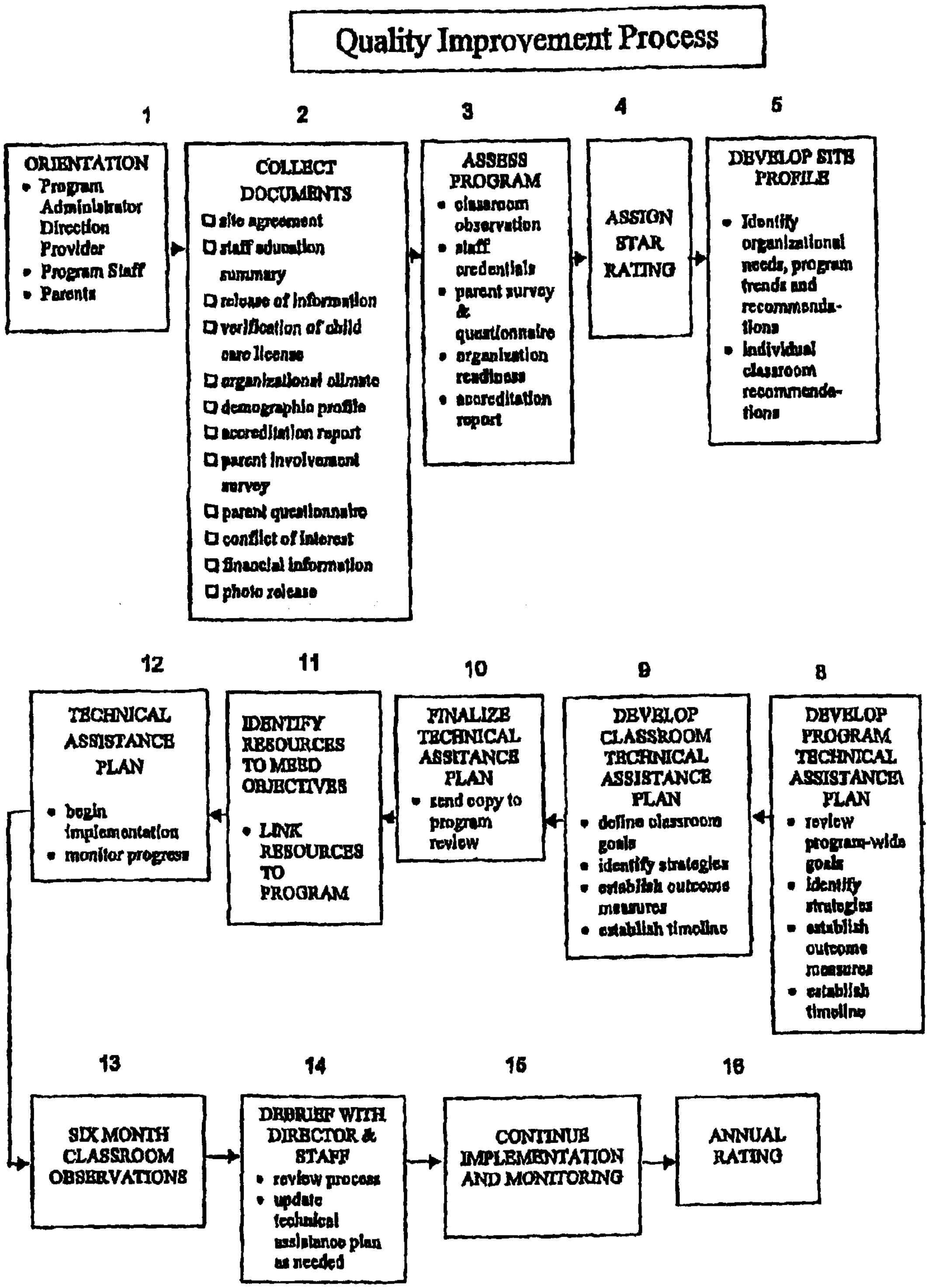
Quality Improvement Process
1
ORIENTATION
• Program Administrator Direction Provider
• Program Staff
• Parents
2
COLLECT DOCUMENTS
☐ site agreement
☐ staff education summary
☐ release of information
☐ verification of child care license
☐ organizational climate
☐ demographic profile
☐ accreditation report
☐ parent involvement survey
☐ parent questionnaire
☐ conflict of interest
☐ financial information
☐ photo release
3
ASSESS PROGRAM
• classroom observation
• staff credentials
• parent survey & questionnaire
• organization readiness
• accreditation report
4
ASSIGN STAR RATING
5
DEVELOP SITE PROFILE
• Identify organizational needs, program trends and recommendations
• individual classroom recommendations
12
TECHNICAL ASSISTANCE PLAN
• begin implementation
• monitor progress
11
IDENTIFY RESOURCES TO MEET OBJECTIVES
• LINK RESOURCES TO PROGRAM
10
FINALIZE TECHNICAL ASSITANCE PLAN
• send copy to program review
9
DEVELOP CLASSROOM TECHNICAL ASSISTANCE PLAN
• define classroom goals
• identify strategies
• establish outcome measures
• establish timeline
8
DEVELOP PROGRAM TECHNICAL ASSISTANCE PLAN
• review program-wide goals
• identify strategies
• establish outcome measures
• establish timeline
13
SIX MONTH CLASSROOM OBSERVATIONS
14
DEBRIEF WITH DIRECTOR & STAFF
• review process
• update technical assistance plan as needed
15
CONTINUE IMPLEMENTATION AND MONITORING
16
ANNUAL RATING

Educare Narrative

Fall 2000

10 minute overview

When most of us were children, mom stayed home. Dad worked. Dr. Spock counseled our parents to "trust their own common sense." And for the most part – that worked. But, today, the world has changed.

Divorce rates have soared. Single parent households make up one-third of all families in this country. Grandparents don't live down the block...or even in the same town. And mothers have flooded into the workforce. Back in 1950, one mother in ten worked outside the home. Today, the Department of Labor tells us that more than 6 out of 10 moms of children under three are working outside the home, and that number is projected to go to more than 7 out of 10 by 2005.

That means that our children, from the time they are born to the time they go to Kindergarten, are increasingly finding themselves in care outside the home.

At the same time, we know more today than ever before about the critical influence of those early years. From birth to age 5, children are sponges: learning about their world and forming important bonds for life. This "window of opportunity" is critical to a child's social and mental development.

No doubt you've heard plenty of information recently about brain development research, but here are a couple of interesting examples: Fact. Toddlers taught simple concepts, such as the difference between one and many, do better in math in high school. Fact: the more words a child hears by the age of two, the larger her vocabulary will grow. Parents and caregivers aren't just babysitters. They are the architects of the next generation.

Now, here's the bad news. A discouraging 87% of out-of-home child care settings are considered poor or mediocre. (Cost, Quality & Outcomes Study.) That's places many children in a precarious position.

Armed with that knowledge, Educare was born. We looked around and found no one else rushing to help these children and decided something needed to be done.

Our MISSION is clear:

Educare is dedicated to improving child development and early learning experiences for all children (0-5 yrs) by creating a statewide system that

- supports parents as teachers & decision makers;
- promotes high-quality child-centered care;
- is fully funded & permanently sustainable;
- is appropriately monitored & evaluated.

We're targeting quality improvement, parent support and changes in public & social policy. Here's how we'll do that.

*QUALITY IMPROVEMENT*

Our first and most established initiative is rooted in child care. As I already mentioned, most children, as some point from birth to Kindergarten, find themselves in an out-of-home child care setting.

This is a big business. Next to parent's housing costs, paying for child care is the single biggest monthly expense for working parents. But, we know that parents aren't finding high quality care for their youngsters. We're working to help them.

Let me tell you about our terrific Quality Improvement Program. This voluntary program is based on a first-of-its-kind rating system that will allow parents to better determine quality care for their kids.

Currently in four counties, we are working with about 1,300 kids in 90 classrooms. We've already had some significant success. The City & County of Denver's Welfare Reform Board has granted $4.3 million over three years to reimburse Educare sites differentially based on the quality of ratings.

We're looking at five key predictors for quality.

*Classroom Environment:* Of course, we're determined to meet and exceed current safety guidelines, but we're encouraging providers to work towards educationally stimulating and enriching environments.

*Parental Involvement:* We know that parents play a key role in elevating the quality of a program, and their involvement is directly tied to the success or failure of their child's education.

*Teacher credentials:* Great teachers make an enormous difference in the quality of a program. We're sending teachers back to school, giving them the tools to better understand child development and working to hike their wages – so that they aren't lured away by better paying jobs at gas stations and fast food restaurants. We want to give this profession the respect it deserves.

*Adult: Child Ratios:* Generally, the more adults available to children in a program, the higher the quality of that program. Teachers get to know children better and children receive more individualized attention.

*Accreditation of Program.* Using established predictors of quality, we're rounding out our 4-star system.

With the help of site coaches, we've offered technical assistance and resources to these classrooms, and we've seen some early results that lead us to believe we're on the right track.

We're planning continued expansion this year, and we hope to move into four additional counties across the state. Rollout will take several years, and we plan to make the Educare Quality Improvement model available throughout the state. All Colorado parents must have access to our information.

In addition, we believe that to make our program fully credible and reliable, we must engage in a detailed evaluation process for our Quality Improvement System. Therefore, we've enlisted the help of the Rand & Omni Corporations to evaluate Educare's process and outcomes, and develop a system for on-going monitoring of child care.

*PARTNERING WITH PARENTS*

When Educare was conceptualized, we thought it would be primarily child-focused. After all, we were talking about the development and education of little kids. But, while conducting research across our state, it quickly became apparent to us that we were ignoring our most important customer: parents. Without the support and determination of Colorado parents, we'll never reach their children.

In the past year, we've talked to several hundred moms and dads and they've universally told us the same thing: They could use some help. Though the issue of child care is critical – and they all agreed on that – it's only a part of their lives.

Their intentions are good – they want to raise smart, healthy and well-adjusted children – and they're longing for support from their community.

Out of those conversations, we developed the second Educare initiative: Partnering with Parents to Improve the Lives of their Young Children. We have created and will implement a parent communications plan and web strategy that will empower parents to make informed decisions regarding their child's development.

Through traditional and innovative communications material, we will support parents as decision makers, by empowering them to take an active and educated role in the selection of high quality out-of-home care.

Also, we'll support parents as teachers, giving working and stay-at-home parents developmentally appropriate activities to educate their children. We'll reach low, middle and upper income parents through printed materials, videos, media partnerships and educational opportunities.

We will also provide parents with an interactive website, to communicate information, share resources and partner with terrific state-wide programs. We've designed it to move us into the future. We know parents are interested in newsletters about developmentally appropriate activities...we know they long for a place to turn to ask important – but sometimes embarrassing – questions. We know they're looking for local information.

Parents are asking for support and we plan to provide it. This is a cultural transformation – a significant society shift, and that's where our third initiative takes shape: Public Policy and Public Education.

EXECUTIVE SUMMARY

A child's educational achievement, economic well being, health and development are critically shaped during early childhood. The appropriate support and learning environment of children during the first six years of their life are now known to have a profound impact on their future success. Recent studies that have highlighted this influence have received considerable media attention in recent years. Some community and governmental action is occurring as a result, but much remains to be accomplished. A major movement in our society is required. Through a unique public and private partnership, substantial attention and resources are now being focused to meet this challenge. A new national organization, *ToolBox* is being formed that combines the strengths of concerned citizens, business leaders and not-for-profit organizations by using the unifying and informative power of the World Wide Web. All the resources and interested parties -- parents, children, providers, professionals, businesses, governmental officials and charities - will be assimilated using "high tech"-- the Internet, state-of-the-art technology and multimedia, and "high touch" -- a nationwide, local and personal service network.

*ToolBox.com ("ToolBox" or the "Company")* is a holding company that is being formed by a select group of charities, associations and business people who are dedicated to a substantial national investment of resources toward the development of our youngest children. Their aim is to create a virtual community that advances information, services, resources, entertainment and interaction to serve the needs of children from birth to school age -- and the people and organizations that care for them. To ensure every child develops to their full potential, this Web-centered organization will empower all parents, childcare providers and children with educational content and valuable services while creating a forum for community action. Its name, *ToolBox* reflects its mission -- To assure every child has the tools to succeed:

- ☐ More parent resources, support and training,
- ☐ Improved preschool program quality, availability & accessibility;
- ☐ Increased access to quality child medical
- ☐ Greater abundance of child enriching programs and activities.

The Company's services will be delivered through an effective combination of charity, association and for profit entities;

ParentToolbox.org - a non -profit information & childcare referral site;

ChildcareToolbox.com - A for-profit B2B Application Service Provider - that provides education materials, programs and activities for use by child care providers plus related services to support the professional;

KidToolbox.com - A multimedia online membership service providing educational software, learning games, curriculum and activities for parents to do with their young children, interactive programs, video library and Web camera links to day care facilities.

Using the communication medium of the 21st Century - the Net, the Company seeks to:

- Be the first branded "Vortal" (a specialty, vertical portal) for early childhood services and advocacy.
- Create a substantial virtual community of providers, parents and the public focused on children 0 to 6.
- Offer both national and local content and services
- Become the center for parent advocacy issues
- Be viewed as Non-Commercial - Its mission is not compromised for Profits. Be a blend of Charity, Association and For-Profit services
- Deliver services as an Application Service Provider: All programs and services are Web-based.
- Offer customers ease of use, regular updates of software, controlled children access, minimal equipment costs (affordable to all).
- Establish itself as a Media company that informs, educates and entertains - Create a consistent brand across mediums - Internet now; cable style programming later.
- Establish a high standard of quality for childcare equivalent to ISO 9000.

Content Providers θ Aggregator θ Media/Branding

Toolbox's plan is have its Vortal and three sites provide an assimilation mechanism for all the organizations, individuals and companies that are concerned with childcare development. It is seeking to create a well-known, very accessible single location — a virtual community -- where services and programs can be efficiently delivered for all that need them. The Company quest is to fully exploit the commercial opportunities of the Web by creating a consortium and/or partnership with three types of organizations:

Content Providers - The National Association for the Education of Young Children (NAEYC), the National Association of Child Care Resource & Referral Agencies (NACCRRA), and Educare Colorado (three of the founding organizations of Toolbox) have educational content, referral and informational services, training programs and childcare improvement materials, plus certification and rating programs that they wish to have reach a greater audience of providers and parents. By these organizations, and possibly others in the field, creating a new association they collectively are better able to exploit the Web domain and make the content each has independently developed reach a much larger market.

Aggregators - There are a number of national and local charities, foundations, associations and businesses that seek to draw all concerned citizens and organizations together to create a movement that will substantially improve the country's commitment to early childhood development. Included in this group is the Carnegie Corporation and a group of national business leaders whose concern for children zero to six has led them to be founding partners in Toolbox.

A number of commercial aggregators have also emerged on the Internet in the early childhood care and education domain. These commercial enterprises may not fulfill the mission-based objectives and market place needs important to the founding organizations of Toolbox. The Company is exploring whether it should partner with these aggregators or develop its own aggregating entity. Toolbox will partner with an aggregator for a financial exchange if it can establish sufficient contractual strength to fulfill its mission in a commercial forum.

Media/Branding - Multimedia companies and Internet Portals have created significant market presence on the Web and developed high brand awareness. Many are seeking to attract families and should be interested in Toolbox's proposed programming and services targeted at young children, their parents and childcare providers. Toolbox is desirous to develop strategic partnerships with one or more of these companies to benefit from their branding and market reach. Furthermore, partnering with an existing branded Web media company will strengthen Toolbox's position with the capital markets and facilitate financing of the Company. However, by choosing to create its own independent aggregating entity, i.e. an early childhood specific Vortal, Toolbox might better ensure its mission objectives are realized and improve its ability to build its own brand awareness.

Toolbox will provide the mechanism to realize the mission & goals of its founding organizations (NAEYC, NACCRRA, Educare & Carnegie):

- Developing greater public support for early childhood development and educational facilities.
- Continually improving the quality, quantity and diversity of childcare centers and the child development profession.
- Establishing a central location to tie all persons and organizations concerned with early childhood development.
- Substantially expanding the information, services and resources available to parents of young children.
- Maximize the growth and development of children from birth to 6.

A key to the success of Toolbox is to be the nationally known early childhood Web site - To have the most recognized "Vortal" and domain name (Web address) on the Net among early childhood content patrons. This will make it number one in both traffic and services. An aggressive marketing campaign will make Toolbox's Vortal site a well-known place to go to access every type of early childhood content a person could wish.

Once users find Toolbox's Vortal, they will discover content and program offerings unparalleled in the early childhood online industry with special interactive and regularly scheduled programming. To keep their loyalty, the Company will continually use developing technologies and techniques to offer its customers the newest types of services and early childhood audio, video and multimedia presentations. Toolbox's Vortal will become the early childhood brand name site, known as a combination online hyper-linked early childhood parent and provider support network, and a multi-media educational program channel targeting children 3 to 6.

The Company, as part of its branding strategy, is seeking to establish key strategic alliances with major Internet and multimedia companies to market, deliver and expand its services, programming and content to its target end users. With the major Internet trend of users accessing software applications online, rather than having them reside on their computer, Toolbox is the perfect complimentary application for Internet service companies aggressively seeking to expand their Internet services to families:

Telecommunication Companies (Baby bells, AT&T, Sprint & MCI) are seeking to expand their markets to homes with high bandwidth services complimented by Internet and e-commerce facilitation services;

Internet Service Providers (e.g.Verio, Mindspring, Qwest) have become Commerce Service Providers (CSP) or Application Service Providers (ASP) to increase their revenue per customer by offering comprehensive content and programming and expand their revenue beyond access fees.

Portals have already shown interest in developing content and programs targeting families - Toolbox would be an excellent compliment to their services and Web site.

Multi-Media Companies (e.g. Disney, Time Warner, CBS) are recognizing the entertainment potential of the Internet and impact of its ultimate convergence with cable programming. Toolbox's target market of families with young children (9% of the US population) and its organizational expertise and knowledge of this market These national companies can in turn provide Toolbox with access to millions of parents and providers and greatly enhance the Company's branding and marketing effectiveness plus be a source for multimedia content.

The First Comprehensive Service for Childcare Providers

Toolbox will be priced to be affordable for all parents and providers - For childcare centers and providers, the ChildcareToolbox ASP** will have no start-up or maintenance cost and a low monthly fee. Parents can use the KidToolbox site and service for an economic membership or per use fee.

These childcare professionals and parents will have access to hundreds of software educational programs and games designed for young children and thousands of multimedia videos. No other service of this nature exists for this market.

** ASP – Application Service Provider: An ASP is a totally Web-based system that provides online access to the latest in software and hardware systems all for a low monthly or per-use fee. All that is required of the user to access the system is a keyboard, mouse and monitor. It is similar to "timesharing," the practice of leasing mainframe space common twenty years ago but greatly enhanced by new technologies and the capabilities of the Internet.

Childcare providers, regardless of their size, can now benefit from the universal accessibility and interactivity of the Internet to provide better educational programming for their children and to improve their business operations. All centers and home-based childcare providers will be able to afford their own sophisticated educational services without any up-front cost or needing information technology (IT) staff and knowledge. Even those larger childcare centers that have some computer and educational program capability, can now have a Web-based system with far greater capabilities and flexibility. The highly functional ChildcareToolbox is usable and scalable for any business size and can integrate with the organization's existing systems. It is an easy-to-use, turnkey ASP system with no training required, components to patch together, equipment to purchase or software to install. With no up front costs or on-going maintenance costs it offers every childcare facility and provider an economic multi-media educational system that will be continuously improved. A standard dial-up connection is all that needed. For small and medium sized childcare facilities as well as family childcare homes with limited resources, Toolbox is the solution.

Childcare Rating System

Although this plan has not incorporated in its financial projections an evaluation function for child care settings it is contemplated that this service will be an integral part of the service with pricing that is appropriate to the service rendered. This concept remains under development.

A Multimedia Educational Channel Targeting Children Under Six

Over the next decade the cable and telecommunications systems are expected to merge with the Internet. This new convergence movement with its broadband capability (high speed lines) will make possible both interactive and multimedia programming that can be personalized to any audience. This will create an opportunity for educational programming for young children that is responsive to their interests, understanding and attention span. Highly entertaining programming with strong educational content is possible. KidToobox plans to be the site/channel for quality young children programming.

There is significant potential for Toolbox within the present Internet market and in the future multimedia convergence market. The Company projects by the end of its year it could have a minimum of 10,000 users and over one half million in its third year. With a major national media corporation as a strategic partner, Toolbox' market impact could easily be ten times this estimate. Toolbox is on the leading edge of a major trend - users accessing software online instead of on their computer and the multimedia, real motion video and interactive programming of the near future.

The Company is assembling a diverse and highly qualified top executive team to assume the management of the company and to execute the business plan. Toolbox plans to raise sufficient funds as part of its first round of financing to fund the initial Vortal, sites and service's development plus it early marketplace introduction. This financing round will allow Toolbox to establish key strategic partnerships necessary for its planned penetration into the marketplace. With this investor capital, Toolbox can be positioned for an aggressive, yet carefully executed growth. Investment and development partners are being sought who will provide knowledge, experience, contacts and capital to position the Company to achieve its goals.

Toolbox, with its whole package of educational programs-and support services, will help both parents and childcare providers develop young children to their full potential. This should help all of the organizing partners better achieve the missions they were designed to accomplish. With a majority of families moving on line and using the Internet to improve their communications, the Company has the potential of being the premier Internet business in this domain in the first part of this decade -- providing mission critical elements to the non-profit community and profitability for the company's financial investors.

THE COMPANY

Current Status

*ToolBox.com ("ToolBox" or the "Company")* is a seed holding company being formed by a select group of charities, associations and business people who are dedicated to a substantial national investment of resources toward the development of our youngest children. It will manage three Web-based service companies:

- ParentToolbox.org - A single source information & childcare referral site.
- ChildcareToolbox.com - B2B Application Service Provider in support of childcare professionals.
- KidToolbox.com - A multimedia online membership service

Concept of Services

A MISSION DRIVEN ORGANIZATION

The purpose of ToolBox is to create a more supportive "virtual" community for parents of children under age seven and the facilities and professional that serves them. The goal is to establish a more enriching growth experience for these children and to cause a shift in public *attitudes*, influence individual *action* and eventually grow social *activism* to better meet their developmental needs.

*THE EARLY CHILDHOOD VORTAL*

A major key to the success of ToolBox.com is to create a nationally recognized "Vortal" (also called Vertical Portal or Hub) and have this Web Site's domain names (and the organization it represents) have high un-aided recall recognition by the public as the source for early childhood parenting and childcare. The Company will utilize a marketing and promotional program that will make its Vortal site and services a well-known and desirable place to get information and support on childcare and parenting, child service providers and professionals, and a quality rating system of childcare facilities.

Using the full capacity of the Information Superhighway, ToolBox will:

- Meet parent demand for easy-to-use, informative and objective Internet resource for local-based child related services - Providing information and ratings on a comprehensive range of localized childcare services for every region in the country; including all states, Metropolitan Statistical Areas (MSA) and rural areas.
- Be a Web site designed with the users in mind (parents, providers and children), giving them the exact information, education and services they desire in an easy to navigate and understandable format so they can quickly find and use the service they seek.

- Gain national name recognition as the Web site for all people concerned with the needs of children six and under.

- Become a comprehensive, single and affordable resource for all persons serving the care needs of young babies and children with both on-line and localized services, education, and content.

- Use state-of-the-art Web technology to provide entertaining but educational content including interactive learning and full motion video for use by children under age six, plus their childcare providers and parents.

- Bridge the "digital divide" by making accessible to all people in the early childhood arena: (1) technology; (2) educational media, content and software and; (3) interactivity.

- Build an early childhood movement - both a virtual and real community that makes services and support of children from birth to age six a national priority.

TOOLBOX'S VORTAL SERVICES

From The Toolbox Vortal Users Will Access 3 Major Service Sites:

A Parent Resource Site

ParentToolbox.org will be an easy-to-use, one-stop online resource designed to help people find all the information they need to care for their children from birth to age six. It will be a clearinghouse providing information on childcare facilities (including the Educare Rating system), support groups, plus resources, events and opportunities in their own communities. It will features customizable services and comprehensive information to make it easy for the parents of children under six get the help they need. "Org" means we the site will be nonprofit to provide assurance to its users that it is an objective and non-commerce resource. Users will pay no fees or costs. ParentToolBox will accept no advertising but instead will use corporate sponsorships similar to those used by NPR and PBS.

This site will be a partnership between Toolbox and its nonprofit partners (associations, charities and foundations) who bring their specialized expertise, content and resources to the site.

Community Resources

The Parent Toolbox is being designed to be personalized for each user to find specific services, resources and events in their community. The parent logs on with their address and a local map will appear showing their home location and the activities, childcare facilities and other key locations of resource available to parents for their children surrounding their home. By clicking on any of locations indicated on the map, a parent can learn more about that event or resource. A slider bar will also provided to obtain information on a variety of topics. Parents will be able to learn about fun activities, educational programs, childcare services, certified babysitters, play groups, health care and other information pertinent to raising a child. An "Ask Molly" box will enable the parent to ask open-ended questions and receive answers to their inquiries (Using the "*Ask Jeeves*" approach). A Service Locater is also on the page.

Childcare Provider Online Services

ChildcareToolbox.Com is a B2C service that will be the first complete Web-based full-service resource for childcare facilities and providers.- All the services and state-of-the-art technology these individuals and businesses needs will be provided. Major service categories to be offered by the ChildcareToolbox will include business management support services, child development curriculum and materials, learning games and entertaining programs, professional educational programs, financial and marketing assistance, information and resource sharing and information technology support - All integrated into, and accessed from, a central Web-based platform that requires minimal hardware and no software expense. It will be the preeminent Web site for childcare providers available for an affordable monthly membership or per-use fee This subscription site is intended to meet all of the needs of people that provide educational and support services to children under school age. It will feature instructional programs and materials, current events on developments in the field and beneficial services and products. The strong content and dynamic use of interactive education will more than justify the affordable service fee. It will give childcare workers, preschool educational facilities and the children they serve access to quality educational software, programs and materials that are presently too expensive for most. Some of the site's other B2B services will include:

| | |
|---|---|
| Childcare Industry Information | Distance Learning |
| Evaluation /Branding | Educational Tools |
| Web Camera Services | Data Collection & Reporting |
| Buying Services | Benefits |

In partnership with a Web-based small business service provider, ChildcareToolbox will also offer a complete selection of online services needed for the management of a childcare facility: accounting, payroll, taxes, financial management, marketing and sales, human resources, e-banking and finance, management support and information technology Early Childhood Multi-Media Educational Site KidToolbox.Com will use the full potential of the Internet to deliver dynamic, educational multi-media programming for children. As technology and bandwidth allow it will provide interactive learning programs that are designed for young children. As the mediums converge, KidToolbox will be positioned as the most comprehensive source of educational materials, learning games, educational software, video library and interactive learning programs all available online. With every service Web based there is no requirement to purchase software and minimal hardware needed. Low monthly subscriber or per-use fees make its accessible to all. A special scholarship program will bridge the digital divide for low-income families. Parents can confidently use this service with their children knowing it is age appropriate, effective but entertaining. To compliment and support the parent, KidToolbox will provide curriculum materials and learning advisories, FAQ, newsletter to assist them in making a powerful and positive educational environment for their developing child.

LOCAL SUPPORT SERVICES & NETWORK

**Technology despite all of its capabilities will not meet all the needs of people. As the book *Mega Trends* pointed out - for every "high tech" development they is a corresponding demand for "high touch." Though advances in technology and in the Internet provide great promise for improving communications and customizing response systems (particularly as the Web converges with cable programming) this mass medium is no substitute for human contact - both over the phone and in person. Successful Internet companies have discovered that when people are in need, and particularly when they have a crisis, no Web based customer response system is adequate - People want to make contact with a person who can address their problem. As a result, these companies have sophisticated call center and local support services. Correspondingly, those companies that are weak in customer relations are failing. To ensure a comprehensive support network, Toolbox is developing a three-tiered system for personal services, support and communication (As illustrated in the Chart below):**

National Level: The Toolbox Portal that uses mass media and technology.

Local Level: Community based resource & referral agencies accessed by phone.

Personal Level: Direct home or facility professional service for kids & families.

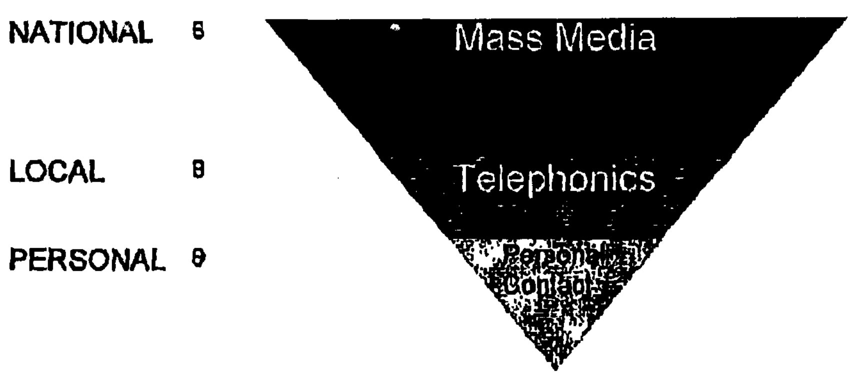

Toolbox goal is to be totally responsive to the needs of both parents and providers by making the services for young children in each community more accessible and comprehensive. The Toolbox Vortal, specialty sites and local community Web sites will provide information, education, locator and referral services. Assistance in each community will be delivered through its localized telephonic services using NACCRRA's national members of childcare resource and referral agencies plus other local service organizations. Direct personal support will come through NAEYC's large national membership base of early childhood professionals plus numerous other private and governmental organizations with services targeting children and family service. The Company is assimilating an unprecedented national network to give parents and providers of young children with easy access to national, local and personal services.

Business Strategy

POSITIONING STATEMENT

Toolbox will be the first nationally Branded Internet service for parents, providers and professionals of children from birth to age six. It will establish a preeminent position in the market seeking both high brand name awareness and the reputation as the Web source for finding, improving and rating childcare services in a community.

While both for-profit and non-profit competitors presently exist, Toolbox will be the most comprehensive and an industry leader in the use of multi-media and interactive learning for young children while being affordable for all. Both parents and providers will learn to depend upon the Toolbox sites and local based services as the best place to go to select services by the criteria important to them and regardless of where they live in the country.

The Company will make continuous improvements to their sites to ensure its trendsetter position in the industry and for maximum responsiveness to its users. Through acquisitions, mergers and strategic partnerships it will continually be tapping the most advanced and dynamic content and programs available. This will create a strong word-of-mouth position for the Toolbox which, when complimented by the Company's marketing and promotional plan, will drive millions of both parents and providers to its Vortal. This high traffic and national reputation of Toolbox will in turn make it the choice for thousands of childcare centers and professionals and millions of moms and dads.

REVENUE MODEL

Successful Internet services are both innovators of revenue generation and utilizers of multiple income sources. Toolbox not only plans on acquiring significant "eyeballs," it will provision a variety of services and information that will not only make it "sticky" (i.e. have users continuously return) but also be "magnetic" (strong word-of-mouth that draws thousands of other users). As a site that will draw a large population of women (the Web's soon to be dormant user), its magnetic quality will be particularly valuable to advertisers and Web sites targeting this market.

Revenue sources under consideration include:

- Membership & User Fees
- Banner Advertising
- Licensing services to other sites
- Affiliate Marketing
- Portal Search
- Virtual Shopping Mall
- Public Service Advertising (Similar to PBS & NPR)
- Demographic Studies
- Web-based Educational Software

PLAN OF ACTION

Develop Participating & Strategic Partnerships

Toolbox is seeking to develop this new national service in co-partnerships with a select group of national associations, charities, foundations, businesses and community leaders. Included in its participating partners will be nationally recognized organizations with a strong focus on early childhood that have resources and content to contribute to Toolbox's services development and whose organization mission is synonymous and complementary. Organizations presently under strong consideration include NACCRA, NAEYC, and the Carnegie Corporations.

Milestones

| | |
|---|---|
| Business Profile Completed | May 15, 2000 |
| Initial Participating Partners Secured | June 1, 2000 |
| Business Plan Completed | July 1, 2000 |
| Development Financing (Phase I) Secured | September 1, 2000 |

Implementation Plan

*Toolbox* plans a two-phase immediate implementation plan followed by a long-term expansion plan:

- Phase One - Beta test site, sales and marketing systems and operations tested.
- Phase Two - Full service roll out of Web services.
- Full Expansion - Comprehensive Web site(s) complimented by intensive national marketing and branding campaign.

Goals & Objectives

LONG TERM GOALS

Realize NAEYC's Goals:

1. Facilitating improvements in the professional practice and working conditions in the field of early childhood education by creating professional development opportunities/resources and by setting and promoting standards of professional practice;

2. Improving public understanding and support and funding of high quality programs in centers, homes, and schools serving young children and their families through public policy initiatives and public awareness and engagement activities; and 3. Building and maintaining a strong, diverse, and inclusive organization that enables achievement of Goals 1 and 2.

Realize NACCRRA Goals:

1. Create a common ground where families, childcare providers, and communities can share information about quality childcare.
2. Give voice to the childcare needs of families and communities.

3. To ensure that every parent has access to good information about finding quality childcare and resources in their community, through national consumer marketing and by raising visibility for local child care resource and referral agencies.

4. To build a diverse, high-quality child care system with parental choice and equal access for all families.

Fulfill NACCRRA's Mission:

*To promote the growth and development of high quality resource and referral services and to exercise leadership in building a diverse, high-quality child care system with parental choice and equal access for all families.*

Address Carnegie Corporation's Call to Action:

A. Promote Responsible Parenthood

B. Guarantee Quality Child Care Choices

C. Ensure Good Health and Protection for young children

D. Mobilize Communities to Support Young Children and Their Families

Fulfill Carnegie Corporation's Early Childhood Mission:

*To develop effective approaches for linking early childhood education, parenting support, and improved instruction in the early grades to strengthen young children's literacy and mathematical skills.*

Realize Educare Colorado's Goal:

1. Supporting parents, via a website, telephone hotline, family education programs and other offerings.
2. Improving Childcare, though a rating system, training, and financial assistance.
3. Strengthening the social contract by advocating changes in public policy and in the private business sector to better support families of young children.

Fulfill Educare's Mission:

*To improve the care, development & learning of children aged zero to six.*

Toolbox's Goals

➤ To become the dominant early childhood Web-based service company in the US.

□ Having the largest number of early childhood parents and providers utilizing the Company's services.

□ The ToolBox.com brand name becomes synonymous with early childhood services.

□ Create a powerful community of support and social activism for early childhood education and parental support equivalent to the senior citizen community.

□ Ensure every child in America in its first six years of life is prepared socially, mentally and developmentally.

SHORT TERM OBJECTIVES

- Fully develop the Toolbox Business Plan, secure the initial partner organization's participation and incorporate the Company by August 1, 2000.
- Launch the Beta Test Toolbox Vortal by September 1, 2000.
- Launch the national rollout of the Toolbox Vortal and three service sites December 31, 2000.
- Establish and maintain 30% name recognition of Toolbox with the country's childcare providers and centers with an established reputation as the site for valuable and affordable early childhood resources and services (Aided & un-aided recall).
- Sell memberships to at least 10,000 childcare centers by December 31, 2001.

The Management Team

Interim Top Management Team

Toolbox plans to recruit a management team that has a potent combination of entrepreneurial ingenuity, corporate experience and Internet industry expertise. They will be capable of swiftly positioning the Company within the marketplace and achieving strong profitability. To round out the management team, additional managers and technicians will be recruited with expertise in their respective disciplines and/or experience in the Internet industry. As a marketing and sales company, Toolbox will remain a lean and efficient company with optimal management and staffing. Its initial top management team will be composed of:

- President / CEO
- Chief Technical Officer
- Chief Operating Officer
- Chief Marketing Officer
- Chief Financial Officer
- Creative Director

BOARD OF DIRECTORS & KEY ADVISORS

Board of Directors

ToolBox is recruiting a Board of Directors composed of experience Internet and IT experts, successful entrepreneurs (particularly in Internet companies) and nationally recognized childcare service and child development specialists.

Key Advisors

The Company will be utilizing a number of outside management advisors to provide technical, marketing and support services to compliment the management decisions and creativity.

Ownership

The founding organizations - Educare, NACCRA, NAEYC, and the Carnegie Corporation -- will hold initially controlling equity shares in the ToolBox Corporation. A select group of investors will hold the balance of ownership of the Company.

Facilities

Toolbox corporate headquarters is in Denver. A compelling reason for this is that it is becoming the *Convergence* Capital of the US -- One of the biggest trends in the new Century is "Convergence." It's the latest telecom and high-tech buzzword. It means that the separate industries of telephone, data and video are melting into one mega-business of mass, mostly digital, communication. Companies are either building or acquiring high-capacity networks and services so they have the ability to offer customers voice, video and text over the same pipeline. These companies want to sell so-called "bundled" services, or packages of local and long-distance telephone, wireless, Internet-access and eventually video services. Colorado has been nationally known as a telecommunications and cable TV powerhouse. Now with the convergence movement, Colorado is becoming an important high technology and telephony center.

Rocky Mountain High... Tech -- Colorado is also emerging as a center for regional high-tech ventures. "With a wealth of corporate, government, academic, and entrepreneurial resources at its disposal, Colorado is coming out of the clouds." [Red Herring.com] Venture Economics now ranks Colorado as the fourth most active state for venture capital investment and high tech start-ups. Investment by early stage investors is estimated to have exceeded one billion dollars in Colorado during 1999, primarily in high tech companies. "Colorado is a vibrant, exciting market for early-stage information technology companies, with a committed group of local VCs who welcome regional and national funds to join in their investments," according to Red Herring.

Unique Characteristics of Company

Keys to Success

- A focus and mission based upon the needs of developing children.
- One of the first into a new Internet service category
- A Web-based system, the platform for most future IT systems.
- Strong strategic partnership potential - A valuable service for any ISP or Portal looking to add free or low cost services that will draw users and create *stickiness* - keeping users on the site longer per visit.
- Affordable service with little front-end or maintenance charges.
- Targeting the early childhood market, which has an attendant high need and demand for the service.

- Subscription-based income model ensures revenue stream and early profitability. Preferable to most ad-based Internet revenue models that is projecting to take years to generate a profit.
- An application that can be effectively used by any type and sized childcare provider and by any parent or care giver of children under six.
- Fills major needs in the marketplace.
- Easy-to-use sites with no training, software downloads or technical support staff requirements.
- An excellent interface system for the existing and emerging Application Service Provider systems which experts predict a majority of people will be using in the future.
- A co-partnership model with major early childhood organizations ensures quick market penetration as the Company benefits from their knowledge and content, plus their local service channels.
- A "dot com" company that will interest Wall Street because of its huge market potential, a strong business case and ability to quickly generate a profit.
- A great acquisition target - Major Internet companies have been acquiring a number of similar services, most within months of startup launch or while still in beta.

Toolbox has a number of other unique advantages that will enable it to successfully compete in the early childhood online market

- Offering the widest variety of content on the Internet.
- Focused on comprehensive and responsive customer service.
- Pioneer site to feature scheduled feature shows and programming on its site.
- Be an industry leader in the use of the latest technology and new multimedia formats.
- The first Vortal Early childhood Internet site that will achieve national brand name recognition.
- An aggressive marketing program that will fully utilize both the Internet and traditional advertising medium.
- A comprehensive and industry experienced management team.

MARKETS AND COMPETITION

Early Child Development & The Internet

HISTORY & OVERVIEW

The Internet is in its embryonic stage of development towards becoming a global communications and information distribution system. Internet technologies are the catalyst for consolidating computers, telephones and broadcast technologies into an integrated, all-purpose information system. The emerging view of the computer as an information appliance is spreading to cell phones, pagers and Personal Digital Assistants (PDA). As more of these devices are Internet connected, there will be an increased utility each will derive from being connected to the other.

The proliferation of the Internet is happening more rapidly then any communications medium in history. Radio took 38 years to reach 50 million users. Television took 13 years; and, cable TV took 10 years. It has taken the Internet only 5 years to reach 50 million users. The communication power of the Internet is greater then any other medium because of the dominant features of low-cost and instantaneous point-to-multi-point/multi-point-to-point communication. The potential of the Internet will evolve rapidly in the coming years as a communication medium and management tool for all sized organizations and individual users.

Internet Users

The number of active Internet users in the U.S. is growing at an astonishing rate. IntelliQuest Research has just released a report estimating the U.S. Internet population at more than 83 million adults, that is 40% of the U.S. population age 16 or older. This is up from 66 million online during the same quarter in 1998. Moreover, forecasters predict an additional 41 million people plan to go online at some point in the future -- 17.2 million within the next year. Worldwide the number of Internet users is expected to range from 90 million to a 100 million users in 2000. Estimates place the segment of users that access the Internet every day at approximately 25%. An additional 25% of users access the Internet 5 times or more each week.

DEVELOPMENTS & TRENDS IN EARLY CHILDHOOD

Child Care

- Childcare and elder care are two of the fastest growing industries in the United States.
- Child Care: Twenty nine million children under the age of 13 live in families with working parents who are likely to need childcare.

- The Sandwich Generation: More than nine million Americans are faced with caring for aging parents while raising their own children.
- Despite numerous studies that show the immense impact of early childhood intervention and educational programs, these remain chronically under funded in the US. This is in spite of a large majority of citizens understanding that the most important learning years for a child are 0 to 5.
- The availability and affordability of quality early childhood educational facilities is a major national problem. [The Educare study in Colorado indicated that 87% of Colorado's children receive mediocre or poor childcare.

Parenting

- Of the 93 million Internet users in the United States, almost 49% have young children.
- Improving the educational system is the number one priority for Americans today.
- 9% of Adults in the US have children under six.
- 70% of mothers with young children are employed outside of the home - A percentage that increases each year with 80% of all mothers expect to be working outside the home by 2005.
- Greater parent involvement is the number one answer given by Americans as to how to improve children's education and conduct.

RELEVANT INTERNET DEVELOPMENTS & TRENDS

Diversified Revenue Model

Analysts and investors in recent months have become very worried about "dot.com" companies without multiple revenue streams and are favoring Web companies with a highly diverse revenue generation model and B2B focus. The need for diversified revenue streams to survive is evident as analysts predict that revenues from advertising and commerce are expected to be a diminishing source of income.

Multimedia:

Broadband - By 2003, only one in five households will have broadband access (Jupiter January 2000)

With an expected doubling of population size and correspondent penetration of a clear majority of American households, the Internet will establish itself as a mass-market medium by 2003

Paid Content is not a mass-market primary business model as consulters are used to getting Web content for free. However, two categories of paid content projected to grow by 2003: broadband-oriented and video content ($177 million) and kids' content ($129 million).

Increasingly, media (instead of creative) will be responsible for driving quantifiable marketing results. [Jupiter Communications 1/12/00]

Magnetism

Today, with the ease of access to capital from venture capitalists and the unconditional support of the public markets, companies are spending prodigious amounts of cash on brand building and positioning, a move they will not be able to sustain for long. All attention is on growth - and thus, customer/audience acquisition - at any cost. Within five years, especially after the amount of new consumers coming online begins to slow, all these companies, whether media or commerce, will shift their strategies from customer/audience acquisition to retention; with that shift will come the profitability of some and the demise of many others.

Women

The online gender gap is nearly eliminated; women presently comprise 48% of all Internet users and will be a slight majority of online users in 2003. [Jupiter Communications 3/99]. Women control or influence over 80% of all purchase decisions. (Ad Age). Women will account for approximately 48% of online sales by 2000. (Jupiter). Analyst say there are two ways to provide content aimed at women: the "Wal-Mart" approach (such as iVillage), which offers a bit of everything to try to serve everyone, or the "specialization" approach, which focuses on specific interests.

Parenting Sites

Are there already too many parenting sites? When Oxygen.com announced its entry into the women's Web market, analysts worried that it would be tempted to follow the path of competing women's sites. They cite the company's addition of the Moms Online Web site ("*A Community of Moms*") as an example of me-too programming that won't work if it just mimics iVillage.

The Online Marketplace Is Booming

The number of Internet users will reach approximately 502 million in 2003. (IDC) Online advertising revenues are projected to grow to $22.2 billion in 2004. (Jupiter) Worldwide commerce revenue on the Internet is expected to grow to more than $1 trillion in 2003. (IDC)

The Digital Divide

According to the Kaiser Family Foundation's survey conducted in February of this year the digital divide still exists: Among higher income Americans, there is virtually no racial gap between those who have computers and Internet access and those who don't. But people with lower incomes and less education, and those over the age of 60, are definitely on the have-not side of the divide. Fifty-four percent of employees with low incomes (less than $30,000 a year) use a computer at work, compared with 81 percent of higher-income employees. The gap is narrowing; 48 percent of low-income Americans use a computer at home and 31 percent have Internet access. However, race is still a factor: there is an 11 percent gap between African Americans and whites who use a computer at work but a larger 22 percent gap between African Americans and whites who have a computer at home (51 percent versus 73 percent).

Application Service Provider (ASP)

ASPs are one of the hottest trends in the telecommunications and software industry that are predicted to be the Internet service in the near future. These businesses provide outsourced applications online, normally using high-speed access lines - Similar to (but a substantial improvement over)

"timesharing" the practice of leasing mainframe space common twenty years ago. Through an ASP service businesses will have access to the latest in software and hardware systems all for a low monthly or per-use fee. All that is required to access the system is a keyboard, mouse and monitor. Most existing ISPs (including most telecoms) are expected to convert to being ASPs.

New high-speed Internet access services like DSL and cable modems are opening the door to a new vision of computing. Many software companies are looking to develop new e-commerce-based sales channels by putting their programs on a Web site and only charging customers to use them rather than selling them outright. Furthermore, instead of charging a high one-time price to license the software on a permanent basis, these software companies are thinking of returning to the "timesharing model" of the 1970s and 1980s, in which users access the application via telecommunications and pay a small fee each time they use the software. Since timesharing is considered old-fashioned, however, companies have created a new buzzword - application service providers (ASPs) -- to describe this return to olden days.

ASPs use the Internet to host, manage and support applications for companies such as yours. ASPs make it possible for enterprises to access enterprise class software solutions without deep investments in the software, hardware and personnel to support those solutions In what can only be described as deja vu, IBM Corp. and two giant telephone companies -- Bell Atlantic Corp. and SBC Communications Inc. plan to test the viability of using an "Internet appliance." The new device will consist only of a 10-inch color monitor, computer keyboard and browser software, to access Web-based applications at high speed Internet access. No need to invest in software licenses, hardware and infrastructure modifications. This is the option with the smallest amount of up front capital investment. Software, hardware and bandwidth are rented monthly. All components are housed away from your company's premises. Advantages include:

- No additional IT staff needed to administer systems
- Current IT staff can stay focused on supporting core business activities
- No hardware upgrades and/or new purchases
- No additional cost for software upgrades
- Software is administered by experts
- Lower initial investment
- Fixed monthly payments

Branding

To make an Internet company a household word, or at least to penetrate the consciousness of its target market it must successfully "brand." Branding is critical for all the .com start-ups because the ones that manage to establish viable brands are the only ones who'll be in a position to reap the profits later. Conventional wisdom among Internet experts is that Branding is the most powerful things on the Internet and essential to making money. According to Kris Hagerman of BigBook, Brand promotion requires repetition, recognition and reality – Repetition (the generation of a consistent, positive message and service), recognition (recognizable and memorable logo and name), and reality (real value to the consumer) are the hallmarks of a good branding. In our visual culture, the Web is the visual medium. Web branding is more than just names. It's about creating a visual identifier for a company. The logo is only the beginning. To truly brand an Internet company a complete visual style should incorporate the essence of the company. From logos to design to packaging, a consistent visual identity builds branding.

*Unless a company can truly differentiate itself on the Web, it is likely to just get lost among the numerous technology offerings on the public market.* [EMarketer 11/23/98]

*With everyone jumping on the eCommerce bandwagon, it's easy to overlook the paramount importance of branding. The real challenge in a crowded e-market is to build up brand awareness so that when users go in search of a product or service, a company's site is the one that leaps immediately to mind.* [ZDNet]

Off-Line Marketing

Successfully positioning a company and building its brand identity still depends upon traditional marketing and promotion outside of the Internet – in the real world. Increasingly companies are using traditional advertising medium and public relations to promote their Web site, services or products. A number of Internet companies have also begun to sponsor events and activities and to use promotional and incentive materials to get their name and logo more exposure and to develop a positive company image.

TRENDS OF MULTIMEDIA TECHNOLOGY

Broadcast television and cable have been able to deliver high-quality audio/video but lack interactivity. The Internet presently delivers interactive synthetic and natural "virtual" worlds. However, real-time is lost and interactivity is too slow.

In the near future real-time high-bandwidth transmission systems will combine these two networks to provide both quality audio/video and interactivity features. The result will be the final realization of real-time, personalized interactive video:

Interactive Video

By 2002, Forrester predicts that nearly all of the 10 million digital cable subscribers will click into interactive TV services. TV will regain viewers who are now drifting toward PC screens."

- 50 television producers, ad agencies, cable operators and interactive product developers were recently surveyed on expectations for interactive media and television: 25% believe that more than half of the programming in 2001 will have an interactive component. [1998 Business Wire]
- For interactive videos to succeed, programmers must embrace lazy interactivity - an approach designed for short-attention span viewers. Few of the early players have recognized the commerce potential for quick-hit, one-button mini-applications that are most likely to attract and keep the interest of viewers. [Forrester Research]

□ The interactive CD-ROM marketplace, predicted in the 1980's to be a hot opportunity, has mostly fizzled, leaving hundreds of multimedia developers stuck with great ideas and no real business. As the bandwidth and capabilities of both cable and the Internet improve, experts predict that interactive programming will finally realize its potential. [Time 1996]

Internet

Even without the advance in bandwidth, technologies are being developed that make real motion video on the Internet more practical and appealing:

Developing Internet Motion Video Capability

□ Microsoft's Windows Media Technologies is changing streaming video's problems of differing bandwidths, file formats and standards. It can deliver high quality live and on-demand streaming media across everything from 14.4K Internet-dial-up to high-speed enterprise networks. Microsoft claims high performance, unmatched scalability, ease of use, and widespread availability and the best possible audio and video at low-bandwidth Internet and television-broadcast quality with high-bandwidth enterprise systems. This solution could pave the way to tap the power of streaming media for everything from internal and external communications to online training. [New Media 4/99].

□ Pixelon, Inc., a Boulder, Colorado based company recently announced that it released its real time full screen video via the Internet on October 30th.

□ Format such as the MPEG standard, RealNetwork's RealVideo and Microsoft's ASF files now make it possible to watch video over the Internet in real time. The quality depends on the amount of compression and the speed of the connection. Large corporations with sophisticated Internet technologies (ATM, Gigabit Ethernet) presently are the only ones who have the bandwidth and throughput necessary to deliver high-fidelity compressed video. With new broadband technologies being introduced, such as digital cable and DSL, soon homes and small businesses will have access to this technology □ "We expect media-linking technology to garner wide acceptance by the 35 million Realplayer user community because it empowers developers, for the first time, to create truly non-linear, digital storytelling experiences with streaming and live media - Kei Kochoo, president of Digital Renaissance.

□ "RealPlayer and MediaPlayer have so improved their compression technology that it is possible to download a 2 hour movie with greatly improved sound in a very short period of time. However, the screen size and low-frame rate are still effecting the quality of the video" - Nick Voth - E Street Communications (ISP)

Key Competitors

Competitive Evaluation

There are number of established major for profit companies in the women, parenting and child care locater services. Many have a strong advance lead with considerable capital resources to build their brand.

In contrast, the not-for-profit sites lack major brand awareness.

Existing Web Services Related to Early childhood

Major Child Care Internet Services

KinderView.com provides Members with color images of their children through its Internet Viewing System that update every few seconds. KinderView on its Internet site also provides parenting consulting service, useful articles, tips, and helpful links to improve and expand parenting involvement with and understanding of their child.

Beansprout.net claims to be the first online community connecting parents with their pediatricians and childcare providers. Appears to develop and maintain Web sites for pediatric practices and some child care centers. Has an e-retailer Marketplace that sells products for use in childcare facilities.

NCCIC.org -The National Child Care Information Center (NCCIC) was "established to complement, enhance and promote child care linkages and to serve as a mechanism for supporting quality, comprehensive services for children and families." NCCIC is supported by a contract from the U.S. Department of Health and Human Services, Administration for Children and Families, Administration on Children, Youth and Families, Child Care Bureau. Services:

| | |
|---|---|
| Calendar | Child Care Technical Assistance |
| Network (CCTAN), | Publications and Other |
| Resources | |
| Internet Links | White House Initiatives |
| State Profiles | |

CareGuide.com appears to be justified in its claims to be the leading online solution provider for people who need assistance and support in the daily process of caring for their children or elders. With nationwide listings of approximately 90,000 child care facilities and 70,000 elder care facilities, CareGuide.com also provides content, tools, directories, products, services and support networks in a convenient, easy to use online format to help guide caregivers through every step of the care giving process. CareGuide.com is specifically designed to help parents with children between birth and twelve years of age, and adult children with aging parents or relatives, manage every aspect of their care giving experience. The site is focused on improving the lives of care recipients -- the children and elders who are the subject of care. Its mission is to be the 'trusted guide' who supports family members responsible for the care of loved ones throughout the emotional course of giving the best care. CareGuide.com was founded in 1996 by Michael Goldberg and Oliver Mittermaier, and claim to be the first to create the care giving category on the Internet and the leader in this service. Based in San Francisco and privately held, the company's initial funding was provided by Allen & Co., the New York-based, private investment bank. Careguide appears to be the most viable childcare provider listing service with substantially more listings than its competitors and an excellent search system. The sites revenue stream appears to come primarily from Web development and hosting services. Careguide probably lists all providers for free then solicits them for its $19.95 monthly Web site (free development) that gives the provider preferred listing and connects to its Web site & e-mail.

Major Women's Sites

Ivillage.com - A women's network online providing practical solutions and everyday support for women between the ages of 25 and 54. IVillage.com is organized into branded communities that focus on issues of most importance to women and provide interactive services, peer support and online access to experts through 16 content channels and several shopping areas. Content channels include allHealth, Astrology, Beauty, Book Club, Click!: Where Computers Make Sense, Diet & Fitness, Food, Garden, MoneyLife, ParentsPlace, *Parent Soup* (See below), Pets, Relationships, Travel, Work from Home and Working Diva, and are complemented by stores such as iBaby and iMaternity, Shopping Central, and PlusBoutique. Established in 1995 and headquartered in New York City, iVillage Inc. (Nasdaq: IVIL) is a new media company, recognized as an industry leader in developing innovative sponsorship and commerce relationships that match the desire of marketers to reach women with the needs of iVillage.com members for relevant information and services. According to analyst Ekatrina Walsh "IVillage has a significant lead in the Internet space, and its recent drop in stock price has more to do with the stabilization of Internet valuations than any problems in the company. Village recently established a media deal with NBC.

Women.com -Women.com claims to be the leading network for wired women, attracting over 4 million visitors each month. Founded in 1992 when "women online" was something of a novelty, Women.com Networks was the first online company to recognize the potential of women on the Web. "*Today, with women as the largest growing segment on the Web, what was once a novelty has become a driving force behind much of what's happening on the Internet today. We speak in a unique voice to this powerful audience and provide a unique blend of content, community, commerce and services that serves the diverse needs of today's online woman." It features informative content, expert advice, community and online shopping. The network is comprised of more than 100,000 pages of content organized into 20 topical channels, including career, entertainment, family, health, home, horoscopes, garden, pregnancy, technology and Internet, and weddings. Women.com also offers free membership services and benefits, including merchant discounts, personalized content, personal home pages, e-mail, and access to community forums and clubs. An important part of its network is its "newsstand" featuring 13 of the world's leading women's magazines, including Cosmopolitan, Good Housekeeping, Prevention and House Beautiful.* It has a "Family" Topical Channel with Sections on parenting, K-12, Family dynamics, Fun & Games, Pets, Expert Advice, and a message board. Uses careguide.com for childcare searching. Nearly 5 million women visit Women.com Networks each month, ranking it number 28 out of more than 2 million web sites, according to Media Metrix. The company's stock is traded on the Nasdaq (WOMN). Women.com recently established a media deal with Hearst Media.

Oxygen Media - Is a cable television channel and network of Web sites targeted at women. Network of Web sites includes Thrive, a health resource; Moms Online, a site targeted at mothers; Electra, a women-oriented Web site; Ka-Ching, a site designed to help women manage their finances; and Thelab, a streaming media site. The cable network will debut in February 2000. In June 1999 signed a deal for Media One and Charter Communications, Paul Allen's cable system, to distribute its cable channel. In November 1998 signed a deal with TCI to carry its cable channel. Expects cable channel to be available in 10 million homes at launch and in 20 million homes by the end of 2000. In June 1999 formed a strategic alliance with Starbucks for co-marketing, promotion, and electronic commerce. In August 1999, Oprah Online, the Web site for television talk-show queen Oprah Winfrey, will join Oxygen's online stable. In November 1998 signed deals with Oprah Winfrey's Harpo Entertainment Group and the principals of Carsey-Werner-Mandabach, an entertainment and product company that will program the cable channel. Customers are mainly consumers; revenues will be derived from advertising. Competes with Lifetime Television, iVillage, Women.com, and a new cable channel and Internet site being developed by Turner Broadcasting. Geraldine Laybourne's, considered one of the most influential women in television, plans founded this converged Internet and cable network targeted at women with a $100 million investment from Microsoft billionaire Paul Allen's Vulcan Ventures. The cash is paying the significant expenses of creating programming and marketing for Oxygen Media. Ms. Laybourne has used her TV contacts to partner with other TV powerhouses to help build her vision of a new medium Oprah Winfrey and the team that created The Cosby Show, Roseanne, and 3rd Rock from the Sun, are contributing content and financing to the venture. The vision for Oxygen is that it will be a converged media offering both a Internet Site and Cable programming (that will converge as bandwidth allows) with themed chunks of time, including morning talk; financial and career issues; hip and happening issues for teens; a comedy block; and movies. Analysts say that cable and Internet make for a powerful combination and that Oxygen has a chance to create a consistent brand across mediums, but warns that women are not a uniform or easy market to target.

Parenting Web Sites

There are about 10 or so sites on the net with parent oriented content and quality. A few of them are extremely well capitalized such as Parentsoup (iVillage), Family.com (Disney), ParenthoodWeb. and Parentime (Time-Warner).

ParentSoup.com is a subsidiary of iVillage (the Woman's portal). It is comprehensive and well done with regular articles, expert opinions from a variety of sources, "Sound Advice" from a pediatrician (on Real Player) chat lines, timed presentations and communities for pre-pregnancy, expecting, parents of babies, toddlers and preschoolers, school-age kids and parents of teens.

ParentTime.com - "Your Personal Parent & Pregnancy Advisors." ParentTime seeks to be "the definitive Web resource for moms and dads, with a wealth of information on raising children ages 0-6." It is produced by a team of journalists and parents, plus experts (Dr. Sears to Dr. Kutner). The latest news parents can use in is published in an easy-to-use interactive format. Questions can be asked and will be answered; from medicine to behavior to family fun. ParentTime is also an online meeting place for families on the Web, designed to be a diverse, strong and growing community is growing strong. It has sections on pregnancy, baby, toddler, preschool, expert advice, Ask Dr. Sears, behavior & development, health & nutrition, work & money, community, toolbox online shopping mall. A strategic partnership with Careguide.com provides doctor and childcare facility searches. The *Parent Times* is a weekly email newsletter that interesting articles and events coming up at ParentTime. ParentTime L.L.C. is a company owned by Time Inc. and Procter & Gamble Productions, Inc. (A popup banner on the site claims "Changes are in store at ParentTime")

ParenthoodWeb.com - "The award-winning parenting, pregnancy and family community for parents" The ParenthoodWeb and its family sites ABC's of Parenting, RecipeXchange.com and eSafety.com seek to reach a targeted audience of parents and parents-to-be. The company claims to be a recognized and respected industry source as on the web and a definite resource for parenting and childcare information. Recent articles and television features in Newsweek, Redbook, Better Homes and Gardens, Microsoft Network, NBC, ABC and CNET have chronicled its site. Other websites such as Netguide Live, Webcrawler and Excite have given their highest ratings. The company says that thousands of parents spend as long as an hour each day on the site (for a average visit of approximately 12 minutes) to seek and offer advice, learn from panel of industry experts and compare experiences with other parents. The ParenthoodWeb Newsletter is distributed to approximately 25,000 parents and parents-to-be. The site is extensive!...in its content, with everything from surveys, to expert advice, to discussion and chat areas, to even an ovulation calendar. The company is the publisher of over 26 city Parent magazines (such as *Colorado Parent)*.

Family.com - Is a sub-site of Disney.com. It features and content are extensive:

- Familyshop; Apparel, Auto, Baby, Books & Music, Computer & Software, Education, Flowers & Gifts, Health & Beauty, Home & Garden, Parties, Sports & Fitness, Toys, Video & Entertainment
- Parent Chat & Message Boards
- Activities; Funfinder, Craftfinder, Birthday Central, 365 TV-Free Activities, Crafts Expert: Ann Hallock, Send An Electronic Greeting
- Food; Get Cooking: Cookbooks, Recipe Finder, The Disney Gourmet, Your Favorite Recipes, Browse 9 Cookbooks, What's Cooking: Browse Our Food Articles, Cook's Dictionary
- Holidays; Crafts, Recipes, Fun
- Pets; Kids' Guide To Dog Care, Breed Guide, Ask The Vet: Dr. Kross
- Travel; Travel Planner, The Disney Travel Corner, We Were There: Road-Tested Vacations, Family-Friendly City Guides
- Baby And Pregnancy; Ovulation Calculator, Ask The Ob-Gyn, Due Date Calculator, Your Pregnancy Week By Week, Child Growth Chart

- Health; Symptom Solver, Disney Encyclopedia Of Children's Health, First Aid Handbook, Dr. Nancy Snyderman On Children's Health
- Parenting; Parent Problem Solver, Parents Know Best, Your Child: Ask Jan Faull, Healthy Relationships Adviser
- Learning; Education Bank, Homework Helper, Computing Corner, Home Schooling Center
- Local Resources; Find An Event Near You

Users / Consumers

Who Are the Users of Parent Web Sites? A recent survey of ParenthoodWeb.com users showed the following audience demographics:

- 77% women, 23% men
- Age Breakdown: 18 to 24: 22%
  5 to 34: 45%
  35 to 44: 16%
  45 to 54: 9%
- 75% of the women are mothers, while 20% are expecting mothers
- 52% of mothers work full time, 14% of mothers work part-time
- 91% of the visitors to our site are parents
- 78% have children under 6 (or are pregnant and expecting children)
- Mean income is $62,431, 41% have household income over $80,000 91% are college educated

The Market

NEAR AND LONG TERM PROJECTSIONS

Soon the number of women using the Web will exceed men. With children a primary priority of women, an Internet Vortal focused on early childhood needs could generate strong interest with this market.

The convergence of the Internet with cable television will make interactive multimedia a full reality. This highly effective and impacting medium can be a very effective vehicle for children.

Positioning & Opportunity for Company

TOOLBOX POSITIONING:

- Be a highly profitable Web Site and source for this target market.
- A blend of For Profit and Not-for-profit sites and services
- Become the Early Childhood equivalent of what AARP is for seniors.
- Develop the Child Care Center Referral and Rating system based on Better Business Bureau model.
- Become a "Network" - Multi-media company targeted to Parents, Providers and Children 0 to 6.

WAYS TOOLBOX WILL BE DISTINCTIVE

- The first branded Vortal for early childhood services.

- Creates a substantial virtual community of providers, parents and the public focused on children 0 to 6.
- Offers both National and Local Content
- Become the center for parent advocacy issues
- To be viewed as Non-Commercial - Mission is not compromised for Profits. Be a blend of Charity, Association and For-Profit services
- Application Service Provider Model: All programs and services are Web-based. Offers customers' ease of use, regular updates of software, controlled children access, minimal equipment costs (affordable to all).
- A Media company that informs, educates and entertains - Create a consistent brand across mediums - Internet now; cable style programming later.
- Establish a high standard of quality for childcare equivalent to ISO 9000 for manufacturing.

KEY ELEMENTS OF TOOLBOX'S BUSINESS MODEL

To become the leaded in its field Toolbox will:

* Build Global Brand Awareness;
* Develop And Quickly Accelerate Subscriber Growth;
* Continue To Enhance Site Functionality And Features;
* Expand Relationship With Industry Organizations;
* Provide Diverse Services
* Eventually expand into a International Operation; and;
* Pursue Strategic Acquisitions.

The Company Will Assemble:

Multiple Points Of Entry Into Network - to provide additional traffic and cross-promotional opportunities.

Impressive Lineup Of Content - Print, multimedia, interactive, entertainment.

Distribution Relationships - With major Portals e.g. AOL, GeoCities Infoseek, Lycos, Microsoft, Mindspring, Netscape, WebTV, Yahoo!

Advertising Partners that underscore the strength of the company's brand and its ability to draw Internet users.

USER BENEFITS

Parents

ParentToolBox.org will provide parents with a comprehensive selection of information on parenting, childcare facilities, events and opportunities, linkage to other parents, sitters, healthcare and other services needed to care and educate their under six children.

Childcare Providers

ChildcareToolbox.com will be the first ASP servicing childcare professionals and facilities with all of the business, education, entertainment and parent support services they need at a price even the smallest operation can afford.

Children

KidToolbox.com will use the full educational, interactive and entertainment multi-media potential of the Internet to deliver quality educational programming, games and activities to children age 3 to 6.

COMPANY'S PROJECTED MARKET

1. Parents of children from birth to age six.
2. Childcare facilities and providers
3. Children between the ages of 3 to 6.
4. Governmental, private agencies, and businesses concerned with childcare issues.

SPECIFIC TARGET MARKETS

Initial Target Market

Members of NACCRRA and NAEYC - The Company will initially launch its service by marketing through its two participating association partner's members. They will be offered a choice of packaged services or per use utilization. They in turn will be offered a commission for promoting the ParentToolbox and KidToolbox services to their clients.

Post National Launch Target Market

- Parents of Children under six with Internet connections.
- All licensed childcare providers and facilities.
- Children enrolled in preschool programs and activities.

Long Term Target Markets

The Company will reach out to its full projected market of providers, parents and young children through a national marketing campaign.

THE SERVICE

Description of Services

PARENT TOOLBOX VORTAL NOT-FOR-PROFIT B2C

The comprehensive, single source for parents raising children from their birth to entry into elementary school.

Sponsored Services (No user fees)

- E-Mail newsletter
- Book/ Software Reviews
- On-line Articles & Hot Topics
- Local Events Calendar
- Learning Activities
- Local Funds
- Rating Service
- Selection Criteria
- Referral
- Age Categories Info
- Tips / Specialty Articles
- Ask the Professional
- Link to Health Info Site
- Chat Lines
- Bulletin Boards
- Parent Advocacy

CHILDCARE TOOLBOX FOR PROFIT B2B

The Company will be an "Application Service Provider" that supplies all services on-line with minimal systems and no software required on the user's site. Every service that a childcare center or individual provider needs to operate their business and educate their children will be made available. Strategic partners will provide some services, and some content and services will come from Toolbox's partner associations.

Services Available for Membership &/Or Pay Per Use Fees

On line Courses
Center Certification
Online Video Library
Educational Software
Web Camera Services
Virtual Mall / Trade Show
BOT
Data Collection & Reporting
Internet Appliance Service*
Interactive - Online Training
Curriculum Materials
Online Educational Software
Financial Planning Services
Parent Newsletter
Discounts
E-Newsletter
e-Commerce / Web services
Business Management

*Internet Appliance Service

The Company plans on copying Netpliance's "i-opener" concept to make Internet access affordable and easy. It's not a computer; *i-opener* is an "Internet Appliance" that consists of a screen, keyboard and mouse and needs minimal setup. Just plug it in, turn it on, and i-opener connects to the company's site to bring the user their email, daily information, and access to the Internet-instantly. i-opener integrates Internet service (monthly fee required), so there's nothing to configure or install. The cost of the equipment can be as low as $100, so it can be provided free to users signing a yearly contract.

Unique Features of an Application Service Provider

- First complete Web-based service available to Providers.
  - No or low IT equipment costs.
  - All programs and services are on-line.
- Un-matched selection of programs and services.
- Affordable - Price scaled to size of provider.

KIDTOOLBOX A MULTI-MEDIA EDUCATIONAL SERVICE

The Company is offering in one location, all the services a parent needs to develop his child. Many of the software, interactive learning and video programs will be ones that the child can do either with their parent, or as they mature, on their own. All systems will be Web based so no purchase of software or sophisticated computer equipment is required.

Services Available for Membership &/Or Pay Per Use Fees

| | |
|---|---|
| Learning Games | Educational Software |
| On-line Software | Video Library |
| Weekly/Monthly Parent Curriculum | Interactive Learning |
| On Line Conferences | Web Camera Services |

Comparison to Competitor's Services

UNIQUE FEATURES

- Will be the first branded Vortal for early childhood services.
- Creates a substantial virtual community of providers, parents and the public focused on children from birth to age 6.
- A Media company that informs, educates and entertains
- First to use broadband to offer interactive education and real motion video.
- Standardization of minimal quality of childcare nationwide.
- Become the Early Childhood equivalent of what AARP is for seniors:
  - Powerful Parent advocacy - lobbyist
  - Multiple membership services
  - Building a large national and local membership base
- Develop the Child Care Center Referral and Rating system based on Better Business Bureau model;
  - All providers listed for free.
  - Members given special listing & can take advantage of Company's Web site development and hosting services.
  - Ratings shown for each.

Present Service Status

The four initial partners in Toolbox provide a strong starting base for Toolbox's content and services:

- NACCRRA's national members of childcare resource and referral agencies and Child Care Aware referral service.

- NABYC's 40,000 childcare provider membership and its educational and child development material for providers and parents
- Carnegie Corporations connections with national, state and local child development experts.
- Educare Colorado's marketing and business expertise and contacts, plus its childcare center rating system.

Operational Approach

Through alliances, co-partners, strategic partnerships and other relationships the Company plans to be an assimilator of services and content developed by other organizations.

ACQUISITIONS

To speed its expansion and to acquire talent and capabilities that would other wise not be available, Toolbox is exploring acquisition of some Web content and service companies. In most cases, the companies being acquired will be ones that have an existing and compatible working relationship with the Company and have a strong reputation in their field.

MARKETING & SALES

Proposed Marketing Methods

The Company will first begin a promotional campaign designed to gain Industry opinion leaders' attention to the Toolbox service:

Evaluations.
The goal of the evaluation activities is to generate influential and independent, third party endorsement. Toolbox will be submitted for evaluation by all widely read and authoritative industry and consumer organizations that publish product reviews. Additionally, influence leading groups or individuals within niche markets will be provided with the product.

Search Engines
Toolbox will use the Internet's search technology to generate hits to its site by:

- Listing with every major search engine company.
- Using state-of-the-art software system for maximizing exposure through the search engines.

Knowledge of what parents and providers are seeking. Using the entire key valid words that consumer use while remaining in compliance with search engine companies' criteria.

Initial Promotion and Advertising.
Prior to the full commercial roll out of the product, the Company will, in a co-marketing campaign with its strategic partners, prepare a schedule of activities designed to provide significant exposure to the target markets:

- Internet banner advertisement.
- Targeted e-mail campaigns.
- Press releases. Press releases will be focused on Internet news services, and certain industry and professional trade publications.
- Traditional media and direct mail (regular and e-mail)
- Spokesperson. The Company will seek a prominent personality to endorse the product and engage in promotional activities.
- Trade show, Convention and Seminar Events. The Company will display and speak at as many events as possible.
- White paper, case studies and book. Toolbox will produce and distribute academic and practical discussions on the use of its services.

Long Term Promotional Plan
Toolbox will be conducting a beta test of various advertising and promotional approaches, both on the Internet and through more traditional media. The goal will be to determine the most cost-effective means of motivating consumers to be aware of, and visit, the Company's Vortal.

As part of its promotional testing program, the Company will develop and implement an aggressive marketing program that may include the following:

Advertising
Direct Marketing
Telemarketing
Public Relations
Broadcast e-mail

Direct Marketing Campaign

The Company is planning a major email and direct marketing campaign aimed at getting Toolbox's co-partners' members to sign up. Hundreds of other early childhood centers and providers will be identified and contacted through searches of the Net and other available lists. Professionally prepared materials will compellingly demonstrate that Toolbox is the future of early childhood education and development and support of the childcare industry and they should get on board.

OTHER MARKET OPPORTUNITIES

The Company intends to leverage market acceptance of its core product, the Toolbox Vortal, and its staff and infrastructure into the exploitation of other market and product opportunities.

Internet-based Software and Services. The Company plans to participate in the recent, but rapidly growing trend of providing software to end users on an outsource service basis. In this scenario, Application Service Providers (ASP) sell applications and service on a usage basis. This eliminates the need for organizations to purchase and manage application and information technology assets. Estimates project the size of this market to reach from $2 billion to over $10 billion by 2002.

- The first opportunities will involve providing the customer base with applications that are complimentary to Toolbox.
- Later, the Company will explore opportunities in high-end business applications software and service.

E-Commerce. The Company will provide a variety of e-commerce arrangements on the Toolbox platform. Because Toolbox users will visit the site frequently and will have revealed vital demographic information, e-commerce opportunities will receive immediate attention.

Internet (or Information) Appliances. These are the terms used to define a new class of electronic devices that connect over the Internet, primarily for the purpose of exchanging information. The devices may not have the disk drives or operating systems of conventional computers. The devices may be configured as desk or counter top designs, or in the form of a conventional personal digital assistant (PDA). They may use wired or wireless connections to the Internet. Instead, they will rely on the Internet to provide applications and data retrieval. This market will require specialized ASP's, knowledgeable about the service demands of such systems and end users. Devices of this sort entered the market in 1999. Toolbox is a perfect service to compliment many of the functions offered by new PDA systems.

Sales Strategy

An inside sales effort will be required by the Company initially to sell its content and referral services to childcare providers. The direct marketing efforts are expect to elicit in-coming calls, which will be professionally served by an account representative. A sales director will be eventually be hired to conduct and coordinate the Company's sales program.

All membership sales to users will be fully electronic, a true E-commerce system.

SALES, DISTRIBUTION AND USER SERVICE

The user acquisition functions of the company are focused into the small business user version of Toolbox. However, the marketing and sales efforts to organizations is expected to overlap into the individual market because of the interrelation of the target markets and potential for user migration, particularly with the availability of the free version for individuals. In the early stages of user acquisition, the user service function will be administered from both the marketing and sales departments of Toolbox and its strategic partners in order to gain intelligence about user needs and satisfaction.

Initial sales efforts will not concentrate on early adopters but on users requiring Toolbox as a mission critical solution. Generally, sales functions will be divided among three levels.

- Sign Up Page Site. The sign up page will be connected to the Toolbox Internet site and tour page. It will provide a secure link for customers sign up. Traffic driven to this site may originate primarily from Internet ad campaigns, marketing and sales alliances or upgrade from the free service. Users of the free service will use this site to upgrade their service.
- Customer Management. Customer Service Representatives (CSR) will be assigned to contact, by e-mail and, if possible, telephone, all fee service subscribers immediately after their sign-up is complete. The customer management functions will also manage extending up-sell offers to fee customers as well as handle the dissemination of surveys, product and systems alerts.
- Telemarketing. In a co-marketing arrangement with its strategic partners, the company will use telemarketing sales personnel to contact and close customers for the ChildcareToolbox service and to recruit childcare centers to market to their parents for the its Vortal and other two sites. Lead traffic for the telemarketing operation will come from inquiries driven from marketing effort and incumbent users, as well as outbound cold calls.
- Sales Partners. The Company will provide a variety of sales partnership models to accommodate specific marketing or sales activities.
  - Click through advertising and sales from other Internet sites.
  - Co-branding with other Internet services, such as ISP's, community sites, email services and search engines.
  - Other agencies or organizations for specific sales situations.

Future Strategic Alliances

SERVICES

The Company will actively seek other services and technologies to complement and expand its core services, Toolbox. The Company anticipates its marketing presence will be attractive to other entities that posses promising services. The Company is exposed to opportunities through news notifications, industry relationships and graphic on the Company's web site.

In general, service alliances will contain some or all of the following elements:

- Sales performance compensation models
- Exclusivity arrangements
- Options for equity participation or acquisition

- Development rights
- Co-marketing and co-sales agreements

Marketing And Sales Alliances

The Company will actively pursue other forms of alliances to enhance its marketing and sales effort. The Web is an ideal environment to create co-marketing and co-selling relationships because of the rapid pace in which users can move between web sites.

- Revenue sharing arrangements
- Licensing arrangements

Marketing Plan Summary

The Company is budgeting a significant amount of its financial resources generated initially from its capital offering, and later from its revenues, for an aggressive promotional campaign to make consumers aware of its Vortal Site, services and domain names. Progressive experimentation will be done with a variety of promotion methods, internal (Internet) and external to determine which are the most effective methods to drive traffic to its sites and produce leads for its advertisers.

*ToolBox* plans to retain an advertising agency to assist it in developing a promotional plan and for the final selection of the mediums used, frequencies and reach. Limited trials will be conducted in test areas and only when a promotional method proves cost effective will a more extensive campaign be launched.

Targeted Customers

1. All licensed and unlicensed child care providers.
2. Parents of children under six
3. Community leaders concerned with child development and care issues.
4. Children between the ages of 3 to 6.

Marketing Mix

Service

The most comprehensive service that will full exploit the full potential of the Internet with Web-based services and multimedia educational programming.

Distribution Channels

Promoted and delivered both through childcare providers and directly into the homes of parents of children 0 to 6.

Pricing

A service that will be affordable for all childcare providers and all families.

Promotion

Initially promoting the service through the childcare providers and strategic partners. Long term through online and off-line advertising.

*I. Overview of the Quality Improvement Process*

The following chart summarizes the steps in the Quality Improvement process:

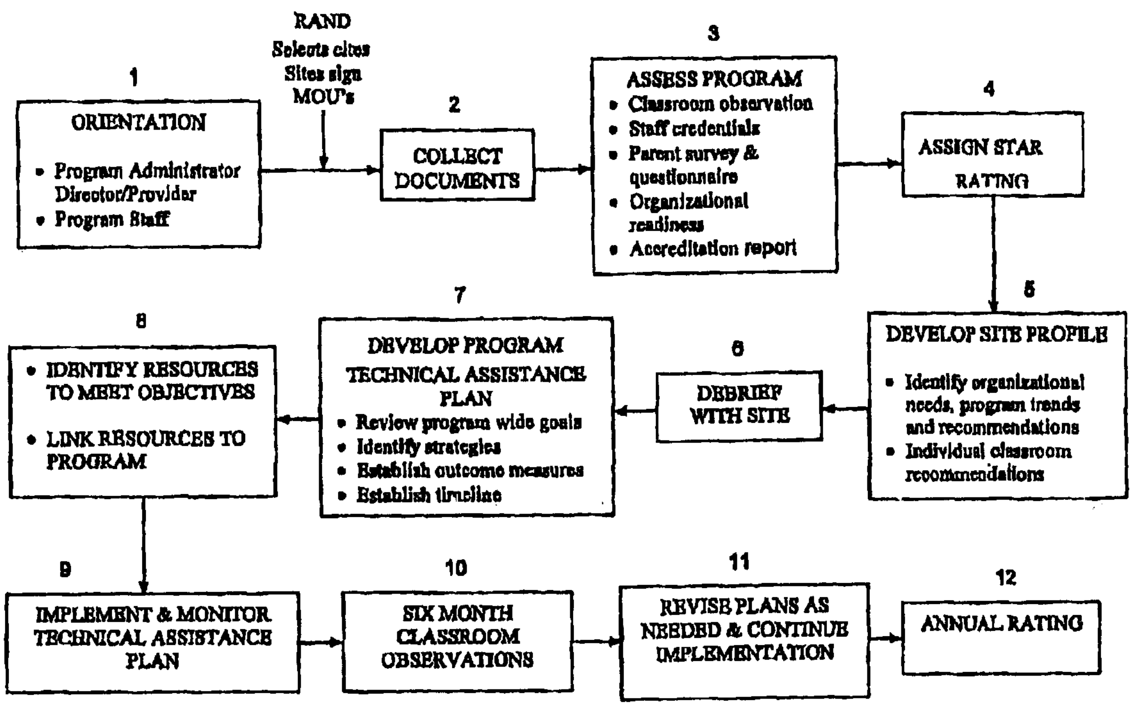

A. ORIENTATION

An orientation process is key to insuring a well-informed commitment to Educare principles and interventions by sites that choose to participate. It should clearly communicate:

- Educare's mission and goals
- the rationale, procedures, and expected outcomes of the 4-Star Rating system and the Quality Improvement process
- what is expected from participating programs, including timelines
- what Educare will provide
- terms of agreements with county governments for differential reimbursement
- the evaluation process To be effective, participation in Educare requires commitment from all stakeholders at a site. For family home providers, this includes the provider and parents. In center-based programs, this includes Board members, program administrators and supervisors, classroom staff, and parents. Orientation should be provided to all these groups, both through meetings with Educare staff and in the form of written and other audio-visual materials.

Site staff who participate in orientation meetings outside of their usual work hours may be reimbursed by Educare for their time.

The Director of Quality Improvement and the Lead Program Associate are responsible for arranging and conducting Educare orientations.

B. SITE MEMORANDA OF AGREEMENT

Following site orientations and before initiating the Quality Improvement process, sites are expected to enter into a formal agreement with Educare. The Memoranda of Agreement detail the site's commitment to fully participate in the process and outline what can be expected from Educare. Because success of the project depends on commitment from all levels of participating programs, for center based sites, signatures are required from a Board representative, organization and/or site administrators, and classroom staff. For participating family child care homes, only the provider/operator is required to sign a Memorandum of Agreement. Programs that are designated as usual care sites for the RAND/OMNI evaluation must also sign Memoranda of Agreement that cover expectations and terms of their involvement. (Attachments A1-A4)

The Director of Quality Improvement or Lead Program Associate is responsible for insuring that Memoranda of Agreement are in place, with the original to be kept in Educare site files and a copy given to each site administrator.

C. TIMELINE

To insure that assessment and planning proceed in a timely manner, specific target dates for completing each step should be established using the guidelines below. The dates are recorded on either the Quality Improvement Timeline - New Site form (Attachment A5), for an initial rating and T.A. Plan, or on the Quality Improvement Timeline - Annual Rating form (Attachment A6) for 6-month observations, annual ratings, and ongoing planning. Copies of these forms with the appropriate target dates should be shared with site administrators and staff and with family providers as you review the Quality Improvement process with them.

| | |
|---|---|
| I. Organizational assessment (Educare sites only) and Program Quality assessment completed | 3 weeks |
| II. Classroom observations completed (after all other data collected) | 2 weeks |
| III. Site Profile developed and Debriefing completed | 2 weeks |
| IV. Technical Assistance Plan developed | |
| Goals & objectives set | 2 weeks |
| Resources identified & engaged to begin implementation | 3 weeks |

NOTE: Usual Care sites complete Steps I. and II. only.

Missed target dates should trigger a discussion with the site to address any barriers to moving forward and to renegotiate new deadlines.

For programs that run on an academic year, assessment should be scheduled AFTER October 1 and at least three weeks BEFORE the close of the program. Starting after October 1 gives new parents an opportunity to gain the information needed to respond to the Parent Interview and for children to adjust to a new setting. Completing assessments before programs begin to wind down for the year insures that classroom observations reflect typical operations and allows time for feedback to staff and some planning for the following year.

*II. Assessment*

The site coach should arrange to meet with site staff/family providers to review instructions and assist them in completing assessments as indicated below. Required documents include:

1. Organizational Assessment (Educare centers only)
2. Site Self-Assessment (Educare sites only)
3. Provider/Staff Training & Education Summaries
4. Parent Involvement Survey
5. Parent Surveys (conducted by Educare staff)
6. Accreditation Report
7. Copy of Child Care License
8. Financial data forms
9. Site Demographic Profile

NOTE: The assessment process for Usual Care sites includes ONLY those tools used to calculate a Star Rating. Usual care sites do not do an Organizational Assessment or a Site Self-Assessment.

Site staff who participate in meetings for assessment purposes outside of their usual work hours may be reimbursed for their time.

A. ORGANIZATIONAL ASSESSMENT (Educare centers only)

A1. Purpose

The purpose of the organizational assessment is to gather data from all site staff members about how they function as a group and to generate ideas for improvement. This information is not used in the rating process. The intent is to identify those characteristics of the organization that will either facilitate or act as barriers to the quality improvement process; qualities that can have a significant impact on services provided to children but that are not specifically program-related. These may include issues such as how conflict is managed, how decisions are made, communication patterns, whether or not staff feel valued, leadership style, etc. This assessment process gives all site staff an opportunity and responsibility to bring such issues to the forefront and help to plan how to address them more effectively.

A2. Schedule for Completion

The Organizational Assessment should be scheduled as part of the initial assessment and again at the three-year mark. As part of assessment and technical assistance planning in the interim, meetings should be scheduled with all site staff annually to review progress toward goals and activities resulting from the first Organizational Assessment and make any desired changes.

A3. Procedure

The Organizational Assessment requires approximately 5-6 hrs., which should be split into no more than 2 sessions, which should be no more than 2 weeks apart. All staff who work at a site should be invited to participate, including cooks, van drivers, and administrative support staff.

See Attachment B1 for the outline of the assessment. It includes a series of group exercises facilitated by the Site Coach. Before scheduling the assessment, the purpose and process should be explained to each potential participant by the site director and the Coach and each individual should be asked to commit to the process. People should have an option to sit out, with clear understanding that they will miss a key opportunity to effect change in th organization.

One person at the site, usually an administrator, should be designated to assis in developing the questions that will be used in the assessment. A list of sampl questions is included in Attachment B1. Usually, 12-15 questions is a good number to elicit key ideas and issues.

All data generated in the assessment should be recorded and distributed to participants following each session. Once the process is complete, the site director and the Coach should identify a small committee to follow up on suggestions and key issues that emerge from the assessment. This should be incorporated into the technical assistance plan for the site.

B. SITE SELF ASSESSMENT (Educare sites only)

B1. Purpose

The Site Self Assessment is used to identify areas of strength and opportunitie for growth as perceived by the staff/provider at the site. There are two components to the Site Self Assessment. One is the Educare Site Self Assessment Form that lists key elements of program components found in accreditation studies and in the Colorado Quality Standards. Respondents are asked to rate each element (e.g. positive, non-punitive guidance; balance and range of activities) as to whether it is a strength, an area needing improvemer or an area about which they have questions.

There are separate versions of this Self Assessment form for center-based programs and for family home providers.(Attachments B2 & B3)

The second component of the Site Self Assessment are the checklists from Creating Better Child Care Jobs: Model Work Standards for teaching Staff in Center-Based Child Care and Creating Better Family Child Care Jobs: Model Wc Standards published by the Center for the Child Care Workforce. (Attachment: B4 & B5) These checklists help programs assess their work environment, including issues such as staff/provider compensation, professional development, work assignments, communication, etc.

B2. Schedule for Completion

The Self-Assessment is conducted as part of the initial rating and as part of each annual rating. It is not scored and does not factor in the Star rating but is used to help identify quality improvement goals and track progress.

It should be completed by the site and collected within three weeks of beginning the initial or annual assessment process.

B3. Suggested Procedure - Centers

For center staff, the Self Assessment can be structured as a small group activity.

On the Educare Site Self Assessment Form, before the group decides if an area is a strength or an area needing improvement, ask them to discuss what someone coming in from the outside would see or how s/he would know that a given area is a strength or a weakness. This will help respondents to articulate why they are rating their program as they are.

When all the itemized sections have been completed, have each small group report out. Record strengths and areas for improvement for each section. Check for agreement and then process with the whole group what they see as the top three needs in their program as reflected in their responses to this form.

For the Model Work Standards checklist, have administrators complete sections 1-5 separately and have small groups, including administrators, complete sections 6-13. (Two or three section cans be assigned to each small group.) Ask administrators to share their priorities for improvement from the sections they have completed, and then use the same group reporting and prioritizing process described above.

At least one priority or area for improvement from each component should be addressed in the Site Profile and Technical Assistance Plan for the site.

B4. Suggested Procedure - Family Home Providers

Review each section of the Educare Site Self Assessment with the provider to insure that the meaning of the items is clear. Guide the provider through completion of one section, asking what an outside observer would see or how s/he would know that a given area is a strength or a weakness. Then ask the provider to complete the rest of the form on her own. Review the Model Work Standards checklist with the provider and ask her to complete it as part of the assessment.

When you collect the form and checklist, review with the provider her/his list of three priorities.

At least one priority or area for improvement from each of the two self-assessment components should be addressed in the Site Profile and Technical Assistance Plan for the site.

C. PROVIDER /STAFF TRAINING AND EDUCATION SUMMARY

C1. Purpose

This Provider/Staff Training and Education Summary (Attachment B6) is used to determine the individual Star level for staff qualifications for program administrators who directly manage the site and supervise classroom staff, and for all classroom staff and home providers. Other staff such as family service workers, cooks, administrative assistants, etc. do not complete this form. The information collected on this form also is useful in drafting professional development plans for individual staff/providers.

C2. Schedule for Completion

The Provider/Staff Training and Education Summary is collected as part of the initial rating and, for staff who are hired after the initial rating only, as part of each annual rating. (Individual Professional Development Plans will be used to track additional ongoing training once this form has been completed.)

It should be completed by the site staff and collected within three weeks of beginning the initial or annual assessment process.

C3. Procedure

The Provider/Staff Training and Education Summary form may be completed either directly by the staff member/provider or by an administrator who can gather the information from personnel records. Instructions on completing the form should be reviewed with the person(s) completing it. Emphasize that listings for non-credit training are requested ONLY for those that are early childhood related.

Copies of transcripts or other proof of degree/course completion should be submitted with the forms. If the site has these in their files and has recorded courses completed on an in-house form that provides the necessary information, a copy of this form may be substituted.

Educare will reimburse site staff and providers for the cost of obtaining transcripts.

D. PARENT INVOLVEMENT SURVEY

D1. Purpose

Information from the Parent Involvement Survey (Attachment B7) is used to determine the number and types of successful parent involvement activities conducted by each site. This information is combined with information from the Parent Interviews to determine the sites Star rating for parent involvement.

D2. Schedule for Completion

The Parent Involvement Survey is collected as part of the initial rating and as part of each annual rating. For ratings following the initial assessment and planning process, both new and continuing activities planned for the previous year to address identified goals should be reviewed.

Data for the Parent Involvement Survey should be collected from the site and recorded on the form by the site coach within three weeks of beginning the initial or annual assessment process.

D3. Procedure

This process may be used for both Educare and Usual Care sites.

Information on current strategies used by the site to support parents' involvement in their children's development and education should be gathered in a meeting with site staff/providers. For Educare centers, this should be a facilitated whole staff activity.

The steps in this assessment process are as follows

1 Using Handout 3 Types of Parent Involvement from Parents as Partners, review the six types of parent involvement, giving examples of activities to support each type.

2. Ask providers to list all the activities they do to support each type of parent involvement and post on newsprint.

3 Ask providers to explain what they are hoping to accomplish with their current activities. Post on newsprint.

4. If the following strategies/activities are not mentioned, ask about them specifically:
   a. written information for parents on program philosophy, policies & procedures
   b. parent and child orientation to the program prior to or immediately following enrollment
   c. timely notification to parents of major changes in program or policies
   d. annual planned, individual parent conferences
   e. inclusion of parents in program evaluation 5. Ask providers to evaluate each activity listed as successful (note with a + next to the activity on the newsprint), unsuccessful (note with a – next to the activity on the newsprint), or not sure (note with a ? next to the activity on the newsprint.

6. Ask providers to explain their criteria for successful, unsuccessful or not sure. If at least one parent is positively engaged by an activity, we will consider it successful (although the provider will need to consider time, energy, and $ expended to continue the activity.)

7. Ask the provider/director if there is a written plan for parent involvement, and if so, obtain a copy. Also ask how parent involvement is integrated into their overall program plan and evaluation.

8. With Educare sites, explain that we will follow up with a planning session based on the information provided for the assessment. With Usual Care sites, thank them for the information and wish them luck with their continued efforts. Collect all the newsprint for your records.

9. Following the assessment, transfer the lists of activities and their +, -, or ? designation to the Staff Parent Involvement Survey Form to use for rating purposes.

10. The coach records data from this assessment process on the Parent Involvement Survey.

The same process may be used one-to-one with family home providers.

E. PARENT INTERVIEWS

E1. Purpose

Parent interviews are conducted with parents of children currently enrolled in a site and their responses are used to gauge the quality of relationships between site staff/providers and parents or other family members. The questions assess both attitudes towards parents as they are reflected in interactions and communication between staff/providers and parents and activities offered by the site to support parental involvement in their children's growth and development.

The interview questions reflects criteria found in NAEYC accreditation standards and in the ECERS, ITERS and FDCRS, and in Joyce Epstein's framework for Parent Involvement. The percentage of criteria met by a site is used to determine their Star rating for Parent Involvement, in combination with information from the Parent Involvement Survey completed with the site staff/provider.

E2. Schedule for Completion.

Parent interviews are conducted as part of the initial rating and as part of each annual rating.

For sites that run on the school year only, initial parent interviews should be done no earlier than October and no later than the end of May. This will give new parents an opportunity to become familiar with the staff and activities of the program and increase the likelihood of getting the necessary number of respondents. If the time of initial enrollment in Educare dictates that assessment is done early in the Fall and there is a high rate of turnover in children attending, parent interviews may be done at the end of the previous program year and used for the Fall rating.

E3. Procedure

Parent interviews must be completed with at least 51% of parents of currently enrolled children at the site ages birth to six years NOT enrolled before or after school care.

Site coaches or contracted interviewers/raters may conduct parent interviews using the protocol outlined in Attachment B8.

F. ACCREDITATION REPORT

If the site is accredited, request a copy of their accreditation report. This will be a document provided to the site from the accrediting body (usually NAEYC or NAFCC) notifying them of their status and often listing recommendations.

This document is used to validate the site's accreditation for their Star rating and may also provide direction for quality improvement goals.

G. OTHER DOCUMENTATION

In addition to the assessment components already listed, the following forms should be completed by the site and collected during the initial assessment period and for each annual rating:

a) Copy of child care license
b) Site Demographic Profile (Attachment A7)
c) Financial data forms
d) Release of Information Form (Attachment A8 - required only for sites that are being observed by the Center for Human Investment Policy and/or are members of a Consolidated Child Care Pilot)
e) Photo Release Form giving Educare permission to videotape or photograph sites for documentation of quality improvements, public relations, and fundraising. (Attachment A9)

When the copy of the child care license is requested, center directors and family home providers should be asked about any licensing violations or conditions on their license and plans to address them.

H. CLASSROOM OBSERVATION (ECERS, ITERS, OR FDCRS)

H1. Purpose

These structured observations, conducted by trained observers, assess several aspects of the classroom environment, including staff-child interactions, health and safety, activities provided for children, and how adult needs are met.

Scores from these observations are used to calculate initial and annual Star ratings. Scores from semi-annual observations are used to help monitor progress and revise quality improvement goals and strategies as needed.

H2. Schedule for Completion

For initial and annual ratings, classroom observations should be scheduled as the LAST assessment component. If staff in a site have been observed and collection of other assessment data is delayed, feedback to the staff is delayed and this often leads to frustration.

Semi-annual observations should be done close to six months after a program has been debriefed on their rating. For programs that run on an academic year, timing of this observation may need to be adjusted in one direction or the other to accommodate the program schedule.

Whenever possible, observations for sites with several classrooms should be scheduled for the same day, or within a day or two of each other.

Score sheets should be completed within one day of an observation. Reports, including scores and corresponding recommendations, should be prepared within one week of completing classroom observations. When observers are doing multiple observations in a short time frame, it is recommended that at least one day be left between scheduled observations so that reports can be written while the data are still fresh for the observer.

H3. Procedure

H3a. General Guidelines

Observations for part-day programs should be completed in 3 to 4 hours. Observations for full-day programs should be completed within 7 to 9 hours including afternoon staff interacting with the children and departure time.

All observations are unannounced. Sites should be given approximately a 3-4 week window in which their observations will be completed. If they have special events, in-service training, or other activities scheduled during this time frame that might affect an observation, they should notify their site coach of these dates.

To proceed with an observation, 80% of the children normally in attendance for that day of the week must be present and the regularly assigned lead teacher must be present. If these conditions are not met, the observation should be rescheduled.

The morning observation must include observing several arrivals and last until children are settled on their mats for nap. The afternoon observation should begin as the children awake from nap and last until 50% of the children (of that classroom) have departed. If the program combines classrooms, half of the time combined must be observed.

Observers may not observe the same classroom twice in a row. Observers should be given an Educare Conflict of Interest form (Attachment A10) to bring to the site to be signed by the site director/family home provider and the observer indicating that the observer has not consulted, provided training, been employed by the site, or acted as an accreditation validator in the past twelve months, and has not conducted the most recent classroom observation in the classroom assigned.

All observers should follow the Guidelines for Classroom Observers (Attachment A11) and must sign a Confidentiality Statement for Observer/Rater (Attachment A15) to be kept on file at Educare.

Following an observation and completion of a written report, the site coach should review the report with the observer to clarify any questions and schedule the site debriefing to include the observer, whether Educare staff or a contracted observer.

H3b. Observations Conducted by Contracted Observers

The general guidelines described above apply to contracted observers. In addition, all contracted observers (with the exception of CHIP observers) must sign a Memorandum of Agreement outlining the terms of the services they will provide to Educare. (Attachment A12)

H3c. Observations Conducted by the Center for Human Investment Policy (CHIP)

Educare has an agreement with CHIP that allows sharing of observation scores and reports on sites being assessed by both organizations, with a written Release of Information from the site. This prevents duplication of effort and is less intrusive to sites. When Educare is using one of CHIP's observations, CHIP should be asked to conduct an extended observation for full-day programs to insure that all required elements are observed.

Educare may also contract with CHIP to conduct observations on other Educare sites when an Educare observer is not available. Once approved by the Director of Quality Improvement, scheduling of these observations with CHIP for any given round should be coordinated by the Lead Program Associate.
As part of the agreement with Educare, CHIP will invite Educare site coaches to debriefings with shared sites, with the consent of the site. Likewise, when CHIP conducts contracted observations for Educare, Educare site coaches should request that the CHIP observers attend site debriefings.

H3d. Scoring

Scoring for each classroom observation should be done according to the instructions given with each of the three instruments. For Educare's purposes, all items in a given subscale should be scored at all levels (i.e. up through level 7) regardless of the actual score earned for each item. This will assist the site in planning quality improvements. So, for example, a program may set up activities for children to use in private space, a level 7 item, but may not have this space accessible for a substantial portion of the day, a level 5 item. These issues present different technical assistance needs and therefore suggest different strategies to address them.

All scores and reports should be reviewed by the site coach for accuracy and completeness, using an ECERS/ITERS/FDCRS Report Checklist (Attachment D18). Scores for each site should then be transferred by the Site Coach to the appropriate Item Analysis form (Attachment D1) for entry into the database by the administrative assistant. The original of this form will be given to OMNI and a copy should be maintained in the Star Rating file for each site.

H4. Observer Training and Reliability

To be an authorized classroom observer, an individual must complete reliability training following ECQUIP protocol established by CHIP (Attachment A13). This training may be provided either by an Educare Colorado Core Evaluator or by CHIP.

Individuals who are being trained as contractual observers will be reimbursed for their training time as outlined in the Observer Memorandum of Agreement (Attachment A12).

Educare observers will follow the protocol for re-reliability training established by CHIP (Attachment A13).

DATA FOR STAFF:CHILD RATIOS

I1. Obtaining Data for Initial Ratings

Ask providers to begin collecting data on staff:child ratios 4 weeks before the projected end of the assessment process. For full-day programs, instruct the provider/site staff on how to use the Daily Staff:Child Ratios Count form (Attachment B10) to record child counts by age at each of the time check points for each classroom. These checkpoints are breakfast, lunch, snack, and 5 pm. For centers, the director should complete the section on staff work schedule. Providers that use the Food Program can use child-count forms required for this purpose but will need to add children's ages and the 5pm count.

For part-day programs, only copies of the attendance list of children by age and the daily staff work schedule need to be submitted.

These records should be kept and copies submitted to the Site Coach for each day that the provider/center is open during the 4-week period. If the provider will be closed for more than 2 days in a row during this time, this number of days should be added to the sample from the 5th week.

I2. Obtaining Data for Ongoing Ratings

Ask providers to begin collecting data on staff:child ratios 12 weeks before tl projected end of the assessment process. Full-day programs may use either t forms provided by Educare or the Food Program forms with the necessary dal added as described above in I1. Part-day programs may submit daily attendar records including children's ages and daily staff work schedules.

These records should be kept and copies submitted to the Site Coach for eacl day that the provider/center is open during the 12-week period.

J. SITE FINANCIAL DATA (Attachment B9)

*III. Rating*

The 4-Star Rating system is summarized in Attachment C1.

A. THE POINT SYSTEM

Sites receive a rating from Star 0 to Star 4 on each of these quality indicators:

| *QUALITY INDICATOR* | *CRITERIA* |
|---|---|
| 1. Classroom Environment | ECERS, ITERS, FDCRS scores |
| 2. Staff Qualifications | Formal education in early childhood education |

| | |
|---|---|
| | Classroom and/or administrative experience |
| 3. Parent Involvement | Site responsiveness to parents as measured by Parent Interviews |
| | Breadth and range of successful activities to engage parents as identified by site staff and parents |
| 4. Ratios (centers only) | Number of adults available to insure adequate supervision and quality interactions with children |

Point values are assigned to each Star level for each of these indicators as follows:

| | |
|---|---|
| Star 0 = 0 points | Star 3 = 6 points |
| Star 1 = 2 points | Star 4 = 8 points |
| Star 2 = 4 points | |

| | |
|---|---|
| 5. Accreditation | In addition to receiving points for the above indicators, sites that become accredited receive an additional 2 points. Once accredited, a site retains these points from one rating to the next unless it loses its accreditation or chooses not to reapply. The primary accreditation for centers is offered through NAEYC. For family homes it is through NAFCC. Sites may apply for a waiver to pursue accreditation through another body using the Accreditation Approval Request form (Attachment A14). Walvers will be granted if the alternate accreditation relies on standards equivalent to those used by NAEYC and NAFCC. |

For centers, the points for the four quality indicators listed above are added, together with points for accreditation, to receive an overall site Star level rating as follows:

| Total Points Across Indicators | Overall Site Star Rating |
|---|---|
| 8 - 15 points | Star 1 |
| 16 -23 points | Star 2 |
| 24 - 31 points | Star 3 |
| 32 points + | Star 4 |

For family homes, the points for the three quality indicators listed above are added, together with points for accreditation, to receive an overall site Star level rating as follows:

| Total Points Across Indicators | Overall Site Star Rating |
|---|---|
| 6 – 11 points | Star 1 |
| 12 – 17 points | Star 2 |
| 18 – 23 points | Star 3 |
| 24 points + | Star 4 |

Sites MUST become accredited to receive a Star 4 Overall Site Rating.

B. CALCULATING A STAR LEVEL FOR CLASSROOM ENVIRONMENT

All classrooms at a site must achieve the minimum ECERS, ITERS, or FDCRS score required for a given Star level for the site to be scored at that level, as follows:

| ECERS/ITERS/FDCRS Score | Star Level |
|---|---|
| Minimum 3.0 | Star 1 (2 pts.) |
| Minimum 3.51 | Star 2 (4 pts.) |
| Minimum 4.26 | Star 3 (6 pts.) |
| Minimum 5.00 | Star 4 (8 pts.) |

EXAMPLE: A site has 3 preschool classrooms and one toddler classroom. The average scale score for each of these classrooms is:

| | |
|---|---|
| ECERS 1 – 3.78 | ECERS 3 – 5.00 |
| ECERS 2 – 4.32 | ITERS – 4.85 |

The site Classroom Environment Star Level will be Star 2, based on the lowest classroom score of 3.78. For this indicator, 4 points would be assigned towards the total Star Rating for the site.

C. CALCULATING A STAR LEVEL FOR STAFF QUALIFICATIONS

The Star Rating for Staff Qualifications at a site is determined by assessing the qualifications of the site administrator(s), teachers as a group and assistant teachers as a group across classrooms. Point scores for each group are averaged and then weighted to reflect the differential contribution that each group makes to quality in the classroom. The weighted point scores for all groups are then added to arrive at an overall point score for Staff Qualifications to be factored in the Star Rating for the site.

Step 1: Using the Provider/Staff Training & Education Summary (Attachment B6) completed by each provider, administrator, or classroom staff member for initial ratings, and updated Individual Professional Development Plans (Attachment D6) for subsequent ratings, calculate the individual's Star level according to the Educare Staff Qualifications Criteria for 4-Star Rating System (Attachment C2).

NOTE: If administrative and program supervision functions are split, i.e. one person has responsibility for overall program administration at the site level and one person has program (classroom) planning and supervisory responsibilities, their credentials may be looked at together and they may be treated as a single score.

Step 2: Assign each individual's credentials the number of points that corresponds to her/his Star level (2 pts. for Star 1, 4 pts. For Star 2, etc.)

Step 3: Add up the point values for all the administrators (directors, assistant directors, and education or program coordinators only.) Divide the total by the number of administrators to get an average point score for administrators. Do the same for all the teachers as a group, and then for all the assistant teachers as a group.

Step 4: The administrators' average point score is weighted as 30% of the total score for staff qualifications at the site. The lead teachers' average point score is weighted as 50% of the total score for staff qualifications. The assistant teachers' average point score is weighted as 20% of the total score for staff qualifications.

To arrive at these weighted scores, multiply the average point score for each group by the assigned percentage.

Step 5: To get a total point score for the site for staff qualifications, add the weighted point scores of the three groups together.

EXAMPLE: A site has an on-site executive director with a Masters degree in administration and 8 yrs. Admin. experience. The Program Coordinator who supervises classroom staff has a Masters degree in Early Childhood Education, 4 years of classroom experience and 1 year of administrative experience. Together, they have the qualifications to rate a Star 4 and can be assigned 8 points.

This site has 6 lead teachers whose Star levels are 3, 2, 3, 4, 1, and 2, equaling a total of 30 points. The average point score for the 6 lead teachers is 5 points.

There are also 6 assistant teachers at this site. Their Star levels are 0, 1, 1, 2, 0, and 1, for a total point score of 10 and an average score of 1.67 points.

The total point score for Staff Qualifications for the site is calculated as follows:

Admin. = 8 points x .30 = 2.4 pts.
Lead teachers = 5 points x .50 = 2.5 pts.
Asst. teachers = 1.67 points x .20 = .3 pts.

The total point score is therefore 4.93, which is rounded to 5. This is the number of points for this indicator that will contribute to the overall Star Rating score for the site.

Because of how it is calculated, Staff Qualifications is the only indicator which may contribute an odd number of points toward the total point score for the overall Star Rating.

D. CALCULATING A STAR LEVEL FOR PARENT INVOLVEMENT

The Star Level for Parent Involvement is determined from data taken from two documents

- Parent Interviews
- Parent Involvement Survey completed with the provider/staff at the site These assessment tools are used to determine how many criteria a site meets for Parent Involvement, as specified in Parent Involvement Criteria Star Levels 1-4 (Attachment C3).

The requirements for all measures indicated for a given criterion must be met to score that criterion as present.

So, for example, if responses from the Parent Questionnaires related to a criterion are positive but the corresponding ECERS items are scored as not present, no credit can be given for that criterion.

The fourth document, the Parent Involvement Survey, is used to determine the number and diversity of types of successful parent involvement activities conducted by each site as required beginning at Star level 2.

To be rated at a give Star Level, a site must meet the requirements for both Parent Involvement criteria AND Parent Involvement Activities at that level as described in Patent Involvement Star Level Ratings (Attachment G).

Step 1: Analyze Parent Questionnaires

Questionnaires must be completed by at least 51% of the parents of children currently enrolled in the Educare classrooms.

Calculate the percentage of YES responses to each question. (This can be done as a report from the database.)

Refer to the "MEASURE" column in the Parent Involvement Criteria Star Levels 1-4 (R-3/2/00- Attachment F) to identify the questions used to assess each criterion. Parent Questionnaire numbers in bold type correspond to the Short Form of the Parent Questionnaire, and numbers in normal type correspond to the Long Form of the Parent Questionnaire.

To receive credit for a question, it must be answered YES by 75% of the parents responding, with the following, exceptions.

EXCEPTIONS: If parent's :child has been enrolled in the program less than one year;

a) on the Short Form, do not use NO or DK responses to questions 4d and 14 in calculating percentages.
b) on the Long Form, do not use NO or DK responses to questions 12, 15 and 24.

Step 2: Check scores on related ECERS, ITERS, or FDCRS items.

For the Parent Involvement criterion to be scored as present, all related ECERS, ITERS or FDCRS items specified in the "MEASURE" column in the Parent Involvement criteria Star Levels 1-4 (R-3/2/00 – Attachment F) must be scored as present in 75% of the Educare classrooms at the site.

Step 3: Check related items on the Organizational Climate Questionnaire.

For the Parent Involvement criterion to be scored as present, all related Organizational Climate Questionnaire items specified in the "MEASURE" column in the Parent Involvement Criteria Star Levels 1-4 (R-3/2/00 – Attachment F) must be answered YES by 75% of the site staff responding (with the exception of item #3h, which may be answered YES by NO MORE than 25% of staff because it is a negative indicator.)

Step 4: Determine if all 8 required criteria for Star Levels 1 and 2 or 9 required criteria for Star Levels 3 and 4 have been met. Then add up the number of additional criteria that meet the standards for the three measures used. Refer to Parent Involvement Star Level Ratings (Attachment G) to find the number of total criteria that must be met by a site at each Star Level, including the 8 or 9 required criteria.

Step 5: On the Parent Involvement Survey completed with information from the provider/site staff, count the number of activities rated as successful (i.e. activities designated with a "+") under each type of parent involvement. Refer to Parent Involvement Star Level Ratings (Attachment G) to find the requirements for each Star Level.

Step 6: Determine from the site's documentation of their parent involvement activities whether or not they have written plans for these activities and if these plans are part of a broader program plan that is evaluated annually.

Step 7: Use the calculations from Steps 4-6 to identify the appropriate Star Level for the site for Parent Involvement.

EXAMPLE: A site meets the 9 required Parent Involvement Criteria needed to rate a Star 3 and 4. They also meet an additional 9 criteria, for a total of 18, or 90% - enough to rate a Star 3 or 4.

The site, also conducts at least one successful activity in each of these four types of parent involvement: communicating, participating, learning at home, and community involvement. This is sufficient to rate a Star 3.

However, these activities are not part of a cohesive written plan for parent involvement. As this is one of the requirements for a Star 3 rating, the site is eligible for only a Star 2 rating for this indicator, for a total of 4 points toward their overall site Star Rating.

E. CALCULATING A STAR LEVEL FOR STAFF:CHILD RATIOS

For center-based programs, the following ratios will be required at each Star Level:

| AGE GROUP | STAR 1 | STAR 2 | STAR 3 | STAR 4 |
|---|---|---|---|---|
| 0 – 18 mos. | 1:5 | 1:4 60% of day | 1:4 all day | 1:3 |
| 18 – 24 mos. | 1:5 | 1:4 60% of day | 1:4 all day | 1:3 |
| 24 – 36 mos. | 1:7 | 1:6 60% of day | 1:6 all day | 1:5 |
| 30 – 36 mos. | 1:8 | 1:7 60% of day | 1:7 all day | 1:6 |
| 36 – 48 mos. | 1:10 | 1:9 60% of day | 1:9 all day | 1:8 |
| 48 – 60 mos. | 1:12 | 1:10 60% of day | 1:10 all day | 1:8 |

In other age combinations, the staff ratio for the youngest child must be utilized if more than 20% of the group is composed of younger children.

Every classroom at a site must meet the ratios for a given star level to be scored at that level.

E1. Determining Staff:Child Ratios and Proportion of Day

El a. Full-Day Programs

Step 1: Find out the schedule for serving breakfast, lunch and snack

Step 2: INITIAL RATING: For each day of the 4 weeks recorded, and for each classroom, compare the child count by age at each of the four checkpoints (breakfast, lunch, snack and 5 pm) with the daily staff. schedule to determine staff:child ratio.

ONGOING RATINGS: Randomly select 4 weeks of the 12 week collection period to use for data analysis. Make sure that no more than one week falls in either December or August. Also de-select any weeks in which the program is closed for more than 2 days. For each day of the 4 weeks selected, and for each classroom, compare the child count by age at each of the four checkpoints (breakfast, lunch, snack and 5 pm) with the daily staff schedule to determine staff:child ratio.

Step 3: Calculate the Star level for each classroom. To meet the 100% of the day requirement for Star levels 1, 3 and 4 the staff:child ratio at all four checkpoints must be at or lower than the requirements set for each Star level on every day sampled.

To see if a classroom meets the 60% of the day requirement for the next highest Star level, first calculate how many hours constitute 60% of the hours per day that the program is open (e.g. if a program is open for 11 hours per day, 60% of the day would be 6.5 hrs.) Using the staff schedule and the ratios for the 4 checkpoints, calculate the lowest ratio maintained for at least that number of hours. Assign the corresponding Star level.

Step 4: Review the Star levels assigned to each classroom. The overall site Star Rating for staff:child ratios will be the same as the lowest rating for an individual classroom.

E1 b. Part-Day Programs

Step 1: INITIAL RATING: For each day of the 4 weeks recorded, and for each classroom, compare the child count by age from the program's daily attendance records with the daily staff schedule to determine staff:child ratio.

ONGOING RATINGS: Randomly select 4 weeks of the 12 week collection period to use for data analysis. Make sure that no more than one week falls in either December or August. Also de-select any weeks in which the program is closed for more than 2 days. For each day of the 4 weeks selected, and for each classroom, compare the child count by age from the program's daily attendance records with the daily staff schedule to determine staff:child ratio.

Step 2: Calculate the Star level for each classroom. To meet the 100% of the day requirement for Star levels 1, 3 and 4 the staff:child ratio must be at or lower than the requirements set for each Star level on every day sampled. Because of the short length of the program day and typical staffing patterns
in part-day programs, it is not expected that ratios will vary during a given day so there should be no need to calculate ratios for 60% of the day. Consequently, classrooms in part-day programs would never be expected to be rated at Star 2 for staff:child ratios.

Step 3: Review the Star levels assigned to each classroom. The overall site Star Rating for staff:child ratios will be the same as the lowest rating for an individual classroom.

| | | | |
|---|---|---|---|
| EXAMPLE: | Preschool room 1<br>6 24-30 mo. olds +<br>8 30-36 mo. olds | Ratio = 1:6 60% of day | Star 2 |

The program is open from 7:00am until 6:00 pm, 11 hours. In this classroom, the ratio at 8am breakfast is 1:9. By 9:30 and through lunch, 3pm snack, and 5pm, ratios are 1:6. This classroom maintains a 1:6 ratio for at least 7.5 hrs, or 68% of the day.

| | | |
|---|---|---|
| Preschool room 2<br>13 3 yr olds +<br>7 4 yr olds | Ratio = 10 all day | Star 1 |
| Preschool room 3<br>13 4 yr olds +<br>17 5 yr olds | Ratio = 1:10 all day | Star 3 |
| Toddler room<br>10 12-24 mo. olds | Ratio = 5 all day | Star |

Preschool room 2 and the Toddler room both have a Star 1 rating. As the overall rating is based on the classrooms with the lowest ratings, the site will rate a Star 1 for Staff:Child Ratios.

F. CALCULATING AN OVERALL STAR RATING FOR A SAMPLE SITE

The site that has been used in the above examples has earned points from each of four quality indicators as follows:

| | |
|---|---|
| Classroom Environment | 4 points |
| Staff Qualifications | 5 points |
| Parent Involvement | 4 points |
| Ratios | 2 points |
| TOTAL | 15 points |

This site is not accredited so no extra points are added to this score. With 15 points, the overall Star Rating for this site is Star 1.

Once Star level ratings for each indicator at a site have been calculated, they can be entered on a Star Rating Summary Chart (Attachment D17) to use in debriefing and technical assistance planning.

*IV. Site Debriefing*

NOTE: Site debriefing is done with Educare sites only, NOT with Usual Care sites.

A. PURPOSE

The purpose of the Site Debriefing is to integrate the results of all the assessment data, review it with site staff, and begin to frame goals for quality improvement.

B. SCHEDULE FOR COMPLETION

The Site Debriefing should be completed within 2 weeks of collection of all data.

C. PROCEDURES/GENERAL GUIDELINES

Debriefings following initial and annual ratings are based on the Classroom Observation Reports and the Site Profile Summary. Annual rating debriefings should include an explanation of site Star Ratings.

Debriefings following semi-annual classroom observations are based only on reports for those observations.

Each site can determine who participates in the debriefing, but it is recommended that an initial debriefing be completed with site administrators followed by individual debriefings with classroom staff. Classroom observers for a given site also should be present for the portion of the debriefing that covers the Classroom Observation Reports.

Copies of Site Profiles and Classroom Observation Reports should be sent to site administrators, classroom teachers, and family home providers in advance of the debriefing.

At the debriefing, it is important for the provider/site staff to have an opportunity to reflect on the classroom observation(s) and the conclusions, preliminary recommendations and goals set out in the observation reports and the Site Profile Summary. One option is to open the discussion by asking for their thoughts and reactions to the information presented and then responding to any questions, surprises, or concerns before moving on to an overall review of the material.

C1. Classroom Observation Reports

NOTE: NO classroom reports are completed for Usual Care sites because they receive no feedback on their assessment. However, a cover sheet with classroom and observation identification information and a summary of domain scores should be prepared for data reporting purposes.

There is a standard format for Classroom Observation Reports (Attachment D2).

C2. Site. Profile Summary

The Site Profile Summary (Attachment D3) integrates the results of all the Educare assessment components, including the classroom observations, staff credentials, site organizational assessment and self-assessment, parent involvement surveys, analysis of ratios, and recommendations from the site's accreditation report, if applicable.

The headings in the Site Profile Summary incorporate those in the Site Self-Assessment, as well as areas covered by the Model Work Standards, the Organizational Assessment, and Parent/Staff Partnerships. The Site Self Assessment has been cross-referenced with items on the ECERS, ITERS & FDCRS (Attachment D4) to make it easier to identify trends across assessment tools to include in the Site Profile Summary.

In developing the Site Profile Summary, consider the following

1. Include an introductory paragraph that discusses general quality, general goals for improvement, and any information that may help to put these in context (e.g. condition of facility, experience of staff, participation in other QI efforts).

2. Both relative strengths and areas for improvement should be addressed in the Site Profile Summary, especially those that reflect trends across classrooms.

3 Where there are wide ranges in classroom observation scores or very distinct strengths or deficits in individual classrooms, this should be noted but recommendations for individual classrooms are more appropriately included in the technical assistance plan.

4. Staffing Patterns & Qualifications should address both staff coverage and ratios as well as education and experience.

5 Group recommended Site Quality Improvement Goals by domain. Focus on those that you see as taking priority. Consider what improvements will have the greatest impact on quality, especially those related to organizational climate, staff education, health and safety, and staff-child interactions. Be sure to take into account goals that would flow from needs identified in the Site Self-Assessment.

6 Long term goals such as insuring that all teachers have at least an A.A degree, improving ratios, and increasing parent involvement can be broken down into shorter term objectives in the Technical Assistance Plan.

7 The number of goals will vary depending on how much work they will require, but BE REALISTIC.

8. Goals should be framed as outcomes, not activities. See examples below under Section VB1.

*V. Developing a Quality Improvement Technical Assistance Plan*

A. PURPOSE

The Technical Assistance Plan (Attachment D5) is the road map for all work with a site to improve quality. It should guide all decisions about training, mentoring, equipment and materials purchases, and facilities improvements. It may include goals for the site as a whole or for individual classrooms.

The T.A. Plan is intended to be a rolling, working document that is revised after each classroom observation and annual rating to reflect progress and target new goals as earlier goals are accomplished.

B. SCHEDULE FOR COMPLETION

Goals, objectives and strategies for the Technical Assistance Plan should be completed within 2 weeks of the site debriefing. Resources to begin implementation of the Plan should be identified within 3 weeks of the site debriefing. Technical Assistance Plans for individual classrooms, if needed, should be completed within 4 weeks of the site debriefing.

C. PROCEDURE

C <u>Setting Goals, Objectives, and Strategies.</u>

Once a site has been debriefed, mutually agreed upon goals, objectives and strategies should be determined. This negotiating process is an art, not a science! Site administrators/providers will have varying degrees of experience and skill in this type of planning and therefore may need more or less direction from the site coach in developing goals, objectives and strategies. Here are some general guidelines:

a. If you are proposing goals in several domains, discuss one domain at a time and try to reach agreement on goals before moving on to the next domain.

b. Once all the goals have been identified, review them together and decide which ones will take priority for the coming year. These goals should then be transferred to the Technical Assistance Plan under the appropriate domain headings.

c. For each goal, objectives and strategies should be developed. In framing goals, objectives, and strategies, move from broad, longer term and general to narrow, short term and specific (see examples below). Goals and objectives are both outcome-oriented, i.e. describe some desired change, but objectives are benchmarks toward goals - typically they are shorter term and more easily measured. Strategies are the means/methods for achieving the goals and objectives - typically activities like training, making materials available, planning a family night, etc. (see examples below).

d. With sites that have been involved in other quality improvement processes or that routinely do assessment-based planning, ask if/how they have been working to address areas needing improvement. This will help to identify the best starting point for work in these areas.

e. Developing relevant objectives and strategies may depend on understanding why the observed condition/behavior is present or absent. For example, inadequate supervision of children indoors may be a structural problem with the building design (bathrooms are not visible from other parts of the room), or an issue of insufficient staffing, or an issue of staff inexperience or lack of training. Each of these possible explanations would require a different strategy and possibly a different objective. In such cases, more discussion with the site director/provider or classroom staff may be needed to surface underlying issues and plan the most effective means to address them.

Sample Goals, Objectivities, and Strategies:

*Health & Safety*
GOAL: Insure adequate sanitary conditions for children.

OBJECTIVE: Improve consistency in keeping tables used for eating sanitized.

Strategy: In each classroom, designate staff to be responsible for sanitizing tables before each meal is served. Post schedule by sink.

*Provider-Child Interactions*
GOAL: Provider-child interactions will promote learning based on children's individual interests.

OBJECTIVE: Provider will demonstrate increased skill in identifying interests, learning styles, and developmental strengths of individual children.

Strategy: Provide training in systematic observation of children.

C2. Completing the Technical Assistance Plan

Once goals, objectives and strategies have been identified and transferred to the Technical Assistance Plan, remaining sections of the Plan should be completed:

a. Timeline: It may be helpful to plan annual timelines in quarters. More detailed workplans of specific tasks and completion dates for each objective/strategy may then be developed quarter by quarter as a working document for the site. This may make T.A. plans with many objectives more manageable.
b. Staff Responsible: This may be site staff, Educare staff or contracted t.a. providers.
c. Outcome Measures: These should identify some concrete means of determining whether an objective has been met. Examples might include an improved score on a classroom observation measure, or improved responses to parent surveys, or written documentation.
d. Resources: List specific resources needed to implement the strategies as they are identified, e.g. Mentor X, ABC training entity, "gross motor equipment to be purchased by Educare".

C3. Individual Professional Development Plans

In line with assessment of Staff Credentials and training/mentoring strategies identified in the Technical Assistance Plan, all classroom and program supervisory staff at a site should have Individual Professional Development Plans (Attachment D6).

Professional development goals for classroom staff should be set by the staff member and her/his supervisor. Coaches may then assist in developing strategies and identifying resources to meet the individual's goals. As in the Technical Assistance Plan, professional development goals are more meaningful when they are framed as outcomes from increasing an individual's knowledge and skill base. College courses, workshops, mentoring, etc. are strategies to meet goals.

Sites may substitute existing written staff development plans that already incorporate identified individual professional development goals for the Educare forms.

Individual Staff Development Plans should be completed within 1 month of finalizing the Technical Assistance Plan and updated annually. Updates will be used to help determine the individual's Star level for rating Staff Credentials.

*VI. Implementing the Technical Assistance Plan*

A. TYPES OF TECHNICAL ASSISTANCE

Technical assistance to improve quality at sites may take a variety of forms Examples include:

On-site workshops
College scholarships
- Attendance at conferences
- On-site mentoring
- Accreditation mentoring
Curriculum materials
Gross motor equipment
Child or adult furnishings Office equipment that will further goals
Facilities improvements such as installation of sinks, fencing, security systems, etc.

- Playground improvements
- Staff incentives
- Parent incentives

B. BUDGET

Over a three year intervention year, each site is allocated $6000 per classroom for equipment, supplies and facilities improvements, and $4500 per classroom for training and education.

Training and education costs include not only direct expenses for course tuition, trainer fees, etc. but also costs for substitutes, staff compensation for time committed outside of regular work hours, TEACH and non-TEACH scholarship bonuses, and other indirect costs. (For Denver & TRIAD sites, costs for the TEACH contract are in addition to these budgeted amounts.)

These figures represent average costs. Some sites may require higher allocations and some sites lower allocations.

Once resources have been identified to meet T.A. Plan and Individual Professional Development Plan goals, coaches can complete a Site Expense form (Attachment D7) to allocate and estimate budget expenditures for the year. This form may be shared with sites to guide them in assembling equipment and materials orders.

C. ORDERING EQUIPMENT & MATERIALS

Before orders for equipment and materials are completed, the Coach should discuss types of items appropriate for meeting the related T.A. Plan goals with the site staff making the order. Specific examples from reputable suppliers may be useful. Vendors such as Kaplan and Lakeshore offer volume and shipping discounts to Educare. Sites should be encouraged to use these vendors if they can meet the sites' needs for equipment and materials. Ordering lists should be reviewed in detail by Coaches before the order is submitted.

Once the Coach has finalized the order, an Expense Authorization Form should be completed (Attachment D8), including the name of the site and a brief explanation of the items requested (the exact list does not have to be itemized on this form). A separate Expense Authorization Form should be completed for each different vendor. The Expense Authorization Form should then be submitted to the Lead Program Associate (except for Denver/Triad sites) for approval, and then to the Director of Quality Improvement.

When completing orders, make sure to apply any discounts available.

Orders to national vendors such as Kaplan and Lakeshore will be processed directly by the main office. Copies of processed orders will be returned to the requesting staff member to be kept in the site files. Orders to local vendors will be returned to the Lead Program Associate for processing and copying to site files.

D. CONTRACTING FOR FACILITIES IMPROVEMENTS

Sites may work with contractors of their choice or coaches. While Educare, may assist in locating appropriate vendors for making facilities improvements requiring construction, plumbing, electrical repairs, etc., it should be made clear to the site/provider that Educare does not endorse particular contractor.

At least two estimates should be obtained when negotiating for facilities improvements and all contractors must be bonded and insured.

Whenever possible, the work should be contracted directly by the site, not by Educare. Required advances may be made directly to the contractor if necessary but it is preferable for all payments to be made to the site, which in turn will pay the contractor/vendor.

Educare cannot guarantee the work of the contractor, this is the responsibility of the site. However, the site coach should work with the vendor and the site to insure that the work agreement will meet the relevant standards in the ECERS, ITEM or FDCRS.

E. CONTRACTING FOR TRAINERS/MENTORS

Individuals being considered as resources for training and/or mentoring should meet the Trainer Approval requirements set by the Colorado Dept. of Human Services for providing training in the Core Knowledge Standards at the relevant level (Attachment D9).

Unless the individual is already a state approved trainer in the desired area, a resume, sample training outline, and at least two references should be submitted before drafting an agreement to perform services.

Any individual providing training or mentoring services must sign a Memorandum of Agreement (Attachments DI10 and D11) outlining learning objectives for participants, fees, and projected dates of service. For objectives that may require an indefinite period of time to complete (e.g. achieving accreditation), services should be contracted for no more than 3 months at a time with the option of extending the agreement.

Site Coaches are encouraged to attend trainings that are first-time presentations for Educare and to complete a Site Coach evaluation of the training. Participants and the trainer should also be asked to complete evaluations at the completion of the training. (Attachments D19C, P and T).

Because all contracted mentoring services are intended to facilitate meeting identified quality improvement goals, a specific mentoring model has been developed for use in Educare sites (Attachment D12). The site administrator/provider, the mentee, and the mentor must all agree to follow this model.

Any possible conflicts of interest should be considered before assigning mentors to specific individuals. For example, a provider who is taking a graded course from an instructor may not wish to have that instructor for an on-site mentor.

F. COLLEGE COURSES/APPROVED NON-CREDIT TRAINING

Coaches should assist site staff/providers in identifying all options for both for-credit courses and state-approved not-for credit training that will assist them in meeting education requirements for their target Star levels in Staff Credentials. This may include traditional on-campus courses at accredited Community or four-year colleges, specially arranged on-site courses, or on-line or other distance learning course options. Distance learning options should be paired with some form of mentoring and/or peer study group to reinforce application of learning in the classroom.

F1. T.E.A.C.H. Scholarships

Educare has an agreement with Colorado T.E.A.C.H. Early Childhood, a program of CORRA to administer scholarships for undergraduate college courses for staff/providers in Educare sites. Attachment D13 details the terms and conditions. Before site staff/providers submit applications to TEACH for these scholarships, coaches should clarify site and staff member obligations for continuing employment, tuition and bonuses with the applicant and/or site administrators. Sites must commit to their portion of tuition payments and centers to at least half the bonus payments unless they plan to link salary increases to educational attainment.

Coaches should also meet with scholarship applicants to insure that they have met with an academic advisor to assist in assessing their preparation for college level courses and in planning their course schedules. Coaches also should review plans for courses to insure that they are consistent with moving providers to move to the next Star level for Staff Credentials.

F2. Non-TEACH Scholarships

In some circumstances, an individual may wish to take a college course and may not qualify for a T.E.A.C.H. scholarship. Examples include:

The staff member is a family service worker or in another position not covered by T.E.A.C.H.

The employer's compensation system does not allow for bonuses

The individual has an advanced degree and wants to take a course that will improve performance
The individual wants to enroll at a college with which T.E.A.C.H. does not have an agreement.

In such cases, expenses for coursework may be covered through an Educare non-T.E.A.C.H. agreement (Attachment D14). The individual will either need to make arrangements for the college to bill Educare for the related expenses or be reimbursed for these expenses. However, in all cases, no payment will be made without pre-approval of the agreement.

Non-T.E.A.C.H. agreements also are available to cover the costs of GED instruction.

Individuals taking advantage of Non-T.E.A.C.H. agreements are expected to make a commitment to continue employment at their site for varying amounts of time, depending on the number of credits taken. Bonuses for successful completion of coursework also are available through these agreements.

F3. Other Options for College Credit & Equivalents

As other options to traditional coursework become available, such as courses offered on-line and challenge tests developed in conjunction with the state's Professional Credentialing system in lieu of coursework, site coaches should keep sites informed of these options and facilitate access to them as needed.

All TEACH and non-TEACH applications must be reviewed by Site Coaches before they are submitted. All requests for other training must be pre-approved, i.e. Memoranda of Agreement for trainers/mentors and requests for on-site or off-site workshops/conferences should be reviewed by the Lead Program Associate and forwarded to the Director of Quality Improvement for signature.

*VII. Tracking Site Progress*

A. SITE QUALITY IMPROVEMENT TIMELINE

This form (Attachments A5 & A6) is used with sites to develop a schedule for each step in the assessment, rating, and quality improvement process. It helps the coach and the site plan to complete required steps in a timely fashion and it provides a written record of progress in accomplishing these steps. Form A5 is for use with new sites and Form A6 is for use with sites that have completed an initial rating.

Tentative dates for each step should be filled in by the Site Coach in the "Date Due/Scheduled" column and then reviewed with the site director/provider and revised as needed. The general timeline outlined in Section IC should be used as a guideline for completing Quality Improvement Timelines for specific sites. A copy of the projected Timeline should be given to each site. Upon completion of each step, the "Date Completed" column should be filled in.

Throughout each Rating and Technical Assistance Planning cycle, these forms should be updated monthly with the site and copies given to the Lead Program Associate/Director of Quality Improvement.

Tracking this data across sites will also help us to continue to improve the efficiency of the QI process.

B. QUALITY IMPROVEMENT TECHNICAL ASSISTANCE PLAN PROGRESS REPORT

The Quality Improvement Plan Progress Report (Attachment D15) is the working version of the Quality Improvement Technical Assistance Plan for each site. It contains columns to report on the Status of each activity and the Date. It should be updated monthly both to record completion of activities to meet stated objectives and to make revisions in objectives and activities as they are continually assessed for their impact on quality in the site. The Status column should be used to record not only progress on completing the activity but also any barriers encountered and comments related to needed revisions. Updates may be done on the computer version of the document; it is not necessary to provide hard copies except to the site.

This document should be reviewed with sites at least quarterly. If shorter-term work plans have not been developed, the Progress Report should be reviewed with the site monthly.

C. SITE CONTACT FORMS

The Site Contact Form (Attachment 16) is an optional form intended to assist Coaches in tracking the process of working with sites. It is one means of documenting concerns, ongoing coaching tasks, and contacts with sites regarding significant issues. To be most useful, any contacts recorded should be dated and steps for follow-up should be noted.

ATTACHMENTS - Section A
*Site Documents/Observer Documents*

A1 Educare Memorandum of Agreement - center

A2. Educare Memorandum of Agreement - family home

A3. Usual Care Memorandum of Agreement - center

A4. Usual Care Memorandum of Agreement - family home

A5. Quality Improvement Timeline - new site

A6. Quality Improvement Timeline - annual rating

A7. Site Demographic Profile

A8. Release of Information

A9. Photo Release Form

A10. Conflict of Interest Form

A11. Guidelines for Classroom Observers

A12. Observer Memorandum of Agreement

A13. CHIP Reliability Protocol

A14. Accreditation Approval Request

A15. Confidentiality Statement for Observer/Rater

ORGANIZATIONAL ASSESSMENT

The design of this assessment gives all members of the organization an opportunity to identify strengths, areas for improvement and group dynamics underlying their work together, using an interactive group process. As a group, the members generate shared, valid data about what is working and what is not working. After analyzing the data, the group members must decide which issues are important enough to warrant additional investment of their time and effort. They are confronted with the challenge of taking ownership for their work together and developing plans to make their organization more effective. If the group does not take ownership or make a commitment to improve the organization, they still must decide "Where do we go from here?"

Because the process for generating data on key issues is public and shared, the likelihood that resulting action plans will be implemented is increased.

Objectives:

To assess the current dynamics and climate of the organization, especially as they might affect program quality improvement efforts

- To identify a shared vision for future direction
- To begin a plan for improvement Preparation:

The Site Coach should meet with the center director to explain the Organizational Assessment process and set dates and times. At least 5 hrs. should be allotted in no more than 2 sessions. Working with the director and perhaps one other staff member, assessment questions should be generated specific to the site. The list of 16 sample questions can be used as a starting point. The total number of questions should be kept to no more than 16-18 questions. Insure that some questions are included that will elicit strengths or positive comments. Once the questions are identified, each one should be written on a separate sheet of newsprint with enough room for all participants to write in a response. If you know how many small groups will be analyzing the data generated from the questions, you may group the questions and label the newsprint sheets to assign them to each small group (e.g. if there will be four groups, you might evenly divide the questions into four groups and label the newsprint sheets either as A, B, C, or D.) On the day(s) of the assessment, each question should be posted around the room but kept hidden until the data generation exercise begins.

Each site staff person should be approached individually ahead of time to get her/his commitment to participate. The director may wish to do this alone or with the help of the Site Coach.

Group Process:

1. Review the objectives. Point out that a) this is an opportunity to get everyone's perspective out in the open and to get everyone's best thinking on how to improve the organization, and b) as a group, they have much more power to make things happen than any one individual has.

2. Set the climate. Ask people to identify what needs to happen to make the day worthwhile for them. This may take the form of things they want to accomplish during the day or how they want to work together. If norms for working together aren't addressed in the responses, ask what ground rules are needed for the day. All responses should be recorded on newsprint. Before moving on, get agreement from the group on ground rules that all are willing to abide by and be accountable for. This means that if at any time someone feels that a ground rule is not being followed, that person may remind the group of their agreement. This includes facilitators.

3. Data generating. Uncover the questions on the newsprint sheets posted around the room and explain the process for responding to them. Every participant should respond to every question. "Don't know" and "ditto" responses are acceptable. The questions may be answered in any order. They do not need to identify themselves in their answers. When everyone seems to be done, check in to see if they have responded to all questions. If so, ask them to walk around the room and read all the responses. This is meant to be an individual, silent activity to give them a chance to take in the information on the newsprint – they should not discuss it at this time.

4. Analyzing the data. Divide into small groups and assign an equal number of questions to each group. They may take the newsprint to their tables if this is easier. Each small group should answer these questions about their data as a whole:
   a. What themes or patterns do you see?
   b. What inconsistencies do you see, if any?
   c. What organizational/team strengths and weaknesses are identified in the data?

Each group should choose a recorder and a reporter so they can report out to the large group when the activity is completed.

Before the groups report out, instruct people that they need to listen carefully to each other because they will need to put all the information together in the next activity. As each group reports out, list their findings on newsprint. After all groups have reported out, ask the large group to reflect on these questions:
   a. Were there any surprises?
   b. Was anything important omitted?

c. Do you have any burning questions about anything you've heard or read?

Anything that comes from these questions should be noted as additional information. If it relates to specific responses to questions and the individual whose response it is wishes to address the questions, s/he should have the opportunity to do so.

5. Integrating the data. Divide into the same number of different small groups. Again, a recorder and reporter should be chosen. Each small group should summarize what they have learned from the data in a statement describing their organization/team, e.g. "We, ______________ are an organization or a group of people that/who______________". When finished, each group should read its statement to the large group. List key words, phrases, and issues on newsprint.

6. Identifying shared priorities/goals. From what they have heard and seen, as a large group, ask participants to identify which issues they feel are important AND that they can commit to working on. You may facilitate this process by referring to the newsprint summaries. Flag these on the newsprint and get consensus on them as shared goals.

7. Next steps. It's important that people leave with some idea of their next steps. How detailed and planned out this is will depend on time and energy remaining at this session. Some options are to form subcommittees to work on specific issues, brainstorm some solutions to be further evaluated at a later date, or ask individuals to write down two or three things they are willing to do personally in the next month and share their commitments with a "buddy" who will check in with them in a month for a progress report.

8. Closure. Congratulate the group on its hard work and go back to what they wanted to make the day worthwhile to check in on their sense of how the day went. Distribute evaluation forms to be completed.

9. Follow-up. Within a week, contact the site director to plan some type of follow-up with participants.

EDUCARE SITE SELF ASSESSMENT (C)

SITE NAME: ______________________ DATE: ______________________

PERSON COMPLETING FORM: ______________________

I. INTERACTIONS AMONG STAFF AND CHILDREN

GOAL: Interactions between children and staff provide opportunities for children to develop an understanding of self and others and are characterized by warmth, personal respect, positive support, and responsiveness.

HOW WELL DO YOUR PROGRAM'S STAFF-CHILD INTERACTIONS SUPPORT OR REFLECT THE FOLLOWING?

| | Strength | Needs Improvement | Not Sure | Comments |
|---|---|---|---|---|
| 1. Positive, non punitive discipline and guidance | | | | |
| 2. Developmentally appropriate expectations | | | | |
| 3. Language development | | | | |
| 4. Focus on social skills | | | | |
| 5. Warmth and affection | | | | |

II. CURRICULUM

GOAL: The program's planned activities and daily schedule encourage children to be actively involved in the learning process, and to pursue their own interests. Activities and materials are varied and support children's role as members of diverse communities.

HOW WELL DOES YOUR PROGRAM'S CURRICULUM INCORPORATE THE FOLLOWING?

| | Strength | Needs Improvement | Not Sure | Comments |
|---|---|---|---|---|
| 1. Developmentally appropriate materials and equipment | | | | |
| 2. Planning for each child's growth and development | | | | |
| 3. Balance and range of activities (physical, social, emotional, cognitive) | | | | |

| | | | | |
|---|---|---|---|---|
| 4. Appreciation for diversity | | | | |
| 5. Management of transitions from one activity to another | | | | |

III. ADMINISTRATION

GOAL: The program is efficiently and effectively administered with attention to the needs and desires of children, parents, and staff

HOW WELL DEVELOPED ARE THE FOLLOWING COMPONENTS OF YOUR PROGRAM?

| | Strength | Needs Improvement | Not Sure | Comments |
|---|---|---|---|---|
| 1. Operating policies and procedures that address: | | | | |
| • record keeping and confidentiality | | | | |
| • maintaining fiscal stability and accountability | | | | |
| • insurance and liability policies | | | | |
| • emergency policies and procedures | | | | |
| 2. Parent/administrative relationships: commitment to insuring communication with all families and inclusion of parents in program planning | | | | |
| 3. Community/program relationships and resources | | | | |
| 4. Policies and procedures for transitions between settings (either from one classroom to another or one program to another.) | | | | |

IV. HEALTH AND SAFETY

GOAL: The health and safety of children and adults are protected and enhanced. The program acts to prevent illness and accidents, is prepared to deal with emergencies, and educates children concerning health and safety practices.

HOW WELL DO YOUR PROGRAM'S HEALTH AND SAFETY PRACTICES INCORPORATE THE FOLLOWING?

| | Strength | Needs Improvement | Not Sure | Comments |
|---|---|---|---|---|
| 1. Staff preemployment physicals and evaluation for communicable diseases for example: TB, Rubella, Chicken Pox | | | | |
| 2. Current health and immunization records for children | | | | |
| 3. Arrival and departure policies | | | | |
| 4. Vehicle safety (if applicable) | | | | |

| | | | | |
|---|---|---|---|---|
| 5. A safe place for staff to keep personal belongings | | | | |
| 6. Contracted/employed maintenance staff to perform daily facility maintenance | | | | |
| 7. Supervision of children (including accident reports) | | | | |
| 8. Reporting policies and procedures for child abuse and neglect | | | | |
| 9. Staff certification in Pediatric CPR and First Aid | | | | |
| 10. Policies and procedures for maintaining sanitary conditions, including food handling | | | | |
| 11. Policies and procedures to keep children safe from hazards for example: cleaning supplies, medication stored in locked cupboards | | | | |

V. PHYSICAL ENVIRONMENT

GOAL: The amount arrangement, and use of space both indoors and outdoors fosters optimal growth and development through opportunities for exploring and learning. The physical space and materials provided support positive interactions between adults and children.

*HOW WELL DOES YOUR PROGRAM'S PHYSICAL ENVIRONMENT SUPPORT THE FOLLOWING?*

| | Strength | Needs Improvement | Not Sure | Comments |
|---|---|---|---|---|
| 1. Compliance with Americans with Disabilities Act for children and adults. | | | | |
| 2. Outdoor space: | | | | |
| • Appropriate natural environment (sun, shade, vegetation) | | | | |
| • Variety of play surfaces for example: sand, grass, cement | | | | |
| • Variety of age-appropriate equipment | | | | |
| • Conducive to a variety of activities throughout the year | | | | |
| • Safe and protected from dangers | | | | |
| 3. Indoor space: | | | | |
| • Space for individual, small and large group activities | | | | |
| • Sand, water, woodworking available | | | | |
| • Defined interest areas with clear pathways. | | | | |
| 4. Physical comfort (heating, ventilation, soft elements, light) | | | | |
| 5. Space and furnishings for staff to take breaks, do planning, hold meetings, etc. | | | | |

VI. NUTRITION

GOAL: The nutritional needs of children are met in a manner that not only promotes their physical development but also encourages good eating habits. Meal times are used as opportunities for social, emotional and cognitive development.

HOW WELL DOES YOUR PROGRAM INCORPORATE THE FOLLOWING?

| | Strength | Needs Improvement | Not Sure | Comments |
|---|---|---|---|---|
| 1. United States Department of Agriculture nutrition guidelines | | | | |
| 2. Menus and feeding schedules are available to parents | | | | |
| 3. Mealtimes are planned, pleasant learning experiences | | | | |

VII. EVALUATION

GOAL: Systematic assessment of the program's effectiveness in meeting its goals for children, parents, and staff insures that quality care and education are provided.

HOW WELL DOES YOUR PROGRAM INCORPORATE THE FOLLOWING?

| | Strength | Needs Improvement | Not Sure | Comments |
|---|---|---|---|---|
| 1. Regular evaluation of all program components | | | | |
| 2. Inclusion of parents, staff and community members (where appropriate) in program evaluation | | | | |
| 3. Regular, formal assessment of children's progress | | | | |

VIII. COMMUNITY INVOLVEMENT

HOW DOES YOUR PROGRAM ENCOURAGE COMMUNITY PARTICIPATION AND UTILIZE COMMUNITY RESOURCES?

IX. Are there quality improvement goals that you are currently working on related to another program or evaluation process? Please list.

EDUCARE SITE SELF ASSESSMENT (F)

SITE NAME: ______________________ DATE: ______________

I. INTERACTIONS BETWEEN PROVIDER AND CHILDREN

GOAL: Interactions between children and provider offer opportunities for children to develop an understanding of self and others and are characterized by warmth, personal respect, positive support, and responsiveness.

HOW WELL DO YOUR INTERACTIONS WITH CHILDREN SUPPORT OR REFLECT THE FOLLOWING?

| | Strength | Needs Improvement | Not Sure | Comments |
|---|---|---|---|---|
| 1. Positive, non punitive discipline and guidance | | | | |
| 2. Developmentally appropriate expectations | | | | |
| 3. Language development | | | | |
| 4. Focus on social skills | | | | |
| 5. Warmth and affection | | | | |

II. CURRICULUM

GOAL: The program's planned activities and daily schedule encourage children to be actively involved in the learning process, and to pursue their own interests. Activities and materials are varied and support children's role as members of diverse communities.

HOW WELL DOES YOUR PROGRAM'S CURRICULUM INCORPORATE THE FOLLOWING?

| | Strength | Needs Improvement | Not Sure | Comments |
|---|---|---|---|---|
| 1. Developmentally appropriate materials and equipment | | | | |
| 2. Planning for each child's growth and development | | | | |
| 3. Balance and range of activities (physical, social, emotional, cognitive) | | | | |
| 4. Appreciation for diversity | | | | |
| 5. Management of transitions from one activity to another | | | | |

III. ADMINISTRATION

GOAL: The program is efficiently and effectively administered with attention to the needs and desires of children, parents, and the provider.

HOW WELL DEVELOPED ARE THE FOLLOWING COMPONENTS OF YOUR PROGRAM?

| | Strength | Needs Improvement | Not Sure | Comments |
|---|---|---|---|---|
| 1. Operating policies and procedures that address: | | | | |
| • record keeping and confidentiality | | | | |
| • fiscal policies and procedures | | | | |
| • insurance and liability policies | | | | |
| • emergency policies and procedures | | | | |
| 2. Policies and procedures for transitions from child care to school | | | | |

IV. HEALTH AND SAFETY

GOAL: The health and safety of children and adults are protected and enhanced. The provider acts to prevent illness and accidents, is prepared to deal with emergencies, and educates children concerning health and safety practices.

HOW WELL DO YOU INCORPORATE THE FOLLOWING HEALTH AND SAFETY PRACTICES IN YOUR PROGRAM?

| | Strength | Needs Improvement | Not Sure | Comments |
|---|---|---|---|---|
| 1. Regular provider physicals and evaluation for communicable diseases for example: TB, Rubella, Chicken Pox | | | | |
| 2. Current health and immunization records for children | | | | |
| 3. Arrival and departure policies | | | | |
| 4. Supervision of children (including accident reports) | | | | |
| 5. Reporting policies and procedures for child abuse and neglect | | | | |
| 6. Provider certification in Pediatric CPR and First Aid | | | | |
| 7. Policies and procedures for maintaining sanitary conditions, including food handling | | | | |
| 8. Policies and procedures to keep children safe from hazards for example: cleaning supplies, medication stored in locked cupboards | | | | |

V. PHYSICAL ENVIRONMENT

GOAL: The amount, arrangement, and use of space both indoors and outdoors fosters optimal growth and development through opportunities for exploring and learning. The physical space and materials provided support positive interactions between adults and children.

HOW WELL DOES YOUR PROGRAM'S PHYSICAL ENVIRONMENT SUPPORT THE FOLLOWING?

| | Strength | Needs Improvement | Not Sure | Comments |
|---|---|---|---|---|
| Outdoor space: | | | | |
| • Appropriate natural environment (sun, shade, vegetation) | | | | |
| • Variety of play surfaces for example: sand, grass, cement | | | | |
| • Variety of age-appropriate equipment | | | | |
| • Conducive to a variety of activities throughout the year | | | | |
| • Safe and protected from dangers | | | | |
| 2. Indoor space: | | | | |
| • Space for individual, small and large group activities | | | | |
| • Sand, water, woodworking available | | | | |
| • Defined interest areas with clear pathways | | | | |
| 3. Physical comfort (heating, ventilation, soft elements, light) | | | | |

VI. NUTRITION

GOAL: The nutritional needs of children are met in a manner that not only promotes their physical development but also encourages good eating habits. Meal times are used as opportunities for social, emotional and cognitive development.

HOW WELL DOES YOUR PROGRAM INCORPORATE THE FOLLOWING?

| | Strength | Needs Improvement | Not Sure | Comments |
|---|---|---|---|---|
| 1. United States Department of Agriculture nutrition guidelines | | | | |
| 2. Menus and feeding schedules are available to parents | | | | |
| 3. Mealtimes are planned, pleasant learning experiences | | | | |

VII. EVALUATION

GOAL: Systematic assessment of the program's effectiveness in meeting its goals for children, parents, and the provider insures that quality care and education are provided.

HOW WELL DOES YOUR PROGRAM INCORPORATE THE FOLLOWING?

| | Strength | Needs Improvement | Not Sure | Comments |
|---|---|---|---|---|
| 1. Regular evaluation of all program components | | | | |
| 2. Inclusion of parents in program evaluation | | | | |
| 3. Regular, formal assessment of children's progress | | | | |

VIII. COMMUNITY INVOLVEMENT

HOW DO YOU ENCOURAGE COMMUNITY PARTICIPATION AND UTILIZE COMMUNITY RESOURCES IN YOUR PROGRAM?

IX. Are there quality improvement goals that you are currently working on related to another program or evaluation process? Please list.

Model Work Standards For Teaching Staff in Center-Based Child Care

1. WAGES

| CONSISTENTLY MET | PARTIALLY MET OR UNMET/HIGH PRIORITY | PARTIALLY MET OR UNMET/LOW PRIORITY | Standard | ESSENTIAL |
|---|---|---|---|---|
| | | | 1.1 Salary scales for all positions are published and readily available to all employees | ✓ |
| | | | 1.2 Salary scales range from a locally-determined 'self-sufficiency wage' or 'living wage' for teacher aide and teacher assistant positions, to annualized public school teacher salaries for highest-paid teacher positions. This is the targeted level for high-quality child care work environments. (See Appendix, p.28, for more information about the terms 'self-sufficiency wage' and 'living wage.') | |
| | | | 1.3 Salary scales identify different levels of pay for different levels of education | ✓ |
| | | | 1.4 High-quality Level: Until salaries reach target levels, staff minimally receive an annual 5% raise in wages, in addition to a cost-of-living increase. | ✓ |
| | | | Striving Level: Staff receive cost-of-living increases annually. | |
| | | | 1.5 Until salaries reach target levels, salary scales are reviewed annually and revised when additional funds become available from parent fee increases, reimbursement or other subsidy rate increases, or other sources. | ✓ |
| | | | 1.6 Wages are paid in full when the program has an unexpected closure, e.g. inclement weather days. | |
| | | | 1.7 All work – both the direct care of children, and work that supports the care of children (e.g. staff meetings, planning time, parent conferences, extra responsibilities, paid leave, etc.) – is paid at no less than the regular rate of pay | |
| | | | 1.8 Any staff member who is qualified to perform a higher-paid job, and temporarily performs it, is paid at the higher rate of pay for all hours worked on that job. | |
| | | | 1.9 As required by federal law, all work by child care teaching staff that is over 40 hours per week is paid at the overtime rate of time and a half. | ✓ |
| | | | Number of standards that are consistently met: _____ out of 9. | |

NOTES ON WAGES:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>2. BENEFITS | ESSENTIAL |
|---|---|---|---|---|
| | | | 2.1 High-quality Level: Full-time employees receive 100% employer-paid health insurance, including prescription coverage. Health insurance for part-time employees is pro-rated. | ✓ |
| | | | Striving Level: Full-time employees receive 75% employer-paid health insurance. Health insurance for part-time employees is pro-rated. | |
| | | | 2.2 High-quality Level: A negotiable package equivalent to 10% of salary is avail- able for child care, family member health coverage, short and long term disability insurance, dental insurance, optical insurance or life insurance. | |
| | | | Striving Level: A negotiable package equivalent to 5% of salary is available for child care, family member health coverage, short and long term disability insurance, dental insurance, optical insurance or life insurance. | |
| | | | 2.3 High-quality Level: A pension plan is available with an employer contribution, which equals 5% of salary and includes an option for employee contributions. | |
| | | | Striving Level: A pension plan is available with an employer contribution, which equals 2% of salary and includes an option for employee contributions. | |
| | | | 2.4 High-quality Level: Staff receive at least 15 paid sick/personal days per year, which can be taken to care for sick family members as well. | ✓ |
| | | | Striving Level: Staff receive at least 12 paid sick/personal days per year, which can be taken to care for sick family members as well. | |
| | | | 2.5 At least one year's worth of unused sick days can be carried over to the following year. | |
| | | | 2.6 High-quality Level: A minimum of 11 holidays are paid each year. Staff and employer together determine days closed for holidays. When holidays fall on a weekend, the day before or after is the paid holiday. | ✓ |
| | | | Striving Level: A minimum of 8 holidays are paid each year. Staff and employer together determine days closed for holidays. When holidays fall on a weekend, the day before or after is the paid holiday. | |
| | | | 2.7 Employees may use personal or vacation time for religious or cultural holidays for which the center is not closed. | |

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>2. BENEFITS—continued | ESSENTIAL |
|---|---|---|---|---|
| | | | 2.8 High-quality Level: During the first year of employment, employees accrue vacation time of at least 10 days per year. | ✓ |
| | | | Striving Level: During the first year of employment, employees accrue vacation time of at least 5 days per year. | |
| | | | 2.9 High-quality Level: During years two through four, employees accrue vacation time of at least 15 days per year. | ✓ |
| | | | Striving Level: During years two through four, employees accrue vacation time of at least 10 days per year | |
| | | | 2.10 High-quality Level: After five years, employees accrue vacation time at the rate of 20 days per year. | ✓ |
| | | | Striving Level: After five years, employees accrue vacation at the rate of 15 days per year. | |
| | | | 2.11 Part-time employees earn vacation on a pro-rated basis. | |
| | | | 2.12 High-quality Level: Up to 10 days of vacation time may be carried over into the following year. | |
| | | | Striving Level: Up to 5 days of vacation time may be carried over into the following year. | |
| | | | 2.13 There are written policies describing the conditions under which an unpaid leave of absence may be taken by employees. | |
| | | | 2.14 High-quality Level: Up to 12 weeks of unpaid leave is allowed each year for the birth or adoption of a child, acceptance of a foster child, or employee or family member illness. The employee is guaranteed continued health coverage and his/her job back at the same rate of pay and benefits as prior to the leave. | |
| | | | Striving Level: Up to 8 weeks of unpaid leave is allowed each year for the reasons given above. Provisions to stay on the current health care plan and to be re- assigned to a job with the same rate of pay and benefits as prior to the leave are guaranteed. | |
| | | | Number of standards that are consistently met: _____ out of 14 | |

NOTES ON BENEFITS:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>**3. JOB DESCRIPTIONS & EVALUATIONS** | ESSENTIAL |
|---|---|---|---|---|
| | | | **3.1** Staff members are provided a copy of their written job description, and of evaluation procedures and instruments, before beginning employment. | ✓ |
| | | | **3.2** Job descriptions are accurate and specific. | |
| | | | **3.3** Job descriptions are reviewed regularly and teaching staff have input into any revisions. | |
| | | | **3.4** Job descriptions include minimum qualifications for the position. | |
| | | | **3.5** Staff are evaluated three (3) months after the date of hire, or at the end of a probationary/orientation period if less than six (6) months, and then at least annually thereafter. | |
| | | | **3.6** The evaluation process includes: 1) a self-evaluation completed by the employee, 2) a written evaluation by the supervisor, 3) a peer or team evaluation, and 4) a meeting between the employee and the supervisor to discuss the evaluation. | ✓ |
| | | | **3.7** A procedure is in place for employee evaluation of supervisors. | |
| | | | Number of standards that are consistently met: _____ out of 7. | |

NOTES ON JOB DESCRIPTIONS & EVALUATIONS:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>**4. HIRING & PROMOTIONS** | ESSENTIAL |
|---|---|---|---|---|
| | | | 4.1 Current employees are informed of any job opening at least five working days before outside advertising begins. | |
| | | | 4.2 Policies focus on developing current employees for promotions and leadership positions. | ✓ |
| | | | 4.3 In hiring for teaching positions, the interviewing/decision-making committee shall include at least two teaching staff members, at least one of them working in the room where the vacancy occurs. | |
| | | | 4.4 In hiring for supervisory or management positions, the interviewing/decision-making committee shall include at least one teaching staff member. | |
| | | | 4.5 Orientation is provided before a new employee begins teaching responsibilities. The orientation includes a review of program policies and procedures, as well as the employee's legal rights in the workplace. | |
| | | | Number of standards that are consistently met: _____ out of 5. | |

NOTES ON HIRING & PROMOTIONS:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>5. TERMINATION, SUSPENSION, SEVERANCE & GRIEVANCE PROCEDURES | ESSENTIAL |
|---|---|---|---|---|
| | | | 5.1 Employees are not discharged without just cause. | ✓ |
| | | | 5.2 No discharge for unsatisfactory job performance takes place until the employee has been warned of unsatisfactory performance in writing and has been given reasonable time to improve (except under circumstances as described in 5.3). Written notice of discharge, stating reasons for dismissal, is given to the employee. | ✓ |
| | | | 5.3 Grounds for immediate dismissal, with no prior notice, include: the display of physical violence harmful to children or adults or property, a guilty verdict or substantiated state investigation of child abuse or neglect, evidence of alcohol and/or other drug abuse, misuse of funds, falsification of documents, and violation of confidentiality requirements. | |
| | | | 5.4 A staff person under investigation for alleged child abuse and/or neglect is transferred to responsibilities that do not involve direct contact with children, or is placed on a paid leave of absence without loss of benefits, until such time as: 1) an investigation is completed by the appropriate agency, or 2) the completion of a trial in a court of law. A positive finding in an investigation or a guilty verdict in a court of law is grounds for immediate dismissal. | |
| | | | 5.5 High-quality Level: In the case of a layoff, employees receive a minimum of two weeks' notice, followed by severance pay equal to one week of pay for each year of employment, up to four weeks. | |
| | | | Striving Level: In the case of a layoff, employees receive a minimum of two weeks' notice and full payment of wages for those two weeks, whether working or not. | |
| | | | 5.6 Grievance procedures are in writing and are available to all employees. | ✓ |
| | | | 5.7 Grievance procedures state who can or must initiate a complaint, how it must be initiated, who receives the complaint, when the complaint must be filed, and how the complaint will be resolved. | |
| | | | 5.8 Employees have the right to have another person present at any point in the grievance process. | |
| | | | 5.9 No retaliatory action is taken against staff who implement the grievance procedure. | |
| | | | Number of standards that are consistently met: _____ out of 9. | |

NOTES ON TERMINATION, SUSPENSION, SEVERANCE & GRIEVANCE PROCEDURES:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>6. CLASSROOM ASSIGNMENTS, HOURS OF WORK & PLANNING TIME | ESSENTIAL |
|---|---|---|---|---|
| | | | 6.1 Staff work schedules and classroom assignments are set at the time of hire. | |
| | | | 6.2 Classroom assignments are stable and are not changed in response to daily fluctuations in child enrollments. No arbitrary or capricious changes occur. | ✓ |
| | | | 6.3 When work schedules must be changed temporarily, staff input is considered. | ✓ |
| | | | 6.4 When work schedules must be changed permanently, a minimum of two weeks' notice is given. | ✓ |
| | | | 6.5 The child care needs of teaching staff are considered when determining work assignments. | |
| | | | 6.6 In a 40-hour work week, one paid 15-minute break for each 4-hour period is scheduled and an unpaid 30-minute lunch break is offered. Consistent and qualified substitutes or floater teachers are available for coverage during these scheduled periods of non-responsibility for children. | |
| | | | 6.7 High-quality Level: Child care teachers receive five (5) hours of paid planning time each week. This time may be used for: observation, curriculum planning, team meetings and staff collaboration, committee and/or Board meetings, parent communication, gathering and preparing materials, reflection on classroom practices, and assessment of children's growth and development. | |
| | | | Striving Level: Child care teachers receive two (2) hours of paid planning time each week. This time may be used for the activities identified above. | |
| | | | 6.8 Child care teachers are not responsible for children during their planning time, as reflected in the program's staffing pattern or the employment of qualified substitutes or floater teachers. | |
| | | | 6.9 High-quality Level: The program is closed at least two (2) days each year for long-range program planning and for renewing the physical environment. | |
| | | | Striving Level: The program is closed at least one (1) day each year for long-range program planning and for renewing the physical environment. | |
| | | | Number of standards that are consistently met: _____ out of 9. | |

NOTES ON CLASSROOM ASSIGNMENTS, HOURS OF WORK & PLANNING TIME:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>7. COMMUNICATION, TEAM BUILDING & STAFF MEETINGS | ESSENTIAL |
|---|---|---|---|---|
| | | | 7.1 Communication between teaching staff, administration and supervisory staff models respect for the valuable work of child care. | ✓ |
| | | | 7.2 An effective communication system ensures that everyone on staff is informed about new procedures, policies and events. Such a communication system respects the various learning styles of staff; it incorporates both visual and verbal messages, and, as appropriate, a "walking through" process for new procedures. | ✓ |
| | | | 7.3 Written policies and procedures for the program are provided to employees at the time of hire, including but not limited to: job descriptions; personnel policies; salary/benefit schedules; staff disciplinary policies; program policies; expectation for staff involvement in parent meetings, conferences, fundraising events and other activities; and health policies for both children and staff. | ✓ |
| | | | 7.4 Proposed changes in policies and procedures are circulated in writing to all staff, and a sufficient period is allowed for meaningful staff input and response before changes are adopted or implemented. | ✓ |
| | | | 7.5 Paid staff meetings engaging all staff are held at least once per month. Staff meetings are primarily for improving program quality, enhancing staff communication, and promoting professional development of staff. In addition, staff meetings may be used for announcements, reminders and general issues of efficient program operation. | ✓ |
| | | | 7.6 Staff have input into the agenda of staff meetings, the agenda is distributed in advance of meetings, and a written record of the meeting is kept and posted. | |
| | | | 7.7 Opportunities exist for teachers to work collaboratively on projects, to share resources, and to solve problems together. | |
| | | | 7.8 Activities are planned and traditions are kept which create a sense of community among the staff. | |
| | | | 7.9 Orientation and welcoming of new teachers incorporate the expertise of current staff. | |
| | | | 7.10 Opportunities exist for staff to observe one another and work together to improve teaching practices and expand their repertoire of teaching skills. | |
| | | | Number of standards that are consistently met: _____ out of 10. | |

NOTES ON COMMUNICATION, TEAM BUILDING AND STAFF MEETINGS

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>8. DECISION MAKING & PROBLEM SOLVING | ESSENTIAL |
|---|---|---|---|---|
| | | | 8.1 Teaching staff make decisions regarding daily activities, room arrangements and other matters that affect their day-to-day practice. | ✓ |
| | | | 8.2 Teaching staff share decision making with the administration in situations where decisions impact their work life. These decisions include, but are not limited to: staffing for paid leave time, scheduling, rotation of responsibilities, ordering materials for the classroom, screening and interviewing new staff, and managing staff turnover with consideration for the needs of children and staff. | |
| | | | 8.3 Staff are engaged in setting program goals, identifying priorities to meet the goals, and measuring progress. | ✓ |
| | | | 8.4 The program philosophy and a vision for the future are shared by staff and reviewed at least annually. | ✓ |
| | | | 8.5 There is a commitment on the part of everyone to look at what's not working, along with an openness to and support for trying new ideas. | |
| | | | 8.6 Problems are viewed as opportunities for program improvement. | |
| | | | Number of standards that are consistently met: ____ out of 6. | |

NOTES ON DECISION MAKING AND PROBLEM SOLVING:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br><br>9. PROFESSIONAL DEVELOPMENT | ESSENTIAL |
|---|---|---|---|---|
| | | | 9.1 Staff receive open, honest and regular feedback based on routine classroom observation. | ✓ |
| | | | 9.2 Staff receive clear expectations about job performance. | |
| | | | 9.3 Staff are guided in setting challenging but reachable goals; resources are pro-vided to assist in reaching goals. | |
| | | | 9.4 Supervision is individualized to meet each teacher's or assistant teacher's needs. | |
| | | | 9.5 Confidentiality of all information regarding employees is maintained. | ✓ |
| | | | 9.6 Staff development and training plans are determined through a mutual evaluation process between the staff member and the supervisor. Training choices reflect the learning styles and interests of individual staff members. | ✓ |
| | | | 9.7 High-quality Level: In addition to planning and staff meeting time, staff have a minimum of forty (40) hours of paid professional time each year. | ✓ |
| | | | Striving Level: In addition to planning and staff meeting time, staff have a mini-mum of twenty-five (25) hours of paid professional time each year. | |
| | | | 9.8 Teaching staff can use professional time for individualized and state mandated in-service training, attending college classes, observation time in other child care programs, and/or release time for activities related to child care advocacy. | |
| | | | 9.9 Increases in education are rewarded with increases in compensation. | ✓ |
| | | | 9.10 The program provides accessible and affordable professional development opportunities both on-site and within the community. No more than half of the state required training hours can be on-site because of the importance of collaboration and community building among child care professionals. | |

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>**9. PROFESSIONAL DEVELOPMENT- continued** | ESSENTIAL |
|---|---|---|---|---|
| | | | 9.11 High-quality Level: Each staff member is allocated at least $150/year for professional development expenses, after six months of employment. Unused amounts can be carried over to the next year. | |
| | | | Striving Level: Each staff member is allocated at least $75/year for profession- al development expenses, after six months of employment. | |
| | | | 9.12 Staff are provided encouragement and support to share their professional development experiences by conducting in-service training for co-workers. | |
| | | | 9.13 Opportunities to be mentors or to be mentored are available. Appropriate training and compensation are available for staff serving as mentors. | |
| | | | 9.14 Information about educational funding is available to staff who wish to pursue college degrees in early childhood education or child development. | |
| | | | 9.15 Substantial effort is made to create educational funds if they are not currently available in the community. | |
| | | | 9.16 Information is available to staff regarding opportunities for professional sup-port outside the center, e.g. support groups, professional associations, informal net-works, and advocacy groups. | |
| | | | Number of standards that are consistently met _____ out of 16. | |

NOTES ON PROFESSIONAL DEVELOPMENT:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>10. PROFESSIONAL SUPPORT | ESSENTIAL |
|---|---|---|---|---|
| | | | 10.1 Professional support is available to the staff (either on-site or in the commu- nity), including but not limited to: office manager, health care and mental health professional, social worker, psychologist, nutritionist, cook, bus/van driver, and maintenance worker. | |
| | | | 10.2 The program consistently maintains sufficient staff for manageable group sizes and adult/child ratios that ensure individual attention for each child every day. | ✓ |
| | | | 10.3 Trained substitutes or floater teachers are available and arranged by the pro-gram administration for all staff leave time, including sick, vacation, personal and professional leave. | ✓ |
| | | | 10.4 The program is adequately equipped to meet the developmental needs of all the children in the program. | |
| | | | 10.5 Staff have access to petty cash funds for immediate consumable supplies, and a system is in place for requesting funds when needs are apparent. | |
| | | | 10.6 Staff have input in determining the program's operating budget for supplies and equipment. | |
| | | | 10.7 Professional development plans, as well as recruitment and promotion practices, ensure that peer support is available to all staff from entry level to those with the greatest education and experience. | |
| | | | 10.8 Professional support is available for working with parents, and for working with families or children who have special needs. | |
| | | | Number of standards that are consistently met: _____ out of 8. | |

NOTES ON PROFESSIONAL SUPPORT:

| CONSISTENTLY MET | PARTIALLY MET OR UNMET/HIGH PRIORITY | PARTIALLY MET OR UNMET/LOW PRIORITY | Model Work Standards For Teaching Staff in Center-Based Child Care<br>11. DIVERSITY | ESSENTIAL |
|---|---|---|---|---|
| | | | 11.1 All staff participate in ongoing anti-bias/anti-racist training as part of in-service and professional development activity, with a focus on working with adults as well as children. | ✓ |
| | | | 11.2 The program honors, respects, and affirms all staff members. Fulfillment of this goal is evaluated regularly with staff input. | ✓ |
| | | | 11.3 Program recruitment, retention and promotion policies and practices reflect a commitment to staff diversity. | ✓ |
| | | | 11.4 Employees are not discriminated against based on race, color, age, religion, sex, handicap, marital status, political persuasion, national origin or ancestry, physical appearance, income level or source of Income, student status, sexual preference, union activity or criminal record except as required by licensing regulations. | ✓ |
| | | | 11.5 Reasonable accommodations are made for staff with special needs as required by the Americans with Disabilities Act (ADA). | ✓ |
| | | | Number of standards that are consistently met: _____ out of 5. | |

NOTES ON DIVERSITY:

Model Work Standards For Teaching Staff in Center-Based Child Care

12. HEALTH & SAFETY

| CONSISTENTLY MET | PARTIALLY MET OR UNMET/HIGH PRIORITY | PARTIALLY MET OR UNMET/LOW PRIORITY | 12. HEALTH & SAFETY | ESSENTIAL |
|---|---|---|---|---|
| | | | 12.1 The program accepts responsibility for providing a safe and healthy working environment for employees. | ✓ |
| | | | 12.2 Personal protective equipment or clothing, e.g. disposable gloves, are avail-able without cost to the employee. | |
| | | | 12.3 Staff receive annual training on safe methods for handling objects and children, e.g. lifting toddlers, and on healthy classroom practices. | |
| | | | 12.4 Staff receive annual training on the management of infectious diseases. | |
| | | | 12.5 Staff receive annual training regarding security procedures and systems. | |
| | | | 12.6 Regularly used equipment (e.g. diapering tables) and storage areas are designed on ergonomic principles and are at a height and location that allow staff to use gestures and postures that are safe. | ✓ |
| | | | 12.7 Adult-sized chairs, sinks, toilets and work stations are available. | ✓ |
| | | | 12. 8 Clear policies that delineate the conditions under which children are excluded from the classroom because of illness or injury are consistently implemented. | |
| | | | 12.9 Copies of reports resulting from inspection of the workplace by building, health, safety or licensing officials are posted. | ✓ |
| | | | 12.10 No retaliatory action is taken against employees who refuse to perform work that is in violation of regulations, after notifying the employer of the violation. | ✓ |
| | | | 12.11 Security measures, as identified with input from all staff, are in place to ensure staff members' physical well-being, e.g. alarm, lighting, or other security systems; emergency back-up plans; double staffing at the ends of the day, etc. | |
| | | | 12.12 Policies are in place to assure a work environment that is free of sexual harassment. | |
| | | | 12.13 In addition to providing breaks, the program provides in-service training for staff on management of stress and other issues relating to emotional and mental well-being. | |
| | | | Number of standards that are consistently met: _____ out of 13. | |

NOTES ON HEALTH & SAFETY:

PART 1: MODEL CONTRACT & PROGRAM POLICIES

The criteria in this section are intended as guidelines for developing a family child care con-tract or parent-provider agreement, or assessing your current one, and for developing program policies as they relate to your work environment. Note: These criteria do not address all the policies regarding the operation of your program that you would include in your information to parents. Standards that address the learning environment for children and other aspects of your pro-gram can be found in the standards for family child care accreditation. See page 36 for more information on accreditation.

| CONSISTENTLY MET | PARTIALLY MET OR UNMET/HIGH PRIORITY | PARTIALLY MET OR UNMET/LOW PRIORITY | Model Work Standards For Family Child Care<br><br>**PROVIDER INCOME**<br><br>For more discussion of setting fees based on the full cost of quality child care, and on calculating a family-supporting income, see "Notes on Provider Income" and the "Full Cost of Care Worksheet" in the Appendices, pages 28-32. | ESSENTIAL |
|---|---|---|---|---|
| | | | 1.1 The fees charged for child care, in combination with other sources of income for the child care business, guarantee that all reasonable and customary expenses will be met and that the provider has:<br>• an income that at minimum is sufficient to support a family in the provider's community, and is ideally comparable to others in the community with similar levels of education, experience and responsibility.<br>• health care coverage that fully covers the provider and any dependents not covered under an alternate health care plan, and<br>• savings to assure self-sufficiency in retirement | |
| | | | 1.2 High-quality Level: The provider receives an annual cost-of-living increase as reflected in increased fees. In addition, until provider compensation reaches a level that is comparable to that of others in the community with similar levels of education, experience and responsibility, there is an additional annual fee increase. | ✓ |
| | | | Striving Level: The provider receives an annual cost-of-living increase as reflected in increased fees. | |

| CONSISTENTLY MET | PARTIALLY MET OR UNMET/HIGH PRIORITY | PARTIALLY MET OR UNMET/LOW PRIORITY | Model Work Standards For Family Child Care<br>**PROVIDER INCOME**-CONTINUED | ESSENTIAL |
|---|---|---|---|---|
| | | | 1.3 The provider's income is guaranteed by a written provider-parent contract which stipulates that:<br>• all contracted hours are paid for in full, regardless of a child's attendance, and<br>• fees are paid in full when the program has an unexpected closure due to provider illness or family emergency. A maximum number of paid days for such closures may be established in the contract. | ✓ |
| | | | 1.4 Fee and payment schedules are revised to reflect changes in state reimbursement rates for subsidized child care whenever these occur. | |
| | | | 1.5 When the provider achieves a higher level of formal education (e.g. earns a degree or credential in early childhood education) or becomes nationally accredited, she has the flexibility guaranteed in her contract to revise her fee and payment schedule to reward this achievement. | |
| | | | 1.6 Financial records, including an operating budget, are used to gauge the program's stability. | ✓ |
| | | | 1.7 A record-keeping system is in place to maximize business deductions available to the provider and to assure compliance with tax laws. | |
| | | | 1.8 The program is covered by insurance policies, including program liability insurance, homeowners insurance, disability insurance for the provider, and vehicle insurance if the program sometimes transports children. (Note: Many providers may find it difficult to obtain disability insurance, but we consider it essential to have the other forms of insurance listed here.) | ✓ |
| | | | 1.9 For the purpose of setting and collecting fees, the provider requests parents to check with their employers about pre-tax child care benefits, and/or with local agencies about child care subsidies. | |

NOTES ON PROVIDER INCOME:

| CONSISTENTLY MET | PARTIALLY MET OR UNMET/HIGH PRIORITY | PARTIALLY MET OR UNMET/LOW PRIORITY | Model Work Standards For Family Child Care<br>**PROVIDER BENEFITS**-CONTINUED | ESSENTIAL |
|---|---|---|---|---|
| | | | 1.14 In the event that the provider must take a maternity leave, she may take all accrued sick and vacation time, billing parents for this portion of her leave. | |
| | | | 1.15 High-quality Level: The provider has a plan which guarantees that eight to ten percent of net earnings are set aside for retirement. | |
| | | | Striving Level: The provider has a plan which guarantees that five percent of net earnings are set aside for retirement. | |
| | | | 1.16 At least annually, the provider assesses the impact of her income and benefits on her ability to provide quality child care. | |

NOTES ON PROVIDER BENEFITS:

| CONSISTENTLY MET | PARTIALLY MET OR UNMET/HIGH PRIORITY | PARTIALLY MET OR UNMET/LOW PRIORITY | Model Work Standards For Family Child Care<br>**HOURS OF WORK** | ESSENTIAL |
|---|---|---|---|---|
| | | | **1.17** In calculating hours worked, for the purpose of setting fees, the provider includes time for planning, preparation, cleaning, shopping, record-keeping, and conversing with enrolled or prospective parents. | ✓ |
| | | | **1.18** The provider establishes a work schedule that allows her the break time and respite she needs to maintain the energy and stamina required for caring for children. This may be reflected in:<br>• the number of hours worked per day or per week<br>• enrollment patterns that ensure some "down time" during the day<br>• the use of qualified assistants or family members to be on-site during "down times" such as naptime<br>• a system of parent volunteers and/or family members to take on or help with certain program tasks; such as food shopping, child care laundry, and equipment repairs<br>• employment of substitute providers as needed, or the employment of a regular assistant provider<br>• contracting out for certain services, such as food catering, cleaning and maintenance, and/or tax preparation. | |

NOTES ON HOURS OF WORK:

| CONSISTENTLY MET | PARTIALLY MET OR UNMET/HIGH PRIORITY | PARTIALLY MET OR UNMET/LOW PRIORITY | Model Work Standards For Family Child Care<br><br>PROVIDER-PARENT COMMUNICATION | ESSENTIAL |
|---|---|---|---|---|
| | | | 1.19 The provider and parents sign a contract that defines:<br>• hours of care<br>• fee schedule and payment policies, including late fees for overdue payments, overtime rates for late pick-ups, and fees for non-contracted hours if provided (such as drop-in during unscheduled time, weekend or overnight care)<br>• other charges, which may include but are not limited to: registration or other administrative fees, meal expenses (if not on the Child and Adult Care Food Program), special activity fees, infant supplies, an annual continuing education fund for the provider, fees for returned checks, fees associated with any court or collection agency costs incurred in the collection of overdue payments, and fees associated with seeking emergency medical attention<br>• policies covering absences of the provider and children, including vacation, holiday and sick leave<br>• termination of care, including but not limited to: a trial period upon initial enrollment, a process for conflict resolution, a notification period in which full fees are paid, and conditions warranting immediate termination<br>• a provision for contract updates and renewals, occurring at least annually<br>• parents' responsibility for finding alternate care, and/or circumstances under which provider hires a substitute; minimal qualifications of substitutes; and an emergency back-up plan for substitutes. | |

| CONSISTENTLY MET | PARTIALLY MET OR UNMET/HIGH PRIORITY | PARTIALLY MET OR UNMET/LOW PRIORITY | Model Work Standards For Family Child Care<br><br>**PROVIDER-PARENT COMMUNICATION-CONTINUED** | ESSENTIAL |
|---|---|---|---|---|
| | | | 1.20 Written program policies are provided to all parents, specifying such things as emergency procedures, discipline and guidance policies, and the daily schedule.<br>Also included are:<br>• a job description for the provider which, in addition to the care and education of children, includes such tasks as program planning, record keeping, budgeting, shopping for groceries and program materials, food preparation, and cleaning and maintaining the child care environment<br>• the provider's professional credentials and/or level of education in child care and development<br>• a statement of how the program is regulated (for example, licensed, certified or registered by the state), and where parents can get more information on state child care regulations and their rights as consumers<br>• a statement of philosophy and program goals, reviewed annually with the parents of children enrolled<br>• a list of items that parents are expected to provide to the program for their child's care, if any (such as diapers, food, formula, clothing, or bedding). | |
| | | | 1.21 Ongoing communication mechanisms ensure that parents are informed about new procedures, policies and events, and build a partnership with parents for the care and education of their child. This can take a variety of forms, including but not limited to bulletin boards, newsletters, daily activity reports, journals, phone conversations, parent-provider conferences, an "open door" visitation policy, parent volunteer opportunities, pot-lucks and other social activities, and fundraising projects. | ✓ |
| | | | 1.22 Parents are aware of the family child care budget, particularly the expenses involved in the operation of the program. | |

NOTES ON PROVIDER-PARENT COMMUNICATION:

PART 2: PROFESSIONAL DEVELOPMENT

Your work environment as a family child care provider is enhanced when you approach your job with confidence in your skills, and with knowledge of child development and small business management. As in all professions, a family child care provider's education deserves to be viewed as a lifelong process. But professional development for providers also poses unique barriers, some of which are addressed in Part 5, "Community Support for Creating Better Family Child Care Jobs."

| CONSISTENTLY MET | PARTIALLY MET OR UNMET/HIGH PRIORITY | PARTIALLY MET OR UNMET/LOW PRIORITY | Model Work Standards For Family Child Care<br>**PROFESSIONAL DEVELOPMENT** | ESSENTIAL |
|---|---|---|---|---|
| | | | 2.1 The provider has received education in child development and in small business management, including the special aspects of running a family child care business. | ✓ |
| | | | 2.2 The provider has received training in child care health and safety issues, including those areas which affect her own well-being, and receives updated training as needed. This includes training on:<br>• safe practices for lifting children and heavy objects, in order to prevent back and knee injuries<br>• the management of infectious diseases and universal precautions for blood-borne pathogens<br>• nutrition and safe food-handling practices<br>• stress management and other issues related to the emotional and mental well-being of the provider and children. | ✓ |
| | | | 2.3 The provider participates in continuing education. Her professional development time may be used for state-mandated training, college classes, professional conferences, observation time in other child care programs, and/or release time for child care advocacy activities. | ✓ |
| | | | 2.4 The provider participates in ongoing anti-bias/anti-racism training as part of her professional development activity, with a focus on working with both adults and children. | ✓ |

| CONSISTENTLY MET | PARTIALLY MET OR UNMET/HIGH PRIORITY | PARTIALLY MET OR UNMET/LOW PRIORITY | Model Work Standards For Family Child Care<br>**PROFESSIONAL DEVELOPMENT**-CONTINUED | ESSENTIAL |
|---|---|---|---|---|
| | | | **2.5** The program budget allocates an annual fund for professional development expenses, sufficient to cover the cost of training and related expenses, such as substitutes. | |
| | | | **2.6** Through increased parent fees and/or other available subsidies (such as grant programs or differential reimbursement rates from the state), the provider is recognized and rewarded for attaining higher levels of formal education and/or accreditation. | |
| | | | **2.7** The provider conducts an annual assessment of the quality of her program, including obtaining feedback from parents, and uses the results of this evaluation to plan her professional development activities. | |
| | | | **2.8** The provider has peer support through either an informal network of providers or a more formal family child care support group, in order to engage in problem-solving with colleagues and to benefit from their experiences and encouragement. | ✓ |
| | | | **2.9** The provider participates in a professional association, family child care support group, or early childhood organization as part of ongoing professional development. | |
| | | | **2.10** The provider is aware of community supports that enhance professional development, such as family child care mentoring programs or leadership opportunities. (See "Community Support for Creating Better Family Child Care Jobs", Part 5.) | |

NOTES ON PROFESSIONAL DEVELOPMENT:

PART 3: THE FAMILY CHILD CARE HOME AS A WORK ENVIRONMENT

To allow you to do your best work, the physical setting of the child care program must nurture not only the children but you as a provider. Because your work environment is also your home, you might assume when designing and equipping the space for child care that the space already meets your own needs, when in fact it does not. Typically, a child care environment is evaluated from the perspective of the children, not the provider. For this reason, a rationale (in italics) is provided for many of the standards in this section.

| CONSISTENTLY MET | PARTIALLY MET OR UNMET/HIGH PRIORITY | PARTIALLY MET OR UNMET/LOW PRIORITY | Model Work Standards For Family Child Care<br>**WORK ENVIRONMENT** | ESSENTIAL |
|---|---|---|---|---|
| | | | **3.1** The provider follows applicable state and local regulations regarding the physical space. | ✓ |
| | | | **3.2** The arrangement of space, the daily schedule, and the use of materials are balanced to meet the needs of both the child care program and the provider's family. | |
| | | | **3.3** Adult-sized chairs and work stations are available in the child-care space of the home. The provider has a comfortable place to sit and be with children. | |
| | | | **3.4** Regularly used equipment (such as diapering tables and infant carriers) and storage areas are designed at a height and location that allow the provider to use gestures and postures that are safe and comfortable. *[There is growing concern about the occupational hazards of providing child care. Of particular concern is the potential for stress on the provider's back and knees from moving children and equipment.]* | |
| | | | **3.5** There is ample and easily accessible storage space. *[Convenient storage minimizes the dangers associated with clutter for both children and the provider, and accessible storage ensures appropriate supervision at all times. Good storage also maximizes the efficient use of space – a challenge in many family child care homes.]* | |
| | | | **3.6** There is adequate space and enough toys and equipment to meet the develop-mental needs of the children enrolled. *[Inadequate space and resources often lead to additional stress for the provider, causing her to engage more constantly in behavior management and/or causing strain on her relationship with the children.]* | |

| CONSISTENTLY MET | PARTIALLY MET OR UNMET/HIGH PRIORITY | PARTIALLY MET OR UNMET/LOW PRIORITY | Model Work Standards For Family Child Care<br>**WORK ENVIRONMENT – CONTINUED** | ESSENTIAL |
|---|---|---|---|---|
| | | | 3.7 There is an office or designated area, equipped with a telephone, for conducting family child care business. | |
| | | | 3.8 There is a place in the home for the provider and the parents to meet together. | |
| | | | 3.9 Included in the child care environment are artifacts, photographs and other objects that reflect the provider's life and family, as well as the lives of the children in care. *[Providing such objects creates a sense of belonging and community among all who share the space, including adults.]* | |
| | | | 3.10 Clear policies delineate the conditions under which children are excluded from the family child care program because of illness, and these policies are consistently implemented. *[Such policies promote the physical well-being of the provider as well as the children in care.]* | |
| | | | 3.11 Policies describe an emergency back-up plan in the event that care cannot be offered due to provider illness or injury, or a natural disaster, (for example, what to do and where to go in the event of a fire, tornado or earthquake). | |
| | | | 3.12 Copies of reports resulting from inspection of the child care home by building, health, safety or licensing officials are posted for parents (and employed staff, if any) to see. *[This practice may engage parents and others in helping to maintain a safe and healthy environment.]* | |
| | | | 3.13 The provider is aware of community resources that can enhance the family child care home as a safe and healthy work environment. (See Part 5). | |

NOTES ON WORK ENVIRONMENT:

PART 5: COMMUNITY SUPPORT FOR CREATING BETTER CHILD CARE JOBS

Resources and support within a community can contribute tremendously to creating good family child care jobs. Unfortunately, what communities have to offer varies a great deal in terms of quantity, quality, and accessibility to the provider. Quantity of services, in fact, may not be the main issue: providers working in rural areas may have fewer community resources, but ones that are well-targeted and useful, while providers in a large city may be surrounded with resources that they know nothing about. There is potential to do more and to do better in both cases. While you as a provider cannot necessarily control what if any community support is available to you, knowledge of the possibilities can influence you as an advocate for better child care jobs.

| AVAILABLE IN THE COMMUNITY | NOT CURRENTLY AVAILABLE | Model Work Standards For Family Child Care<br>COMMUNITY SUPPORT |
|---|---|---|
| | | 5.1 Qualified substitute/respite providers are available for the provider to take leave time when the child care program does not close, when family or personal emergencies arise, and when the provider is engaged in professional activities that take her away from the program. |
| | | 5.2 Professional support in the community is available to the provider, including but not limited to the following possibilities:<br>• an organized substitute provider pool that screens and provides training for substitutes<br>• technical assistance and consultation on such issues as program and business management, applying for loans or grants, and designing family child care environments<br>• a resource and referral program that helps providers maintain their desired enrollment<br>• access to the expertise of other professionals, such as nutritionists, social workers and health care practitioners. |
| | | 5.3 The provider has access to appropriate, affordable and relevant training and education that keeps her up-to-date on professional issues and offers new ideas for program planning. Access includes consideration for the time of day, the length of the training session, and the location. Basic to advanced-level training is available, preferably with college credit. |

| AVAILABLE IN THE COMMUNITY | NOT CURRENTLY AVAILABLE | Model Work Standards For Family Child Care<br>**COMMUNITY SUPPORT– CONTINUED** |
|---|---|---|
| | | **5.4** Information about educational opportunities and funding for education is available to the provider through various community agencies, such as resource and referral agencies, licensing agencies and professional associations. |
| | | **5.5** Information is available to providers regarding involvement in professional associations, support groups and advocacy networks. |
| | | **5.6** Information is available to providers regarding resources and services for children with special needs and their caregivers. Included in this information is how to make appropriate referrals when necessary, and the impact of the Americans with Disabilities Act (ADA) on the provider's enrollment practices. |
| | | **5.7** The provider has a network of peers, family and friends to help her counteract the sense of isolation that can arise in family child care. |
| | | **5.8** Opportunities exist for a new provider to work with a mentor during the first two years of operation, and for an experienced provider to mentor others. Mentors are also available for providers seeking accreditation. Mentoring programs include appropriate training and compensation for providers serving as mentors. |
| | | **5.9** Opportunities exist to network with center-based child care teachers in the community for the purposes of sharing information and resources, and working together on advocacy efforts. |
| | | **5.10** Opportunities exist to promote family child care providers as leaders in child care advocacy networks, community forums or committees, and the training of other providers. |

| AVAILABLE IN THE COMMUNITY | NOT CURRENTLY AVAILABLE | Model Work Standards For Family Child Care<br><br>COMMUNITY SUPPORT– CONTINUED |
|---|---|---|
| | | 5.11 Resources are available to providers to offset some of the expenses of operating a family child care business. These could include, but are not limited to:<br>• a toy, book and equipment lending service<br>• traveling "curriculum enhancers," such as storytellers, dancers, musicians, scientists and other resource people who can share their talents in family child care programs<br>• a professional library with books, journals, brochures, videotapes and other materials on issues of interest to family child care providers<br>• business management tools and tax preparation assistance<br>• access to technology, including computers, photocopiers, fax machines and e-mail<br>• buying clubs to purchase food and/or other consumable supplies in bulk with other providers<br>• cleaning services<br>• maintenance and repair services<br>• food preparation services<br>• diaper services. |
| | | 5.12 A community-based "speakers bureau" and other public education activities engage providers and other community leaders in addressing parent concerns about child care issues, and enhance the image of family child care in the community. |

NOTES ON COMMUNITY SUPPORT:

PROVIDER/STAFF TRAINING AND EDUCATION SUMMARY

To be completed by each family home provider or classroom staff member and program administrator.

SITE NAME: ______________________ DATE: __________

NAME: ______________________ POSITION: __________

CLASSROOM: ______________________ DATE OF HIRE (mo/yr): __________

| | Date Completed | Major | Number of Credits | Number of ECE Credits |
|---|---|---|---|---|
| High School Diploma or GED | | | | |
| Vocational Education Certificate Early Childhood Education | | | | |
| Child Development Associate (CDA Credential) | | | | |
| Associate of Arts or Sciences Degree | | | | |
| Bachelor of Arts or Sciences Degree | | | | |
| Master of Arts or Sciences Degree | | | | |
| Doctorate Degree | | | | |
| Group Leader Qualified | | | | |
| Director Qualified | | | | |
| CO Professional Credential | | Level: | | |
| PLEASE PROVIDE 1) TRANSCRIPTS OR OTHER RECORDS DOCUMENTING YOUR HIGHEST DEGREE ACHIEVED AND ALL EARLY CHILDHOOD COURSEWORK COMPLETED 2) DOCUMENTATION OF GROUP LEADER OR DIRECTOR QUALIFICATIONS. | | | | |

| | |
|---|---|
| Verifiable non-credit training in ECE. | Please attach a list of trainings attended or copies of certificates or completion. |

Directors only: Please list number of contact hours OR number of course credits in Administration or Program Management: HRS ____ CREDITS ____ (If non-credit hrs., please describe on back of page).

| Position | Classroom Teacher/Home Provider | Classroom Assistant | Administration | Other (please describe) |
|---|---|---|---|---|
| # of year PAID early childhood experience at this site (1 year = 2000 hrs) | | | | |
| # of year PAID early childhood experience at other sites | | | | |

PARENT INVOLVEMENT SURVEY
(to be completed by Site Coach)

Site Coach: ______________________ Date: __________

For each category listed below, please list all the activities/strategies (including policies) that the site uses to support parent involvement. Put a "+" next to those activities that the site thinks are successful and a "-" next to those activities that the site thinks have been ineffective.

SUPPORTING EFFECTIVE PARENTING – Creating a home environment that supports the child's healthy growth and development.

☐ ______________________

☐ ______________________

COMMUNICATING – Sharing information about the child's progress, significant events, interests, and the parent's child-rearing philosophy and educational goals.

☐ ______________________

☐ ______________________

☐ ______________________

☐ ______________________

PARTICIPATING – Taking part in classroom and program activities as a member of the program "community", e.g., volunteering in the classroom, helping with fundraising, attending family events, donating materials or expertise.

☐ ________________________________________

________________________________________

☐ ________________________________________

☐ ________________________________________

________________________________________

________________________________________

________________________________________

LEARNING AT HOME – providing activities to stimulate children's learning and development, e.g., reading to children, making drawing materials available, playing matching games, having conversations about shared experiences.

________________________________________

________________________________________

________________________________________

☐ ________________________________________

☐ ________________________________________

☐ ________________________________________

________________________________________

PARENT LEADERSHIP – Advocating and providing guidance on issues that affect children in the program or in the community, e.g., sitting on an advisory board or speaking at public meetings.

______________________________

______________________________

______________________________

☐ ______________________________

______________________________

______________________________

☐ ______________________________

PARENT COMMUNITY INVOLVEMENT - Taking part in groups and activities and using community resources, taking an active role as a community member, e.g., being active in a faith community, being a scout leader, supporting cultural events.

______________________________

______________________________

______________________________

______________________________

______________________________

______________________________

______________________________

Parent Interview Form

Site Code______________ Interviewer________________

Classroom Code Date____________________

Parent Code Child's Birth Date__________

Turn on phone recording machine.

Hello, my name is ______________ and I am calling from Educare Colorado. Educare is interested in finding out how your child's center works with and involves families in their program. Would you be willing to participate in an interview to help us find out this information? The interview will take about 20 minutes and everything that you say will be confidential; except, for example, we are required to report anything that would suggest possible child abuse or neglect. Are you willing to be interviewed?

If the respondent answers yes, continue.

I will be audiotaping this interview to make sure that we have an accurate record of your answers. Are you still willing to participate?

If the respondent answers yes, continue.

How many children do you have attending ____________________?

If the respondent has more than one child, state the following:

For this interview, please choose your child whose birth month and day is closest to today's date.

Is this child in (list Educare classrooms at this site)?
If the respondent answers no, ask for another child. If the respondent answers yes, continue.

What is your child's birth date?

How long has s/he been attending ________________?

How long has s/he been in her/his current classroom?

What are the names of your other children attending ______________?

1. Some childcare programs help parents to understand how their child learns and grows. For example, they may help parents to learn more about setting bedtime routines, toilet training or language development. Has ____________ helped you to learn more about how your child learns and grows?
If the respondent answers yes, ask the following question.

How have they helped you to learn more about how your child learns and grows?
List strategies If the respondent is having difficulty answering the question, ask the following prompt:

For example, do they offer parenting workshops, make informal books or videos available, have parent conferences, or talk with you about how your child is learning and growing?
List strategies:

If the respondent's child is in preschool (ages 2 ½ to 5), ask question 2A, if the respondent's child is between the ages of birth and 2 ½ go to question 2B:

2A. Doing activities with children at home like reading to them and putting puzzles together helps him/her to learn language and to understand how things are alike and different. Has ______________ shared ideas with you about how to help your child to learn at home?

How have they shared these ideas with you?
List strategies:

If the respondent is having difficulty identifying strategies, ask the following prompt:

For example, do they suggest ideas for learning activities at home in newsletters, or invite you to observe activities in the class that can be done at home, or make children's books or toys available to you?
List strategies:

2B. Doing activities with your baby or toddler at home like doing finger plays, singing, or looking at picture books helps him/her to learn language and to understand how things are alike and different. Has ____________ shared ideas with you on how to help your child learn at home?

How have they shared these ideas with you?
List strategies:

If the respondent is having difficulty answering the question, ask the following prompt:

For example, do they suggest ideas for learning activities at home in newsletters, or invite you to observe activities in the class that can be done at home, or make children's books or toys available to you?
List strategies:

3. If you wanted more information about how young children grow and learn, or on how to work with your child at home on things like discipline, bedtime routines or learning new skills, on a scale from 1 to 5 where 1 is very uncomfortable, 3 is neutral and 5 is very comfortable, how comfortable would you be asking your child's teacher for information on how your child learns and grows?

Circle: 1 2 3 4 5

If the respondent asks for clarification on 2 or 4 say:
2 is uncomfortable and 4 is comfortable

Please tell me why you chose # ?

4a. On a scale of 1 to 5, where 1 is not well, 3 is adequate, and 5 is very well, how well do staff at ____________ keep you informed about your child's day-to-day physical and emotional well-being?

Circle: 1 2 3 4 5

4b. On a scale of 1 to 5, where 1 is not well, 3 is adequate, and 5 is very well, how well do they keep you informed about your child's daily activities, that is, how each day is planned, what your child enjoys doing and how s/he plays with other children?

Circle: 1 2 3 4 5

4c. On a scale of 1 to 5, where 1 is not well, 3 is adequate, and 5 is very well, how well do they keep you informed about learning goals for children, teaching approaches and how behavior is managed in class.

Circle: 1 2 3 4 5

4d. How is this information given to you?
List strategies:

If the respondent is having difficulty listing strategies, ask the following prompt. Remember to list only the strategies not already mentioned by the respondent.

Is there any other way that they give you this information? Examples might include informal discussions with teachers, newsletters, parent-teacher conferences, parent handbooks, and orientation meetings when your child first started the program, videos, pamphlets or parenting meetings.
List strategies:

4e. What additional information would you like about your child's learning goals, teaching approaches or how behavior is managed in class?

4f. What would be the best way for you to get this information?

5a. What opportunities does the center offer you to take part in your child's program? For example, helping with classroom activities or trips, donating materials or skills and/or reading or singing to children?
List strategies:

5b. Do you feel like a welcome visitor at your child's program at all times?

5c. Are there other ways that you would like to be involved?

6. On a scale of 1 to 5, where 1 is not well, 3 is adequate, and 5 is well, how well do staff at __________ listen and respond when you have a concern or a suggestion about your child or the program?

Circle: 1 2 3 4 5

After the respondent has answered with a rating, ask the following question:

Can you give me an example please?

7a. In planning to meet children's needs and making decisions about how programs operate, some programs seek parent's advice through evaluation surveys, advisory committees, parent meetings or parent-teacher conferences? How does staff at __________ seek your ideas or help?

List strategies:

7b. If you have given the program ideas or suggestions, do they use them?

7c. Would you like more say in how your child is taught and cared for at __________?

Circle: YES NO

If the respondent answers yes, ask the following question.

How would you like to say more say?

8a. Many families want support at one time or another to help them to do their best for their child. Some programs connect families with community resources by posting a community bulletin board of activities for children, or connect families to financial or health services or connect families with local public schools, for example. On a scale of 1 to 5, where 1 is not well, 3 is adequate, and 5 is very well, how does __________ help you to learn about resources and services available to your family in the community?

Circle: 1 2 3 4 5

How does the program make information on community resources available or assist parents in obtaining services?.
List strategies:

8c. Is there any other way that can help to link you with community resources?

Is there anything that you would like to add to describe your relationship with staff at__________________?

Those are all of the questions that I have for you. Thank you very much for your time and your willingness to answer these questions honestly.

Would you be willing to fill out a brief written parent questionnaire? If you chose to fill out the written questionnaire, you will be eligible for a $100.00 grocery certificate and your child's program will receive $100.00 to purchase educational materials. Are you willing to fill out a written survey?

Circle YES NO

If the respondent answers yes, ask them for their address and fill it in on the *Parent Coding Form.*

You will be receiving the written questionnaire and your raffle ticket within the next week. Again, thank you for your time.

Staff:Child Ratio Count

SITE: CLASSROOM:

| Date: 11/11/00 | Breakfast-Time: 8:15 | | Lunch-Time: 11:30 | | P.M. Snack-Time: 3:20 | | 5:00 p.m. | |
|---|---|---|---|---|---|---|---|---|
| *Number of Children | # by age<br>6 3's | # by age<br>4 4's | # by age<br>10 3's | # by age<br>7 4's | # by age<br>10 3's | # by age<br>7 4's | # by age<br>4 3's | # by age<br>5 4's |
| Staffing Pattern:<br>List staff (first name)<br>And shift worked: | Mary 7:00 a.m. – 4:00 p.m.<br>Joan 8:00 a.m. – 5:00 p.m.<br>Matilde 9:00 a.m. – 6:00 p.m. | | | | | | | |

*if mixed age group (one group comprising at least 20%) indicate count by age group

| Date: | Breakfast-Time: | | Lunch-Time: | | P.M. Snack-Time: | | 5:00 p.m. | |
|---|---|---|---|---|---|---|---|---|
| *Number of Children | # by age | # by age | # by age | # by age | # by age | # by age | # by age | # by age |
| Staffing Pattern:<br>List staff (first name)<br>And shift worked: | | | | | | | | |
| Date: | Breakfast-Time: | | Lunch-Time: | | P.M. Snack-Time: | | 5:00 p.m. | |
| *Number of Children | # by age | # by age | # by age | # by age | # by age | # by age | # by age | # by age |
| Staffing Pattern:<br>List staff (first name)<br>And shift worked: | | | | | | | | |
| Date: | Breakfast-Time: | | Lunch-Time: | | P.M. Snack-Time: | | 5:00 p.m. | |
| *Number of Children | # by age | # by age | # by age | # by age | # by age | # by age | # by age | # by age |
| Staffing Pattern:<br>List staff (first name)<br>And shift worked: | | | | | | | | |
| Date: | Breakfast-Time: | | Lunch-Time: | | P.M. Snack-Time: | | 5:00 p.m. | |
| *Number of Children | # by age | # by age | # by age | # by age | # by age | # by age | # by age | # by age |
| Staffing Pattern:<br>List staff (first name)<br>And shift worked: | | | | | | | | |
| Date: | Breakfast-Time: | | Lunch-Time: | | P.M. Snack-Time: | | 5:00 p.m. | |
| *Number of Children | # by age | # by age | # by age | # by age | # by age | # by age | # by age | # by age |
| Staffing Pattern: List staff (first name) and shift worked: | | | | | | | | |

ATTACHMENTS - Section C
*Rating Criteria*

EDUCARE 4 STAR

Quality Indicator:

| Classroom Environment | Accreditation | Parent Involvement | Staff Credentials | Staff:Child Ratios |
|---|---|---|---|---|
| Minimum score on ECERS/ITERS/ FDCRS required for all classrooms<br><br>Rating for indicator ranges from 2 – 8 pts. | Required at Star 4 2 pts. Given when achieved & as maintained | 14 Required criteria for basic communication & responsiveness to parent perspective w/increasing expectations for level and types of involvement<br><br>Rating for indicator ranges from 2 – 8 pts. | Requirements tied to Prof. Credential w/specific expectations for education & experience by position Individual staff ratings averaged by position & weighted<br><br>Rating for indicator ranges from 2 – 8 pts. | For centers, ratios increase from licensing up to accreditation recs.<br><br>Rating for indicator ranges from 2 – 8 pts.<br><br>*For family* homes, licensing ratios required at all levels. No points assigned |

Star Ratings for Classroom Environment (Required Minimum score for all classrooms):

Star 1 = min. 3.00 Star 3 = min. 4.26
Star 2 = min. 3.51 Star 4 = min. 5.00

Star Ratings for Staff:Child Ratios (Centers only):

| AGE GROUP | STAR 1 | STAR 2 | STAR 3 | STAR 4 |
|---|---|---|---|---|
| 0 – 18 mos. | 1:5 | 1:4 60% of day | 1:4 all day | 1:3 |
| 18 – 24 mos. | 1:5 | 1:4 60% of day | 1:4 all day | 1:3 |
| 24 – 36 mos. | 1:7 | 1:6 60% of day | 1:6 all day | 1:5 |
| 30 – 36 mos. | 1:8 | 1:7 60% of day | 1:7 all day | 1:6 |
| 36 – 48 mos. | 1:10 | 1:9 60% of day | 1:9 all day | 1:8 |
| 48 – 60 mos. | 1:12 | 1:10 60% of day | 1:10 all day | 1:8 |

In other age combinations, the staff ratio for the youngest child must be utilized if more than 20% of the group is composed of younger children.

Ratios: Family Homes

More data is needed on the impact of ratios on quality in family homes and how ratios affect the cost of quality before a reasonable schema can be designed for including ratios as a quality indicator for family homes. At this time, ratios will not be used as a quality indicator for family homes, except that family home providers will be expected to maintain ratios required by licensing.

Centers: required total scores for overall site Star Ratings:

Star 1 = min. 8 pts. Star 3 = min. 24 pts.
Star 2 = min. 16 pts. Star 4 = min. 32 pts.

Family Homes: required total scores for overall site Star Ratings:

Star 1 = min. 6 pts. Star 3 = min. 18 pts.
Star 2 = min. 12 pts. Star 4 = min. 24 pts.

SAMPLE SITE RATING CALCULATION (Center):

| Classroom Environment | Accreditation | Parent Involvement | Star Credentials | Staff:Child Ratios | OVERALL |
|---|---|---|---|---|---|
| Min. score 4.72 Star 3 6 pts. | In process 0 pts. | Star 2 4 pts. | Total 3 pts. | All classrooms meet ratios required for Star 3 6 pts. | 19 pts. = Star 2 |

SAMPLE SITE RATING CALCULATION (Family Home):

| Classroom Environment | Accreditation | Parent Involvement | Star Credentials | Staff:Child Ratios | OVERALL |
|---|---|---|---|---|---|
| Min. score 5.10 Star 4 8 pts. | Accredited 2 pts. | Star 3 6 pts. | Star 3 6 pts. | Licensing requirements met No points | 22 pts. = Star 3 |

EDUCARE STAFF QUALIFICATIONS CRITERIA FOR 4-STAR RATING SYSTEM

DIRECTORS

| Star 1 | Star 2 | Star 3 | Star 4 |
|---|---|---|---|
| • Letter from Dept. of Human Services verifying that individual is Director Qualified (no degree)<br>OR<br>• Level II Professional Credential | • Meets licensing requirements for Director Qualifications with a minimum of an Associates Degree + 2000 hours paid admin experience<br>OR<br>• Level III Credential +2000 hours paid admin. experience | • Meets licensing requirements for Director Qualifications with a minimum of an Associates Degree + 4000 hours paid admin experience<br>• + enrollment in 45 contact hours approved training in administrative topics such as supervision, fiscal management, leadership development and program planning<br>OR<br>• Level III Professional Credential + 4000 hours paid admin experience<br>• + enrollment in 45 contact hours approved training in administrative topics such as supervision, fiscal management, leadership development and program planning | • Meets licensing requirements for Director Qualifications with a minimum of a BA/BS degree including at least 24 credits in early childhood + 8000 hours combined paid classroom and administrative experience<br>OR<br>• Level IV Credential + 4000 hrs. combined paid classroom and administrative experience<br>• + ongoing enrollment in 45 contact hours in approved training in administrative topics such as supervision, fiscal management, leadership development and program planning<br>OR<br>• Masters degree in ECE or related field with at least 24 semester credits in early childhood, 3 of which must be in administration (OR enrollment in 45 contact hrs. approved training in admin. + 4000 hours paid classroom experience + 2000 hours paid admin. Experience<br>OR<br>• Level V Credential incl. 2000 paid admin experience |

TEACHERS

| Star 1 | Star 2 | Star 3 | Star 4 |
|---|---|---|---|
| • Meets licensing requirements for Group Leader Qualifications with at least a Professional Level I Credential or equivalent (NOTE: for Educare purposes, additional experience or credentials other than a CDA may not be substituted for the education requirement) + 2000 hours paid classroom experience<br>OR<br>• BA/BS degree in elementary ed. Or sp. Ed with no early childhood coursework + 2000 hrs. paid classroom experience | • Meets licensing requirements for Group Leader Qualifications with a minimum of 15 credits covering the course content included in these CO Community College courses:<br>• ECP 101/111<br>• ECP 102/112<br>• ECP 148 Guidance Strategies<br>• ECP 227 Methods<br>• ECP 238 Child Dev.<br>+ 2000 hours paid classroom experience<br>OR<br>◆ Meets Group Leader Qualifications with a Group Leader Certificate from a CO Community College + 2000 hours paid classroom experience<br>OR<br>◆ BA degree in Early Childhood and, no required paid classroom experience<br>OR<br>◆ A combination of for-credit coursework listed above and non-credit pre-approved training hours totaling 225 hours + 2000 hours paid classroom experience | ◆ Letter from Dept. of Human Services verifying that individual is Director Qualified, no degree required<br>◆ Meets licensing requirements for Group Leader Qualifications with a Professional Level II Credential or equivalent + 2000 hours paid classroom experience<br>OR<br>◆ Professional Level III Credential or equivalent | • Meets licensing requirements for Group Leader Qualifications with a professional Level IV Credential<br>OR<br>• Professional Level III Credential or equivalent + 4000 hours paid classroom experience |

ASSISTANT TEACHERS

| Star 1 | Star 2 | Star 3 | Star 4 |
| --- | --- | --- | --- |
| • H.S. diploma or equivalent<br>• + 15 contact hours or 1 semester credit in EC related content (including creating a learning environment, health & safety, guidance, nutrition, communication with families, and activities for children. First Aid & CPR not included) | ◆ Professional Level I Credential or equivalent (NOTE: for Educare purposes, additional experience or credentials other than a CDA or voc. Ed. Cert. may not be substituted for the education requirement) | ◆ Professional Level I Credential or equivalent (See NOTE under Star 2) + additional 2000 hours paid classroom experience | • Professional Level I Credential or equivalent (see NOTE under Star 2) + additional 4000 hours paid classroom experience |

FAMILY CHILD CARE PROVIDERS

| Star 1 | Star 2 | Star 3 | Star 4 |
| --- | --- | --- | --- |
| • Meets licensing requirements with H.S. diploma or equivalent + 12 – 15 hr. basic provider training (including creating a learning environment, health & safety, guidance, nutrition, communication with families, and activities for children) + ECP 101/111 or equivalent (45 hrs. approved non-credit training, portfolio for credit through a CO Community College, or challenge test)<br>• +2000 hours paid childcare experience | ◆ Meets licensing requirements + Level I Credential or equivalent (NOTE: for Educare purposes, additional experience or credentials other than a CDA or voc. Ed. Cert. may not be substituted for the education requirement)<br>+ 2000 hrs. paid childcare experience | ◆ Meet licensing requirements + 15 credits covering the course content included in these CO Community College courses:<br>◆ ECP 101/111<br>◆ ECP 102/112<br>◆ ECP 148 Guidance Strategies<br>◆ ECP 227 Methods<br>◆ ECP 238 Child Dev.<br>OR<br>◆ A combination of for-credit coursework listed above and approved non-credit training hrs.<br>◆ +4000 hrs. paid childcare experience | • Meets licensing requirements + Level II Credential or equivalent incl. 3 credits in administration<br>• + 4000 hrs. paid childcare experience<br>OR<br>• Professional Level III Credential or equivalent |

To calculate a site Star Rating for Staff Credentials:

1. Assign points to each teacher based on her/his individual star rating, add all teacher points and average them across classrooms. This point value will equal 50% of the total point value for staff qualifications for the site. (Multiply pts. by .5 and add to (2) and (3).)

2. Assign points to each assistant teacher based on her/his individual star rating, add all assistant teacher points and average them across classrooms. This point value will equal 20% of the total point value for staff qualifications for the site. (Multiply pts. by .2, add to (1) & (3)

3. Assign points to the director(s) based on her/his individual star rating. This point value will equal 30% of the total point value for staff qualifications for the site. (Multiply pts. by .3, add to (1) & (2)

EDUCARE PARENT INVOLVEMENT CRITERIA

| CRITERION | STAR 1 | STAR 2 | STAR 3 | STAR 4 |
|---|---|---|---|---|
| 1. Program document providing written information on program philosophy, policies & procedures. | REQUIRED | REQUIRED | REQUIRED | REQUIRED |
| 2. Program documents orientation to the program for both parent and child prior to or immediately following enrollment. | REQUIRED | REQUIRED | REQUIRED | REQUIRED |
| 3. Program reports timely notification of major changes in program or policies (e.g. change in teacher, change in fees, change in schedule) + no more than 25% of parents report lack of timely notification. | REQUIRED | REQUIRED | REQUIRED | REQUIRED |
| 4. 75% of parents report that program welcomes visits by parents at all times (Q5b). | REQUIRED | REQUIRED | REQUIRED | REQUIRED |
| 5. 75% of parents report at least adequate information from program on child's day-to-day physical and emotional well-being. | *Minimum score of 3 on Q4a** | *Minimum score of 3 on Q4a** | *Minimum score of 4 on Q4a** | *Minimum score of 4 on Q4a** |
| 6. 75% of parents report at least adequate response by program to parent concerns & suggestions. *Eliminate responses of DON'T KNOW or NOT APPLICABLE from sample.* | Minimum score of 3 on Q6* | Minimum score of 3 on Q6* | Minimum score of 4 on Q6* | Minimum score of 4 on Q6* |
| 7. 75% of parents report at least adequate information from program on child's daily activities, i.e., how each day is planned, what child enjoys how s/he plays with other children, etc. | NA | Minimum score of 3 on Q4b* | Minimum score of 4 on Q4b* | Minimum score of 4 on Q4b* |
| 8. 75% of parents report being at least somewhat comfortable asking teacher for information on child development or parenting techniques. | NA | Minimum score of 3 on Q3* | Minimum score of 3 on Q3* | Minimum score of 4 on Q3* |
| 9. Program documents conducting planned individual parent conferences at least annually to discuss child's progress & plans to meet learning goals. | NA | REQUIRED | REQUIRED | REQUIRED |
| 10. 75% of parents report receiving at least adequate information from program on learning goals for children, teaching approaches, how behavior is managed in class, etc. | NA | NA | Minimum score of 3 on Q4c* | Minimum score of 4 on Q4c* |
| 11. 50% of parents who have offered ideas/suggestions to the program report that suggestions are implemented (Q7b). | NA | NA | REQUIRED | REQUIRED |

| | | | | |
|---|---|---|---|---|
| 12. 75% of parents report receiving at least adequate information from the program about community services. *DON'T KNOW responses should be counted as less than a 3.* | NA | NA | Minimum score of 3 on Q8a* | Minimum score of 4 on Q8a* |
| 13. Program documents regularly including parents in program evaluation. | NA | NA | NA | REQUIRED |
| 14. Program staff & parents report planned, successful activities in these types of parent involvement: • Parenting • Communication • Participating/volunteering • Learning at home • Leadership/decision-making • Community involvement | No additional requirements | In addition to required activities, staff AND at least 40% of parents as an aggregate identify activities in at least 2/6 types of parent involvement. | In addition to required activities, staff AND at least 60% of parents as an aggregate identify activities in at least 4/6 types of parent involvement. Program has a written, cohesive plan for parent involvement. | In addition to required activities, staff AND at least 75% of parents as an aggregate identify activities in at least 5/6 types of parent involvement. Parent involvement is an integral part of an annual program plan and evaluation. |

PARENT INVOLVEMENT CRITERIA

Questions to document successful activities in each type of parent involvement:

PARENTING: Q1, list all activities identified

COMMUNICATING: Q 4d, list all activities identified. Activities must be different from activities in required items.

PARTICIPATING/VOLUNTEERING: Q5a, list all activities identified. Overall, at least 3 different opportunities must be identified by parents & staff for this category to be credited.

LEARNING AT HOME: Q2, list all activities identified.

LEADERSHIP/DECISION-MAKING: Q7a, list all activities identified.

COMMUNITY INVOLVEMENT: Q8b, list all activities identified.

Note: Many activities may cover more than one type of parent involvement and can be credited as such. For example, a parent meeting may be used to communicate program information and get input from parents for program decision-making. A Parent Advisory Committee can be counted as both an opportunity to participate as well as a leadership/decision-making activity.

*Questions are based on a scale of 1 to 5, where is 1 is low, 3 is adequate, and 5 is high.

** In all criteria requiring 75% of parent responses, this figure refers to the population of parents interviewed (30% for centers, 100% for homes), not the total enrollment of the program.

ATTACHMENTS - Section D
*Technical Assistance Forms*

Early Childhood Environmental Rating Scale Item Analysis

___6 mo. ____ Annual

SITE: ____________ EVAL DATE: ____________

| ECERS-R Items | ITEM SCORE by CLASSROOM | | | | | | | | |
|---|---|---|---|---|---|---|---|---|---|
| CLASSROOM | | | | | | | | AVG. ALL ROOMS | |
| OBSERVER | | | | | | | | | |
| OBS.DATE | | | | | | | | | |
| A. Space & Furnishings | | | | | | | | | |
| 1. Indoor Space | | | | | | | | | |
| 2. Furn for Routine Care,Play & Learning | | | | | | | | | |
| 3. Furniture for Relaxation | | | | | | | | | |
| 4. Room Arrangement for Play | | | | | | | | | |
| 5. Space for Privacy | | | | | | | | | |
| 6. Child Related Display | | | | | | | | | |
| 7. Space for Gross Motor | | | | | | | | | |
| 8. Gross Motor Equipment | | | | | | | | | |
| SUB-SCALE SCORE | | | | | | | | | SITE AVG |
| B. Personal Care Routines | | | | | | | | | |
| 9. Greeting/Departing | | | | | | | | | |
| 10. Meals/Snacks | | | | | | | | | |
| 11. Nap/Rest | | | | | | | | | |
| 12. Toileting/Diapering | | | | | | | | | |
| 13. Health Practices | | | | | | | | | |
| 14. Safety Practices | | | | | | | | | |
| SUB-SCALE SCORE | | | | | | | | | SITE AVG |

Recorded by: ____________ Date: ____________

Early Childhood Environmental Rating Scale Item Analysis

___6 mo. _____ Annual

SITE: ____________________ EVAL DATE: __________

| ECERS-R Items | | ITEM SCORE by CLASSROOM | | | | | | | |
|---|---|---|---|---|---|---|---|---|---|
| | CLASSROOM | | | | | | | | AVG. ALL ROOMS |
| | OBSERVER | | | | | | | | |
| | OBS.DATE | | | | | | | | |
| C. Language-Reasoning | | | | | | | | | |
| 15. Books & Pictures | | | | | | | | | |
| 16. Encouraging Children to Communicate | | | | | | | | | |
| 17. Using Language to Develop Reasoning | | | | | | | | | |
| 18. Informal Use of Language | | | | | | | | | |
| | SUB-SCALE SCORE | | | | | | | | SITE AVG |
| D. Activities | | | | | | | | | |
| 19. Fine Motor | | | | | | | | | |
| 20. Art | | | | | | | | | |
| 21. Music/Movement | | | | | | | | | |
| 22. Blocks | | | | | | | | | |
| 23. Sand/Water | | | | | | | | | |
| 24. Dramatic Play | | | | | | | | | |
| 25. Nature/Science | | | | | | | | | |
| 26. Math/Number | | | | | | | | | |
| 27. Use of TV, video, and/or Computers | | | | | | | | | |
| 28. Promoting Acceptance of Diversity | | | | | | | | | |
| | SUB-SCALE SCORE | | | | | | | | SITE AVG |

Early Childhood Environmental Rating Scale Item Analysis

____6 mo. ____ Annual

SITE: ________________ EVAL DATE: __________

| ECERS-R Items | ITEM SCORE by CLASSROOM | | | | | | | AVG. ALL ROOMS | |
|---|---|---|---|---|---|---|---|---|---|
| CLASSROOM | | | | | | | | | |
| OBSERVER | | | | | | | | | |
| OBS.DATE | | | | | | | | | |
| E. Interaction | | | | | | | | | |
| 29. Supervision of Gross Motor Activities | | | | | | | | | |
| 30. General Supervision of Children | | | | | | | | | |
| 31. Discipline | | | | | | | | | |
| 32. Staff-Child Interactions | | | | | | | | | |
| 33. Interactions Among Children | | | | | | | | | |
| SUB-SCALE SCORE | | | | | | | | | SITE AVG |
| F. Program Structure | | | | | | | | | |
| 34. Schedule | | | | | | | | | |
| 35. Free Play | | | | | | | | | |
| 36. Group Time | | | | | | | | | |
| 37. Provisions for Children w/Disabilities | | | | | | | | | |
| SUB-SCALE SCORE | | | | | | | | | SITE AVG |
| G. Parents & Staff | | | | | | | | | |
| 38. Provisions for Parents | | | | | | | | | |
| 39. Provisions for Personal Needs of Staff | | | | | | | | | |
| 40. Provisions for Professional Needs of Staff | | | | | | | | | |
| 41. Staff Interaction and Cooperation | | | | | | | | | |
| 42. Supervision and Evaluation of Staff | | | | | | | | | |
| 43. Opportunities for Professional Growth | | | | | | | | | |
| SUB-SCALE SCORE | | | | | | | | | SITE AVG |

Infant Toddler Environmental Rating Scale Item Analysis

__6__ mo. _____ Annual

SITE: ______________________ EVAL DATE: ______________

| ITERS Items | | ITEM SCORE by CLASSROOM | | | | | | | |
|---|---|---|---|---|---|---|---|---|---|
| | CLASSROOM | | | | | | | | AVG. ALL ROOMS |
| | OBSERVER | | | | | | | | |
| | OBS.DATE | | | | | | | | |
| A. Furnishings & Display for Children | | | | | | | | | |
| 1. Furnishings for Routine Care | | | | | | | | | |
| 2. Use of Furnishings for Learning Activities | | | | | | | | | |
| 3. Furniture for Relaxation & Comfort | | | | | | | | | |
| 4. Room Arrangement for Play | | | | | | | | | |
| 5. Display for Children | | | | | | | | | |
| SUB-SCALE SCORE | | | | | | | | | SITE AVG |
| B. Personal Care Routines | | | | | | | | | |
| 6. Greeting/Departing | | | | | | | | | |
| 7. Meals/Snacks | | | | | | | | | |
| 8. Nap | | | | | | | | | |
| 9. Diapering/Toileting | | | | | | | | | |
| 10. Personal Grooming | | | | | | | | | |
| 11. Health Practices | | | | | | | | | |
| 12. Health Policy | | | | | | | | | |
| 13. Safety Practice | | | | | | | | | |
| 14. Safety Policy | | | | | | | | | |
| SUB-SCALE SCORE | | | | | | | | | SITE AVG |

Recorded by: ______________________ Date: ______________

Family Day Care Rating Scale Item Analysis

____ 6 mo. ____ Annual

SITE: ______________________ EVAL. DATE: __________

OBSERVER: ______________________ OBS DATE: __________

| FDCRS Items | ITEM SCORE |
|---|---|
| **A. Space & Furnishings** | |
| 1. Furnishings for Routine Care & Learning | |
| 2. Furnishings for Relaxation & Comfort | |
| 3. Child-related Display | |
| 4. Indoor Space Arrangement | |
| 5. Active Physical Play | |
| 6a. Space to Be Alone (I/T) | |
| 6b. Space to be Along (2 yrs. +) | |
| SUB-SCALE SCORE | |
| **B. Basic Care** | |
| 7. Arriving/Leaving | |
| 8. Meals/Snacks | |
| 9. Nap/Rest | |
| 10. Diapering/Toileting | |
| 11. Personal Grooming | |
| 12. Health | |
| 13. Safety | |
| SUB-SCALE SCORE | |
| **C. Language and Reasoning** | |
| 14a. Informal Use of Language (I/T) | |
| 14b. Informal Use of Language (2 yrs. +) | |
| 15a. Helping Children Understand Language (I/T) | |
| 15b. Helping Children Understand Language (2 yrs. +) | |
| 16. Helping Children Use Language | |
| 17. Helping Children Reason | |
| SUB-SCALE SCORE | |

Recorded by: ______________________ Date: __________

Family Day Care Rating Scale Item Analysis

____ 6 mo. ____ Annual

SITE: ____________________ EVAL. DATE: __________

OBSERVER: ____________________ OBS DATE: __________

| FDCRS Items | ITEM SCORE |
|---|---|
| **D. Learning Activities** | |
| 18. Eye-Hand Coordination | |
| 19. Art | |
| 20. Music and Movement | |
| 21. Sand and Water Play | |
| 22. Dramatic Play | |
| 23. Blocks | |
| 24. Use of TV | |
| 25. Schedule of Daily Activities | |
| 26. Supervision of Play Indoors & Outdoors | |
| SUB-SCALE SCORE | |
| **E. Social Development** | |
| 27. Tone | |
| 28. Discipline | |
| 29. Cultural Awareness | |
| SUB-SCALE SCORE | |
| **F. Adult Needs** | |
| 30. Relationship with Parents | |
| 31. Balancing Personal & Caregiving Responsibilities | |
| 32. Opportunities for Professional Growth | |
| SUB-SCALE SCORE | |

Family Day Care Rating Scale Item Analysis

____ 6 mo. ____ Annual

SITE: ________________________ EVAL. DATE: __________

OBSERVER: ______________________ OBS DATE: __________

| FDCRS Items | ITEM SCORE |
|---|---|
| **G. Provisions for Exceptional Children** | |
| 33. Adaptations for Basic Care | |
| 34. Adaptations for Activities | |
| 35. Adaptations for Other Special Needs | |
| 36. Communication | |
| 37. Language/Reasoning (exceptional) | |
| 38. Learning & Play Activities (exceptional) | |
| 39. Social Development (exceptional) | |
| 40. Caregiver Preparation | |
| SUB-SCALE SCORE | |

SITE PROFILE SUMMARY

DATE:

SITE NAME:

SITE COACH:

SITE DEMOGRAPHICS:

SOURCE/DATE OF ASSESSMENT DATA:

SELF-ASSESSMENT ______________ PARENT INVOLVEMENT SURVEYS

ECERS/ITERS/FDCRS ______________ CO. QUALITY STANDARDS ______________

NAEYC/NAFCC ACCRED. __________ STAFF TRAINING & ED. SUMMARY __________

PARENT QUESTIONNAIRES

General Comments:

1. Interactions among Staff and Children:

2. Curriculum:

3. Family/Staff Partnerships:

4. Staffing Patterns and Qualifications:

5. Administration:

6. Health and Safety:

7. Physical Environment:

8. Nutrition:

9. Evaluation:

10. Community Involvement:

11. Organizational Climate:

ECERS/ITERS/FDCRS SCORE:
STAR RATING:

RECOMMENDED SITE QUALITY IMPROVEMENT GOALS:

EDUCARE SITE SELF ASSESSMENT/OBSERVATION REFERENCE: ECERS

SITE NAME: ______________________________ DATE:__________

I. INTERACTIONS AMONG STAFF AND CHILDREN

GOAL: Interactions between children and staff provide opportunities for children to develop an understanding of self and others and are
characterized by warmth, personal respect, positive support, and responsiveness.

HOW WELL DO YOUR PROGRAM'S STAFF-CHILD INTERACTIONS SUPPORT OR REFLECT THE FOLLOWING?

| | ECERS REF. |
|---|---|
| 1. Positive, non punitive discipline and guidance | **Interact.** 30, 31 |
| 2. Developmentally appropriate expectations | **Interact.** 31, 31; **Lang. & Reas.** 16 |
| 3. Language development | **Lang. & Reas.** 16, 17, 18 |
| 4. Focus on social skills | **Interact.** 29,33 |
| 5. Warmth and affection | **Interact.** 32 |

II. CURRICULUM

GOAL: The program's planned activities and daily schedule encourage children to be actively involved in the learning process, and to pursue their own interests. Activities and materials are varied and support children's role as members of diverse communities.

HOW WELL DOES YOUR PROGRAM'S CURRICULUM INCORPORATE THE FOLLOWING?

| | ECERS REF. **All Program Structure Items** |
|---|---|
| 1. Developmentally appropriate materials and equipment | **Lang. & Reas.** 15, 16, **Activ.** 19 |
| 2. Planning for each child's growth and development | |
| 3. Balance and range of activities (physical, social, emotional, cognitive) | **Activ.** all items, **Lang. & Reas.** 17 |
| 4. Appreciation for diversity | **Activ.** 24, 28 |

| | |
|---|---|
| 5. Management of transitions within and between settings | Prog. Struct. 34 |

III. ADMINISTRATION

GOAL: The program is efficiently and effectively administered with attention to the needs and desires of children, parents, and staff

HOW WELL DEVELOPED ARE THE FOLLOWING COMPONENTS OF YOUR PROGRAM?

| | ECERS REF. |
|---|---|
| 1. Operating policies and procedures that address: • record keeping and confidentiality • fiscal policies and procedures • insurance and liability policies • emergency policies and procedures | |
| 2. Parent/administrative relationships: commitment to insuring communication with all families and inclusion of parents in program planning | |
| 3. Community/program relationships and resources | Par. & Staff 38 (7.2) |
| 4. Policies and procedures for transitions between settings | |

IV. HEALTH AND SAFETY

GOAL: The health and safety of children and adults are protected and enhanced. The program acts to prevent illness and accidents, is prepared to deal with emergencies, and educates children concerning health and safety practices.

HOW WELL DO YOUR PROGRAM'S HEALTH AND SAFETY PRACTICES INCORPORATE THE FOLLOWING?

| | ECERS REF. **All Personal Care Items** |
|---|---|
| 1. Staff pre-employment physicals and evaluation for communicable diseases for example: TB, Rubella, Chicken Pox | |
| 2. Current health and immunization records for children | Pers. Care 13 |
| 3. Arrival and departure policies | Pers. Care 9 |
| 4. Vehicle safety (if applicable) | |
| 5. A safe place to keep personal belongings | |

| | |
|---|---|
| 6. Contracted/employed maintenance staff to perform daily facility maintenance | |
| 7. Supervision of children (including accident reports) | **Interact. 29, 30** |
| 8. Reporting policies and procedures for child abuse and neglect | |
| 9. Staff certification in Pediatric CPR and First Aid | |
| 10. Policies and procedures for maintaining sanitary conditions, including food handling | **Pers. Care 10, 12** |
| 11. Policies and procedures to keep children safe from hazards for example: cleaning supplies, medication stored in locked cupboards | **Pers. Care 14** |

V. PHYSICAL ENVIRONMENT

GOAL: The amount, arrangement, and use of space both indoors and outdoors fosters optimal growth and development through opportunities for exploring and learning. The physical space and materials provided support positive interactions between adults and children.

HOW WELL DOES YOUR PROGRAM'S PHYSICAL ENVIRONMENT SUPPORT THE FOLLOWING?

| | ECERS REF. |
|---|---|
| 1. Compliance with Americans with Disabilities Act for children and adults | |
| 2. Outdoor space:<br>• Appropriate natural environment (sun, shade, vegetation)<br>• Variety of play surfaces for example: sand, grass, cement<br>• Variety of age-appropriate equipment<br>• Conducive to a variety of activities throughout the year<br>• Safe and protected from dangers | **Space & Furn. 7, 8** |
| 3. Indoor space:<br>• Space for individual, small and large group activities<br>• Sand, water, woodworking available<br>• Defined interest areas with clear pathways | **Space & Furn. 1, 2, 4, 5, 6, 7(5.1)**<br><br>**Space & Furn. 2(7.2)** |
| 4. Physical comfort (heating, ventilation, soft elements, light) | **Space & Furn. 1, 3** |
| 5. Space and furnishings for staff to take breaks, do planning, hold meetings, etc. | |

VI. NUTRITION

GOAL: The nutritional needs of children are met in a manner that not only promotes their physical development but also encourages good eating habits. Meal times are used as opportunities for social, emotional and cognitive development.

HOW WELL DOES YOUR PROGRAM INCORPORATE THE FOLLOWING?

| | ECERS REF. |
|---|---|
| 1. United States Department of Agriculture nutrition guidelines | |
| 2. Menus and feeding schedules are available to parents | |
| 3. Mealtimes are planned, pleasant learning experiences | **Pers. Care** 10 |

VII. EVALUATION

GOAL: Systematic assessment of the program's effectiveness in meeting its goals for children, parents, and staff insures that quality care and education are provided.

HOW WELL DOES YOUR PROGRAM INCORPORATE THE FOLLOWING?

| | ECERS REF. |
|---|---|
| 1. Regular evaluation of all program components | |
| 2. Inclusion of parents, staff and community members (where appropriate) in program evaluation | **Parents & Staff** 38(7.1) |
| 3. Regular, formal assessment of children's progress | |

VIII. COMMUNITY INVOLVEMENT

HOW DOES YOUR PROGRAM ENCOURAGE COMMUNITY PARTICIPATION AND UTILIZE COMMUNITY RESOURCES?

Infant Toddler Environmental Rating Scale Item Analysis
_____ 6 mo. _____ Annual

SITE: ______________________ EVAL DATE: ____________

| | ITEM SCORE by CLASSROOM | | | | | | | | |
|---|---|---|---|---|---|---|---|---|---|
| ITERS Items CLASSROOM | | | | | | | | AVG. ALL ROOMS | |
| OBSERVER | | | | | | | | | |
| OBS.DATE | | | | | | | | | |
| **C. Listening and Talking** | | | | | | | | | |
| 15. Informal Use of Language | | | | | | | | | |
| 16. Books and Pictures | | | | | | | | | |
| SUB-SCALE SCORE | | | | | | | | | SITE AVG |
| **D. Learning Activities** | | | | | | | | | |
| 17. Eye-hand Coordination | | | | | | | | | |
| 18. Active Physical Play | | | | | | | | | |
| 19. Art | | | | | | | | | |
| 20. Music and Movement | | | | | | | | | |
| 21. Blocks | | | | | | | | | |
| 22. Pretend Play | | | | | | | | | |
| 23. Sand/Water Play | | | | | | | | | |
| 24. Cultural Awareness | | | | | | | | | |
| SUB-SCALE SCORE | | | | | | | | | SITE AVG |
| **E. Interaction** | | | | | | | | | |
| 25. Peer Interaction | | | | | | | | | |
| 26. Caregiver-Child Interaction | | | | | | | | | |
| 27. Discipline | | | | | | | | | |
| SUB-SCALE SCORE | | | | | | | | | SITE AVG |

Infant Toddler Environmental Rating Scale Item Analysis

____ 6 mo. ____ Annual

SITE: ____________________ EVAL DATE: __________

| ITERS Items | | ITEM SCORE by CLASSROOM | | | | | | | | |
|---|---|---|---|---|---|---|---|---|---|---|
| | CLASSROOM | | | | | | | | AVG. ALL ROOMS | |
| | OBSERVER | | | | | | | | | |
| | OBS.DATE | | | | | | | | | |
| F. Program Structure | | | | | | | | | | |
| 28. Schedule of Daily Activities | | | | | | | | | | |
| 29. Supervision of Daily Activities | | | | | | | | | | |
| 30. Staff Cooperation | | | | | | | | | | |
| 31. Provisions for Exceptional Children | | | | | | | | | | |
| SUB-SCALE SCORE | | | | | | | | | | SITE AVG |
| G. Adult Needs | | | | | | | | | | |
| 32. Adult Personal Needs | | | | | | | | | | |
| 33. Opportunities for Professional Growth | | | | | | | | | | |
| 34. Adult Meeting Area | | | | | | | | | | |
| 35. Provisions for Parents | | | | | | | | | | |
| SUB-SCALE SCORE | | | | | | | | | | SITE AVG |

EDUCARE SITE SELF ASSESSMENT/OBSERVATION REFERENCE: FDCRS

SITE NAME: ______________________ DATE:______________

I. INTERACTIONS AMONG PROVIDER AND CHILDREN

GOAL: Interactions between children and provider offer opportunities for children to develop an understanding of self and others and are characterized by warmth, personal respect, positive support, and responsiveness.

HOW WELL DO YOUR INTERACTIONS WITH CHILDREN SUPPORT OR REFLECT THE FOLLOWING?

| | FDCRS REFERENCE |
|---|---|
| 1. Positive, non punitive discipline and guidance | **Social Development** 27, 28 **Exceptional Children** 35 |
| 2. Developmentally appropriate expectations | **Social Development** 28 **Exceptional Children** 33, 35 |
| 3. Language development | **Lang. & Reason.** 14a. & b., 15 a. & b., 16, 17 **Excep. Children** 36, 37 |
| 4. Focus on social skills | **Social Development** 27, 28 **Exceptional Child** 36, 39 |
| 5. Warmth and affection | **Basic Care** 7 **Social Development** 27 **Exceptional Children** 39 |

II. CURRICULUM

GOAL: The program's planned activities and daily schedule encourage children to be actively involved in the learning process, and to pursue their own interests. Activities and materials are varied and support children's role as members of diverse communities.

HOW WELL DOES YOUR PROGRAM'S CURRICULUM INCORPORATE THE FOLLOWING?

| | FDCRS REFERENCE |
|---|---|
| 1. Developmentally appropriate materials and equipment | **Lang. & Reason.** 15 a. & b. **Learn. Act.** 18 **Excep. Child.** 33, 34, 38 |
| 2. Planning for each child's growth and development | **Learning Activities** 18, 19, 20, 21, 22, 23, 24, 25, 26 **Excep. Child.** 38 |
| 3. Balance and range of activities (physical, social, emotional, cognitive) | **Learning Activities** 18, 19, 20, 21, 22, 23, 24, 25, 26 **Excep. Child.** 38 |
| 4. Appreciation for diversity | **Social Development** 29 **Exceptional Children** 34, 36, 39 |

| | |
|---|---|
| 5. Management of transitions within and between settings | **Learning Activities 25** |

III. ADMINISTRATION

GOAL: The program is efficiently and effectively administered with attention to the needs and desires of children, parents, and the provider

HOW WELL DEVELOPED ARE THE FOLLOWING COMPONENTS OF YOUR PROGRAM?

| | **FDCRS REFERENCE** |
|---|---|
| 1. Operating policies and procedures that address:<br>• record keeping and confidentiality<br>• fiscal policies and procedures<br>• insurance and liability policies<br>• emergency policies and procedures | **Basic Care** 12, 13 |
| 2. Policies and procedures for transitions between settings | |

IV. HEALTH AND SAFETY

GOAL: The health and safety of children and adults are protected and enhanced. The provider acts to prevent illness and accidents, is prepared to deal with emergencies, and educates children concerning health and safety practices.

HOW WELL DO YOU INCORPORATE THE FOLLOWING HEALTH AND SAFETY PRACTICES IN YOUR PROGRAM?

| | **FDCRS REFERENCE** |
|---|---|
| 1. Regular provider physicals and evaluation for communicable diseases for example: TB, Rubella, Chicken Pox | **Basic Care** 12 |
| 2. Current health and immunization records for children | **Basic Care** 12 |
| 3. Arrival and departure policies | **Basic Care** 7 |
| 4. Supervision of children (including accident reports) | **Basic Care** 9 **Learning Activities** 24, 26 **Adult Needs** 31 |
| 5. Reporting policies and procedures for child abuse and neglect | **Basic Care** 12 |
| 6. Provider certification in Pediatric CPR and First Aid | **Basic Care** 13 |
| 7. Policies and procedures for maintaining sanitary conditions, including food handling | **Basic Care** 8, 9, 10, 11 |

VII. EVALUATION

GOAL: Systematic assessment of the program's effectiveness in meeting its goals for children, parents, and the provider insures that quality care and education are provided.

HOW WELL DOES YOUR PROGRAM INCORPORATE THE FOLLOWING?

| | FDCRS REFERENCE |
|---|---|
| 1. Regular evaluation of all program components | |
| 2. Inclusion of parents, staff and community members (where appropriate) in program evaluation | |
| 3. Regular, formal assessment of children's progress | |

VIII. COMMUNITY INVOLVEMENT

HOW DO YOU ENCOURAGE COMMUNITY PARTICIPATION AND UTILIZE COMMUNITY RESOURCES IN YOUR PROGRAM?

EDUCARE SITE SELF ASSESSMENT/OBSERVATRION REFERENCE: ITERS

SITE NAME: ________________________________ DATE:________________

I. INTERACTIONS AMONG STAFF AND CHILDREN

GOAL: Interactions between children and staff provide opportunities for children to develop an understanding of self and others and are characterized by warmth, personal respect, positive support, and responsiveness.

HOW WELL DO YOUR PROGRAM'S STAFF-CHILD INTERACTIONS SUPPORT OR REFLECT THE FOLLOWING?

| | **ITERS REF.** |
|---|---|
| 1. Positive, non punitive discipline and guidance | **Interact. 27** |
| 2. Developmentally appropriate expectations | **Interact. 27 Prog. Struc. 31** |
| 3. Language development | **List. & Talk 15, 16** |
| 4. Focus on social skills | **Interact. 25** |
| 5. Warmth and affection | **Interact. 26** |

II. CURRICULUM

GOAL: The program's planned activities and daily schedule encourage children to be actively involved in the learning process, and to pursue their own interests. Activities and materials are varied and support children's role as members of diverse communities.

HOW WELL DOES YOUR PROGRAM'S CURRICULUM INCORPORATE THE FOLLOWING?

| | **ITERS REF.** |
|---|---|
| 1. Developmentally appropriate materials and equipment | **Learn. Activ. 17, 18 Prog. Struc. 31** |
| 2. Planning for each child's growth and development | **Learn. Activ. 19, 20, 21, 22, 23 Prog. Struc. 31** |
| 3. Balance and range of activities (physical, social, emotional, cognitive) | **Prog. Struc. 28 Learn. Activ. 19, 20, 21, 22, 23 Prog. Struc. 31** |
| 4. Appreciation for diversity | **Learn Activ. 24 Prog. Struc. 31** |

| | |
|---|---|
| 5. Management of transitions within and between settings | Prog. Struc. 28 |

III. ADMINISTRATION

GOAL: The program is efficiently and effectively administered with attention to the needs and desires of children, parents, and staff

HOW WELL DEVELOPED ARE THE FOLLOWING COMPONENTS OF YOUR PROGRAM?

| | ITERS REF. |
|---|---|
| 1. Operating policies and procedures that address:<br>• record keeping and confidentiality<br>• fiscal policies and procedures<br>• insurance and liability policies<br>• emergency policies and procedures | Adult Needs 35<br><br><br><br>Pers. Care 12, 14 |
| 2. Parent/administrative relationships: commitment to insuring communication with all families and inclusion of parents in program planning | Adult Needs 35 |
| 3. Community/program relationships and resources | Adult Needs 35 |
| 4. Policies and procedures for transitions between settings | |

IV. HEALTH AND SAFETY

GOAL: The health and safety of children and adults are protected and enhanced. The provider acts to prevent illness and accidents, is prepared to deal with emergencies, and educates children concerning health and safety practices.

HOW WELL DO YOUR PROGRAM'S HEALTH AND SAFETY PRACTICES INCORPORATE THE FOLLOWING?

| | ITERS REF. |
|---|---|
| 1. Staff pre-employment physicals and evaluation for communicable diseases for example: TB, Rubella, Chicken Pox | Pers. Care 12 |
| 2. Current health and immunization records for children | Pers. Care 12 |
| 3. Arrival and departure policies | Pers. Care 6 |
| 4. Vehicle safety (if applicable) | Pers. Care 13 |
| 5. A safe place for staff to keep personal belongings | |

| | |
|---|---|
| 6. Contracted/employed maintenance staff to perform daily facility maintenance | |
| 7. Supervision of children (including accident reports) | **Pers. Care 8 Prog. Struc. 29** |
| 8. Reporting policies and procedures for child abuse and neglect | **Pers. Care 12** |
| 9. Staff certification in Pediatric CPR and First Aid | **Pers. Care 14** |
| 10. Policies and procedures for maintaining sanitary conditions, including food handling | **Pers. Care 8, 9, 10, 11** |
| 11. Policies and procedures to keep children safe from hazards for example: cleaning supplies, medication stored in locked cupboards | **Pers. Care 13** |

PHYSICAL ENVIRONMENT

GOAL: The amount, arrangement, and use of space both indoors and outdoors fosters optimal growth and development through opportunities for exploring and learning. The physical space and materials provided support positive interactions between adults and children.

HOW WELL DOES YOUR PROGRAM'S PHYSICAL ENVIRONMENT SUPPORT THE FOLLOWING?

| | **ITERS REF.** |
|---|---|
| 1. Compliance with Americans with Disabilities Act for children and adults | **Prog. Struc. 31** |
| 2. Outdoor space:<br>• Appropriate natural environment (sun, shade, vegetation)<br>• Variety of play surfaces for example: sand, grass, cement<br>• Variety of age-appropriate equipment<br>• Conducive to a variety of activities throughout the year<br>• Safe and protected from dangers | **Pers. Care 13 Learn. Act. 18 Prog. Struc. 31** |
| 3. Indoor space:<br>• Space for individual, small and large group activities<br>• Sand, water, woodworking available<br>• Defined interest areas with clear pathways | **Furn. & Display 1, 2, 4, 5 Adult Needs 32, 34 Prog. Struc. 31**<br><br>**Learn. Act. 23** |
| 4. Physical comfort (heating, ventilation, soft elements, light) | **Furn. & Display 1, 3 Pers. Care 11 Adult Needs 32, 34** |
| 5. Space and furnishings for staff to take breaks, do planning, hold meetings, etc. | |

VI. NUTRITION

GOAL: The nutritional needs of children are met in a manner that not only promotes their physical development but also encourages good eating habits. Meal times are used as opportunities for social, emotional and cognitive development.

HOW WELL DOES YOUR PROGRAM INCORPORATE THE FOLLOWING?

| | **ITERS REF.** |
|---|---|
| 1. United States Department of Agriculture nutrition guidelines | |
| 2. Menus and feeding schedules are available to parents | **Pers. Care 7** |
| 3. Mealtimes are planned, pleasant learning experiences | **Pers. Care 7** |

VII. EVALUATION

GOAL: Systematic assessment of the program's effectiveness in meeting its goals for children, parents, and staff insures that quality care and education are provided.

HOW WELL DOES YOUR PROGRAM INCORPORATE THE FOLLOWING?

| | **ITERS REF.** |
|---|---|
| 1. Regular evaluation of all program components | |
| 2. Inclusion of parents, staff and community members (where appropriate) in program evaluation | **Adult Needs 35** |
| 3. Regular, formal assessment of children's progress | |

VIII. COMMUNITY INVOLVEMENT

HOW DOES YOUR PROGRAM ENCOURAGE COMMUNITY PARTICIPATION AND UTILIZE COMMUNITY RESOURCES?

QUALITY IMPROVEMENT
TECHNICAL ASSISTANCE PLAN

Site: ______________________________

Classroom: ______________________________

Staff: ______________________________

Date: ______________

Program Component: ______________________________

______________

Objective: ______________________________

______________

(Ref: Self Assessment ECERS / ITERS / FDCRS ________ NAEYC / NAFCC Accred.

______ Parent Survey

CO. Quality Standards ______ Other ______

| ACTIVITY/STRATEGY | STAFF RESPONSIBLE | COMPLETION DATE | OUTCOME MEASURE | RESOURCES |
|---|---|---|---|---|
| | | | | |

______________________________ Signature of Program Administrator/Provider

______________________________ Signature of Educare Coach

INDIVIDUAL PROFESSIONAL DEVELOPMENT PLAN*

Date: ____________

Name: ______________________________ Position: ____________________

Site: ____________________________________________________________

Current Ed. Star Rating: Target Ed. Star Rating:

Current Ed. Attainment / Prof. Credential: ______________________________

(List highest degree and major or concentration. If working toward a degree, list # of ECE Credits.)

Professional Development Goals Academic Year

______________________________________________________________

______________________________________________________________

______________________________________________________________

______________________________________________________________

| Strategies | Target Completion Date | Financing (if needed) | Completed (✓) |
|---|---|---|---|
| | | | |
| | | | |
| | | | |
| | | | |
| | | | |
| | | | |
| | | | |
| | | | |

______________________ ______________________

Provider/Staff Member Program Director

______________________

Site Coach

*If a site has a documented professional plan for all staff, it may be used in lieu of this form with additions to meet QI goals as needed.

SITE EXPENSE FORM

SITE:

SCORE / STAR RATING: NO. OF CLASSROOMS:

DATE:

EQUIPMENT/SUPPLY NEEDS:

| | |
|---|---|
| | |
| | |
| | |
| | |
| | |
| | |
| | |
| | |
| | |
| | |
| | |
| | |
| | |
| | |

FACILITIES NEEDS:

| |
|---|
| |
| |
| |
| |

TRAINING NEEDS:

| |
|---|
| |
| |
| |
| |

EXPENSE AUTHORIZATION FORM

(One form is needed for each vendor and check request)

Date:________________

Vendor/Payee Name:________________________________________

Budget Line Item:________________________________________

*(Use Description if multiple items are expensed)*

Quantity Description Dollar Amount

________________________________________

________________________________________

________________________________________

________________________________________

________________________________________

________________________________________

________________________________________

________________________________________

________________________________________

________________________________________

Total Expense:____________

Person who will order items:__________________ Date Ordered

_____ Check here if order is by Educare's credit card.

Requested by:__________________________

Authorized by:__________________________

***COMPLETE THE FOLLOWING IF A CHECK MUST BE PRODUCED FOR PAYMENT****

***************ATTACH INVOICE OR PURCHASE ORDER, IF ANY********************

See Invoice for the following information. (check here if attached)

Street Address:________________________________________

City:__________________________State:__________Zip:______

Check will be mailed unless directed otherwise in special instructions.

Special Instructions, Due Dates, etc.

________________________________________

________________________________________

________________________________________

________________________________________

*(Financial Office Use)* Check completed by/date:________________________

MEMORANDUM OF AGREEMENT

This memorandum of agreement, dated as of ____________________, is by and between EDUCARE COLORADO and ________________________________________

(Trainer/Consultant NAME & ADDRESS) agrees to perform the following services for Educare:

Training/Technical Assistance for staff at (name & address of Educare site) as follows:

Date(s): Hours:

Participants:

Objectives:

Trainer/Consultant Fees:

Terms:

1. Learning objectives will be determined in consultation with the child care provider/site director and Educare staff.
2. A copy of the training/ technical assistance outline must be approved by Educare before the agreement is finalized.
3. The training/technical assistance design will include action planning to assist participants in applying what they have learned.
4. The trainer/consultant will submit a Trainer/Consultant Evaluation to Educare upon completion of the training.
5. Educare will provide a Participant Evaluation directly to the provider/site staff to be returned to Educare staff when completed.
6. The trainer/consultant agrees to maintain confidentiality in her/his interactions with the provider(s) receiving services.
7. The trainer/consultant agrees to direct any questions or concerns about Educare policies or procedures to Educare staff. While working for Educare, the trainer/consultant agrees to act as an "ambassador" for the Educare mission.
8. Educare agrees not to distribute or otherwise use any training materials developed by the trainer/consultant without written consent.
9. Educare will pay agreed-upon trainer/consultant fees within 15 days of receipt of an invoice for services.

EDUCARE COLORADO

By: ______________________________
Lynn Andrews,
Director Of Quality Improvement Date: ______________________________

(TRAINER/CONSULTANT)

By: ______________________________
(Trainer/Consultant)

Date:

MEMORANDUM OF AGREEMENT

This memorandum of agreement, dated as of ________________, is by and between EDUCARE COLORADO and ________________________________________.

(Mentor NAME & ADDRESS) agrees to perform the following services for Educare:

Mentoring for staff at (name & address of Educare site) as follows:

Date(s): Hours:

Mentee(s):

Objectives:

Mentor Fees:

Terms:

1. Learning objectives will be determined in consultation with the mentee(s) and Educare staff.
2. Once the Mentor has developed a technical assistance plan with the mentee(s), it must be approved by Educare.
3. The mentor technical assistance design will include action planning to assist the mentee(s) in applying what s/he has learned.
4. The mentor will meet periodically with Educare staff and the mentee to discuss progress on the plan.
5. Educare will provide a Participant Evaluation directly to the mentee to be returned to Educare staff upon completion of work with the Mentor.
6. The mentor agrees to maintain high standards of professionalism, including confidentiality in her/his interactions with the mentee(s) receiving services.
7. The Mentor agrees to direct any questions or concerns about Educare policies or procedures to Educare staff. While working for Educare, the Mentor agrees to act as an "ambassador" for the Educare mission.
8. Educare agrees not to distribute or otherwise use any training materials developed by the Mentor without written consent.
9. The mentee and Educare should be notified if the Mentor is unable to make a scheduled visit. The mentee is responsible for notifying the Mentor if s/he is unable to make a scheduled visit.
10. Educare will pay agreed-upon Mentor fees on a monthly basis upon submission of invoices for the length of the agreement.
11. The agreement may be terminated by Educare or the Mentor at any time. The agreement may be extended by mutual agreement if there is a need for continuing services.

EDUCARE COLORADO

By: ____________________________
Lynn Andrews, Director of Quality Improvement

Date: ____________________________

(MENTOR)

By: ____________________________
(MENTOR)

Date: ____________________________

What is claimed is:

1. A method of evaluating an educational program for children ages 0 to 5 years old, comprising the steps of:

(a) developing criteria which address strengths and weaknesses of the educational program, wherein said criteria includes each of (a1) through (a3) following:

(a1) an educational program staff to child classroom ratio;

(a2) educational program staff education qualifications including (a2-1) through (a2-3) following:

(a2-1) qualifications for staff educational degrees, (a2-2) a qualification for duration of paid experience in educating children, and (a2-3) qualifications for college course credits in child development; and (a3) at least a predetermined majority of parents, having a child in the educational program, responding with parental responses indicating each of the following (a3-1) through (a3-3):

(a3-1) the educational program welcomes visits by the parents at substantially all times;

(a3-2) receiving at least adequate information on their child's daily activities in the educational program; and (a3-3) receiving at least adequate information from the educational program on each of (a3-3-1) through (a3-3-3) following:

(a3-3-1) learning goals for children in the educational program, (a3-3-2) teaching approaches for children in the educational program, (a3-3-3) how child behavior is managed in a classroom environment;

(b) determining how the criteria relates to the educational program, and storing results from said determining step for use by an electronic computational device;

(c) determining from said stored results, a numerical value for each of a plurality of different portions of the results;

wherein said plurality of different portions of the results includes data for assigning such a numerical value to at least some of the following (c1) through (c5) following:

(c1) a classroom environment for the educational program;

(c2) accreditation by one or more of: (i) a state, local, or federal institution, and (ii) a non-governmental association that accredits a plurality of independently owned and operated child care facilities;

(c3) involvement of parents having a child in the educational program;

(c4) educational credentials of staff at the educational program; and (c5) ratios of educational program staff to children in the educational program;

(d) using a computational device for combining said assigned numerical values for obtaining an overall rating for the educational program, wherein said overall rating designates a quality of child care;

(e) assigning the overall rating to the educational program;

(f) providing a communications network interface for accessing the overall rating of the educational program; and (g) transmitting the overall rating to a user accessing the network interface so that the overall rating can be presented to the user.

2. A method of evaluating an educational program for children ages 0 to 5 years old, comprising the steps of:

(a) developing educational program criteria for evaluating the educational program;

(b) receiving data indicative of factors related to operation of the educational program, wherein for each of said factors, its indicative data relates to one or more portions of the criteria;

(c) assigning a corresponding numerical value to each of the factors, wherein for each of the factors, the corresponding numerical value is determined using the corresponding data indicative of the factor;

(d) sorting the numerical values of the factors to correspond with the one or more criteria to which the factors relate;

(e) for each of the portions of the criteria, averaging the numerical values of the factors whose corresponding data relate to the portion, thereby giving a resulting numerical value for the portion; and, (f) assigning an overall rating to the educational program based on the resulting numerical values, wherein said overall rating is determined by an electronic computational device combining said resulting numerical values;

(g) providing a communications network interface for accessing the overall rating of the educational program; and (h) transmitting the overall rating to a user accessing the network interface so that the overall rating can be presented to the user;

wherein the criteria for the educational program include provisions for assessing; a classroom environment, an accreditation of the educational program, a parent involvement, staff credentials, a presence of a curriculum, and staff to child ratios;

wherein one or more of the provisions for assessment of the parent involvement include identifying levels and types of parent involvement by evaluating information indicative of basic communication and interaction of the parents having a child in the educational program with the educational program; and wherein the information indicative of the basic communication and interaction consists of at least most of (1) through (14) following:

(1) educational program documents providing written information on the educational program's philosophy, policies and procedures;

(2) educational program documents providing orientation to the educational program for both parent and child prior to or immediately following enrollment;

(3) (i) and (ii) following: (i) educational program reports timely providing notification of a change in educational program policies, and (ii) documentation indicating that a low percentage of the parents report lack of timely receiving such notification, wherein said low percentage is no more than 50%;

(4) a first high percentage of the parents report that the educational program welcomes visits by the parents at all times, wherein said first high percentage is greater than 50%;

(5) a second high percentage of the parents report at least adequate information from the educational program on their child's physical and emotional well-being, wherein said second high percentage is greater than 50%;

(6) a third high percentage of the parents report at least adequate response by the educational program to parent concerns and suggestions, wherein said third high percentage is greater than 50%;

(7) a fourth high percentage of the parents report at least adequate information from the educational program on their child's daily activities, wherein said fourth high percentage is greater than 50%;

(8) a fifth high percentage of the parents report being somewhat comfortable asking educational program staff for information on child development or parenting techniques, wherein said fifth high percentage is greater than 50%;

(9) educational program documents related to planned individual parent conferences at least annually to discuss a child's progress and plans to meet learning goals;

(10) a sixth high percentage of the parents report receiving at least adequate information from the educational program on learning goals for children and teaching approaches, wherein said sixth high percentage is greater than 50%;

(11) a majority of the parents who have offered ideas or suggestions to the educational program report that the ideas or suggestions are implemented;

(12) a seventh high percentage of the parents report receiving at least adequate information from the educational program about community services, wherein said seventh high percentage is greater than 50%;

(13) educational program documents regularly include the parent's evaluation of the educational program; and,

(14) educational program staff and the parents report planned, successful activities in parent involvement directed to parenting, communication, participating or volunteering, learning at home, leadership or decision-making, and community involvement.

3. A method of evaluating an educational program according to claim 1, wherein the overall rating is computed by averaging the numeric values.

4. A method of evaluating an educational program according to claim 1, wherein the overall rating is computing by weighting the numeric values and averaging the weighted numeric values.

5. A method of evaluating an educational program according to claim 1, wherein the overall rating comprises a four-star system, with one star or less representing a lowest rating and each successive increase in stars is indicative of a higher quality rating for the educational program, with four stars representing a highest rating.

6. A method of evaluating an educational program according to claim 1, wherein said step of developing includes:

placing a representation of the criteria of step (a) in an electronic database; and entering said numerical values into the database once said numerical values are determined by the computational device.

7. A method of evaluating an educational program according to claim 1, wherein the step (b) of determining includes collecting educational program related data from at least some of: classroom observations, interviews with personnel of the educational program, a review of credentials of personnel of the educational program, and interviews with the children and parents patronizing the educational program.

8. A method of evaluating an educational program according to claim 1, wherein one of the numerical values is for the classroom environment of (c1), and the one numerical value is obtained from data related to at least most of (i) through (x) following: (i) space and furnishings occupied by the educational program, (ii) personal care routines used by the educational program, (iii) language activities provided by the educational program, (iv) reasoning activities provided by the educational program, (v) language materials provided by the educational program, (vi) reasoning materials provided by the educational program, (vii) child care program structure provided by the educational program, (viii) physical activities provided by the educational program, (ix) interaction between the staff and children in the educational program, and (x) interactions between parents of children in the educational program and the staff of the educational program.

9. A method of evaluating an educational program according to claim 2, wherein the overall rating comprises a ranking having four ranks, wherein the ranks are linearly ordered.

10. A method of evaluating an educational program according to claim 2, wherein said step of developing includes:

placing a representation of the criteria of step (a) and the data indicative of the factors of step (b) in an electronic database;

entering said numerical values of step (c) into the database; and, calculating, within the database, the overall rating of the educational program.

11. A method of evaluating an educational program according to claim 2, wherein the receiving step includes collecting documents, classroom observations, interviews with personnel of the educational program, review of credentials of personnel of the educational program, interviews with the students and parents patronizing the educational program, surveys, and other information gathering techniques.

12. A method of evaluating an educational program according to claim 2, wherein the provisions for assessing the classroom environment includes observing space and furnishings, personal care routines, language activities, reasoning activities, language materials, reasoning materials, program structure, physical activities, interaction between staff and children, interactions between parents and staff.

13. A method of evaluating an educational program according to claim 2, wherein the provisions for assessing the accreditation of the educational program includes an analysis of whether the educational program is accredited by one or more of: (i) a state, local or federal institutions, and (ii) a non-governmental association that accredits a plurality of independently owned and operated child care facilities.

14. A method of evaluating an educational program according to claim 2, wherein the provisions for assessing the staff credentials includes an analysis of the credentials of each staff member.

15. A method of evaluating an educational program according to claim 2, wherein the provisions for assessing the staff to child ratios includes an analysis of whether the educational program meets target ratios of staff to child based on age groups.

16. A method of evaluating an educational program according to claim 15, wherein the target ratios for an age group of 0 to 18 months of age ranges from a low end of 1 staff person to 5 children, to a high end of 1 staff person to 3 children.

17. A method of evaluating an educational program according to claim 15, wherein the target ratios for an age group of 18 to 24 months of age ranges from a low end of 1 staff person to 5 children, to a high end of 1 staff person to 3 children.

18. A method of evaluating an educational program according to claim 15, wherein the target ratios for an age group of 24 to 36 months of age ranges from a low end of 1 staff person to 7 children, to a high end of 1 staff person to 5 children.

19. A method of evaluating an educational program according to claim 15, wherein the target ratios for an age group of 30 to 36 months of age ranges from a low end of 1 staff person to 8 children, to a high end of 1 staff person to 6 children.

20. A method of evaluating an educational program according to claim 15, wherein the target ratios for an age group of 36 to 48 months of age ranges from a low end of 1 staff person to 10 children, to a high end of 1 staff person to 8 children.

21. A method of evaluating an educational program according to claim 15, wherein the target ratios for an age group of 48 to 60 months of age ranges from a low end of 1 staff person to 12 children, to a high end of 1 staff person to 8 children.

22. The method of claim 1, wherein the communications network is the Internet.

23. The method of claim 2, wherein the communications network is the Internet.

* * * * *